United States Patent
Puvvada et al.

(10) Patent No.: US 11,208,559 B2
(45) Date of Patent: Dec. 28, 2021

(54) MODIFIED INDIGO COMPOUNDS AND METHODS OF DYEING A SUBSTRATE USING A MODIFIED INDIGO COMPOUND

(71) Applicant: VF Jeanswear LP, Greensboro, NC (US)

(72) Inventors: Sudhakar Puvvada, Cary, NC (US); Dennis Scheer, Greensboro, NC (US); Paul Gerard Hoertz, Hillsborough, NC (US); Amsarani Ramamoorthy, Greensboro, NC (US); Rajeev Rajbhandari, Bogart, GA (US); Caroline Elizabeth Hagerman, Cambridge (GB); Alexander Peter Dirk Massey, Cambridge (GB); Alexander Mark Hellawell, Hitchin (GB); Asadollah Fallah, Sheffield (GB); Ruhksana Quyoum, Sheffield (GB)

(73) Assignee: The H.D. Lee Company, Inc., Wilmington, DE (US)

( * ) Notice: Subject to any disclaimer, the term of this patent is extended or adjusted under 35 U.S.C. 154(b) by 0 days.

(21) Appl. No.: 16/313,353

(22) PCT Filed: Jun. 22, 2017

(86) PCT No.: PCT/US2017/038848
§ 371 (c)(1),
(2) Date: Dec. 26, 2018

(87) PCT Pub. No.: WO2017/223369
PCT Pub. Date: Dec. 28, 2017

(65) Prior Publication Data
US 2019/0256710 A1 Aug. 22, 2019

Related U.S. Application Data

(60) Provisional application No. 62/353,193, filed on Jun. 22, 2016.

(51) Int. Cl.
| | | |
|---|---|---|
| C09B 7/02 | (2006.01) | |
| D06P 1/22 | (2006.01) | |
| D06P 3/52 | (2006.01) | |
| D06P 3/60 | (2006.01) | |

(52) U.S. Cl.
CPC .............. *C09B 7/02* (2013.01); *D06P 1/22* (2013.01); *D06P 1/228* (2013.01); *D06P 3/523* (2013.01); *D06P 3/6025* (2013.01)

(58) Field of Classification Search
CPC ... C09B 7/02; D06P 1/22; D06P 1/228; D06P 3/523; D06P 3/6025
See application file for complete search history.

(56) References Cited

U.S. PATENT DOCUMENTS

| | | | |
|---|---|---|---|
| 1,810,758 A | 6/1931 | Drescher et al. | |
| 2,765,309 A | 10/1956 | Eckert et al. | |
| 4,004,572 A | 1/1977 | Nathan et al. | |
| 4,449,516 A * | 5/1984 | Kitao | C09B 7/02 |
| | | | 126/400 |
| 2008/0172806 A1 | 7/2008 | Lagrange et al. | |
| 2013/0283545 A1 | 10/2013 | Aurich | |
| 2019/0256710 A1 | 8/2019 | Puvvada et al. | |

FOREIGN PATENT DOCUMENTS

| | | |
|---|---|---|
| DE | 436176 | 10/1926 |
| EP | 0431906 | 6/1991 |
| EP | 1086984 | 3/2001 |
| EP | 1840172 | 10/2007 |
| GB | 5328 | 1/1904 |
| JP | 58131983 | 8/1983 |
| JP | 3223363 | 10/1991 |
| JP | 2001081354 | 3/2001 |
| JP | 2001131439 | 5/2001 |
| JP | 2001226614 | 8/2001 |
| JP | 2001247799 | 9/2001 |
| JP | 2002019261 | 1/2002 |
| JP | 2004168779 | 6/2004 |
| JP | 2005121744 | 5/2005 |
| JP | 2007284665 | 11/2007 |
| JP | 2010013386 | 1/2010 |
| WO | 2002057377 | 7/2002 |
| WO | 2017093866 | 6/2017 |
| WO | 2017223369 | 12/2017 |

OTHER PUBLICATIONS

Setsune et al. (Synthesis of N,N'-Diacyindigotins (N,N'=Diacyl-2,2"-bi-indolinylidene-3,3"-diones) via an Oxidative-to-nitrogen Acyl Shift of O,O'-Diacyl-leucoindigos(3,3'-Diacyloxy-2,2"-bi-indolyls). J. Chem. Soc. Perkin Trans. 1984, p. 2305-2309).*
PCT/US2017/038848 International Search Report dated Jun. 9, 2017, 4 pgs.
PCT/US2017/038848 International Preliminary Report on Patentability, dated Dec. 25, 2018, 8 pgs.
Chinese App. No. 201780046781X Office Action dated Oct. 25, 2019, 15 pgs.
India Application No. 201947001528 Office Action dated Apr. 24, 2020, 6 pgs.
Korean Application No. 10-2019-7001564 Office Action dated Mar. 3, 2020, 35 pgs.
U.S. Appl. No. 16/226,931, filed Dec. 2, 2018, 69 pgs.
Methods of Dyeing, Textile Learner, https://textilelearner.blogspot.com/2011/12/methods-of-dyeing-different-dyeing.html, known at least as early as Dec. 26, 2018, 3 pgs.
Indigo Dyeing—Various Methods Explained and Compared (Adnan), 2020—Denim Jeans, Trends, News and Reports, Dec. 19, 2009, 5 pgs.
Dyeing Process, TEOnline.com, http://teonline.com/knowledge-centre/dyeing.html, Aug. 5, 2017, 1 pg.

(Continued)

*Primary Examiner* — Amina S Khan
(74) *Attorney, Agent, or Firm* — Womble Bond Dickinson (US) LLP

(57) ABSTRACT

The present disclosure provides dye compounds for use in dyeing textiles.

17 Claims, 21 Drawing Sheets

(56) References Cited

OTHER PUBLICATIONS

Dyeing, TEOnline.com, http://www.teonline.com/knowledge-centre/dyeing-fiber-to-apparel.html, Aug. 30, 2017, 2 pgs.
What is Foam Dyeing/Shaving Cream Dyeing?, Textile Learner, Mazharul Islam Kiron, https://textilelearner.blogspot.com/2012/02/what-is-foam-dyeingshaving-creem-dyeing.html, known at least as early as Dec. 26, 2018, 3 pgs.
A Facile Protection-Deprotection Route for Obtaining Indigo Pigments as Thin Films and their Applications in Organic Bulk Heterojunctions, ResearchGate, Eric Daniel Glowacki, et al., May 16, 2013, 4 pgs.
Foam Dyeing & Finishing: A Step Towards Sustainable Processing of Textiles, Fibre2Fashion, https://www.fibre2fashion.com/industry-article/7689/foam-dyeing-and-finishing-a-step-towards-sustainable-processing-of-textiles, CN Sivaramakrishnan, Nov. 2015, 3 pgs.
[1,3] Alkyl Migration as a Third Type of N,N'-Dialkanoylindigo Photochemistry, J. Org. Chem., Jun. 18, 1993, Bradley D. Smith, et al., 4 pgs.
Foam Properties and Application in Dyeing Cotton Fabrics with Reactive Dyes, Key Laboratory of Science and Technology of Eco-Textile (Ministry of Education), Donghua University, Hong Yu, et al., Jan. 27, 2014, 7 pgs.
Oxidative Destruction of Anthraquinone and Indigoid Components in Aqueous Solutions of Sodium Hydroxymethylsulfinate, Institute of Solution Chemistry, G.V. Chistyakova, et al., May 3, 2001, 5 pgs.
Estimation of Water Solubility and Octanol/Water Partition Coefficient of Hydrophobic Dyes. Part II: Reverse-Phase High Performance Liquid Chromatography, Dyes and Pigments, Miaolin Hou, et al. Oct. 29, 1990, 7 pgs.
Foam Dyeing for Developing the Wash-out Effect on Cotton Knit Fabrics with Pigment, Research Journal of Textile and Apparel, Songmin Shang, et al., Feb. 1, 2011, 2 pgs.
Synthesis of N/N'-Diacylindigotins, Department of Applied Chemistry, University of Osaka Prefecture, Jun-ichiro Setsune, et al., Feb. 9, 1984, 5 pgs.
Denim Manufacture, Finishing and Applications, The Textile Institute, Woodhead Publishing, copyright 2015, 150 pgs. (part 1 of 4).
Denim Manufacture, Finishing and Applications, The Textile Institute, Woodhead Publishing, copyright 2015, 150 pgs. (part 2 of 4).
Denim Manufacture, Finishing and Applications, The Textile Institute, Woodhead Publishing, copyright 2015, 150 pgs. (part 3 of 4).
Denim Manufacture, Finishing and Applications, The Textile Institute, Woodhead Publishing, copyright 2015, 176 pgs. (part 4 of 4).
The Selective Preparation of N-Acylindigo, Yoshimori Omote, et al., Department of Chemistry, The University of Tsukuba, Feb. 1981, 2 pgs.
ChemComm, RSC Publishing, A Facile Protection—Deprotection Route for Obtaining Indigo Pigments as Thin Films and Their Applications in Organic Bulk Heterojunctions, May 16, 2013, 3 pgs.
Theodore Posner, Posner: Zur Kenntnis der Indigo-Gruppe, Contributions to the Knowledge of the Indigo Group, On the Effect of Chlorine Chlorides on Indigo and Indigo Derivatives, as well as the Spatial Formula of Indigo., cited during prosecution of counterpart JP application No. 2019-519609, dated Jun. 1926, 30 pgs.
Chinese Office Action for 201780046781.X, dated Jun. 23, 2020, 14 pgs.
Japanese Office Action for 2019-519609, dated Aug. 25, 2020, 6 pgs.
Chinese Office Action for Application No. 201780046781.X dated Dec. 16, 2020, 5 pages.
Chinese Office Action dated Mar. 26, 2021, for Chinese App. No. 201780046781.X, 10 pgs.
Japanese Office Action for Application No. 2019-519609, dated Aug. 17, 2021, 8 pgs.

* cited by examiner

MODIFIED INDIGO COMPOUNDS AND METHODS OF DYEING A SUBSTRATE USING A MODIFIED INDIGO COMPOUND

CROSS-REFERENCE TO RELATED APPLICATION

This application is the National Stage of International Application No. PCT/US2017/038848, filed Jun. 22, 2017, which claims the benefit of U.S. Provisional Application No. 62/353,193 filed Jun. 22, 2016, the disclosures of which are incorporated herein by this reference in their entireties.

TECHNICAL FIELD

This invention relates to modified indigo compounds and methods of using them.

BACKGROUND

Fabrics dyed with indigo, and especially denim fabrics, are desired by consumers due to the broad range of shades that can be achieved and the ability of the fabric to develop character by evolving over time. However, the indigo dyeing of cotton yarn for denim fabrics is a difficult process, due largely to the challenges of dyeing with the indigo compound. For instance, indigo has poor solubility in most solvents and a low affinity for cotton. Indigo is represented by the chemical structure:

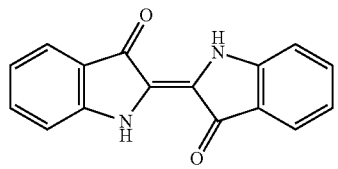 [SMILES: O=C1/C(=C2\Nc3ccccc3C2=O)Nc2ccccc21]

Indigo is insoluble in water. Therefore, in order to dye with indigo, it is first converted to a soluble compound known as leuco-indigo, or white indigo, by reducing it with a strong reducing agent such as sodium hydrosulfite. Leuco-indigo is represented by the chemical structure:

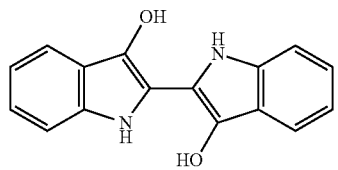 [SMILES: Oc1c(-c2[nH]c3ccccc3c2O)[nH]c2ccccc12]

Cotton yarn, typically in the form of ropes or sheets, is then dipped into a dye bath containing leuco-indigo. In order to achieve a consistent dye, for instance, the yarn must be contacted with the dye solution, e.g. by dipping into a dye bath, having a precisely maintained concentration of leuco-indigo. If the concentration of leuco-indigo in the dye bath is not maintained within tight tolerances, the resulting dyed yarn will contain undesirable variations. When the cotton yarn is removed, leuco-indigo quickly reacts with atmospheric oxygen to convert back to the vibrantly colored and insoluble indigo. Because leuco-indigo has a low affinity to cotton (and because prolonged soaking of the yarn in the dye bath is unfeasible since it is generally desirable that the core of the yarn is left undyed), this dyeing and oxidation process is typically repeated a number of times in order to obtain the desired penetration depth and shade of indigo. Furthermore, because leuco-indigo has a relatively low solubility in water and a limited affinity to cotton, dyeing with dye baths containing leuco-indigo generally requires that the concentration of leuco-indigo in the dye bath remains extremely low.

However, because leuco-indigo is so unstable in the presence of oxygen, the dye bath must constantly be maintained under conditions that prevent conversion of leuco-indigo into insoluble indigo. Accordingly, the dye bath must contain a significant concentration of a reducing agent, such as sodium hydrosulfite, which prevents the conversion of leuco-indigo into insoluble indigo. To improve the solubility of leuco-indigo, the dye bath must also contain significant amounts of a pH-adjusting agent, such as sodium hydroxide, through which the dye bath may be maintained at a high pH, e.g. at a pH between about 11 and 13. In many processes, the dye bath is also blanketed with foam in order to reduce the amount of oxygen that comes into contact with the dye bath, such as during the mechanical action of dipping the cotton yarn (which itself introduces oxygen into the bath). In order to achieve a consistent dye, it is important to keep the concentrations of each of these agents in the dye bath within very narrow ranges, which is difficult to maintain over the duration of a continuous dyeing process.

In addition to complicating the dyeing process, the use of leuco-indigo also introduces a number of additional expenses. For instance, waste water from the dyeing process typically contains high levels of sodium sulfate, which are caused by the significant amounts of sodium hydrosulfite reducing agent. Due to the high concentrations of this salt, the waste water is difficult to recycle. The dyeing process therefore uses large amounts of water and produces large amounts of wastewater. In order to lower the amount of reducing agent in the dye bath, pre-reduced leuco-indigo (also sometimes referred to simply as pre-reduced indigo) is sometimes used. However, the costs of the pre-reduced leuco-indigo raw materials are increased because pre-reduced leuco-indigo needs to be maintained under a nitrogen blanket prior to be introduced into the dye bath.

Because of the complicated nature of the indigo dyeing process, foam dyeing of cotton yarns with indigo has also been explored. Foam dyeing is a process in which an aqueous-based dye is converted to a foam and then applied, such as by spraying under pressure, to a substrate under controlled conditions that provide for a consistent and uniform dye. Because a typical foam is mostly air, however, foam dyeing with indigo has proven difficult since water soluble leuco-indigo reacts with the oxygen present in the air to produce insoluble indigo. Therefore, nitrogen or other inert gas must be used to generate the foam. Of course, performing the foam dyeing process in an oxygen-free atmosphere presents its own challenges.

In part because of these challenges (and also due to challenges with yarn handling and consistency), indigo foam dyeing has been explored for the dyeing of fabrics but has not yet been used commercially to dye textile yarns. One embodiment of a process for foam dyeing a traveling sheet of textile yarn is in U.S. Patent Application Publication No. 2013/0283545.

In conventional indigo dyeing, cotton yarns are sequentially dipped into baths of leuco-indigo, a soluble and reduced form of indigo. High alkali concentration, pH 11+, and strong reducing agents are used to reduce indigo to the leuco state making it relatively water soluble. Additional alkali and reducing agent are added to the dyebath to prevent oxidation of leuco-indigo back to indigo. Indigo is not only hard to reduce, but also hard to keep in reduction and soluble. Leuco-indigo is very sensitive to air and will revert to insoluble indigo very quickly when exposed.

The high pH in the dyebath required for solubility gives both the leuco-indigo and the cotton a negative repelling charge making affinity for cotton low, and only a small amount of soluble leuco-indigo is transferred to the cotton from the bath. After leaving the dyebath, the yarn is skyed—lifted out of the dyebath and allowed to air oxidize back to indigo. This 'fixes' any dye on the yarn from the dyebath and binds to the cotton partially through mechanical entrapment. Once the dye has been fixed, more leuco-indigo can be added to the yarn through further dipping and skyeing. This process is repeated many (about 6-8) times to build up the required shade. It would be preferable to dye in fewer dips (ideally one), but this would require a greater affinity between the leuco-indigo and the cotton. It would also be preferable to minimize or eliminate auxiliary chemicals used in the dyeing process, such as sodium hydrosulfite.

What is needed in the art are alternate indigo compounds.

BRIEF DESCRIPTION OF THE DRAWINGS

The present application is further understood when read in conjunction with the appended drawings. For the purpose of illustrating the subject matter, these are shown in the drawings exemplary embodiments of the subject matter; however, the presently disclosed subject matter is not limited to the specific compositions, methods, devices, and systems disclosed. In addition, the drawings are not necessarily drawn to scale.

SUMMARY

Figure 1:
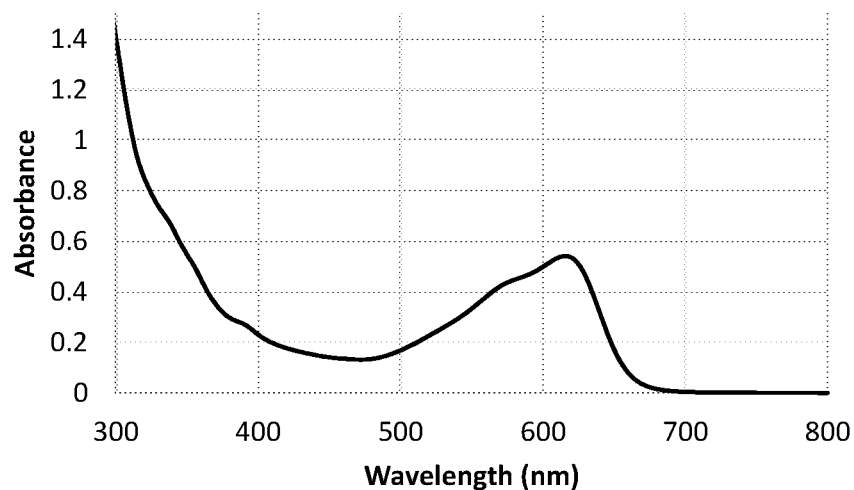
FIG. 1 is the UV-Vis spectrum of Compound 17 in dimethylsulfoxide.

The present disclosure provides dye compounds for use in dyeing substrates, the dye compounds comprising an indigo derivative, or a salt thereof, having one or more modification over the chemical structure of indigo, wherein the indigo derivative has a water-solubility of greater than 0.2% w/v in the absence of a reducing agent and in the presence of oxygen and converts to indigo upon removing the modification, wherein the chemical structure of indigo is the following.

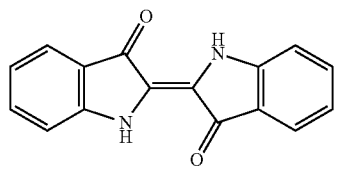 [SMILES: O=C1/C(=C2\Nc3ccccc3C2=O)Nc2ccccc21]

The present disclosure also provides compounds which are of Formula (I), (II), or a salt thereof, wherein $R^1$-$R^4$, $R^7$, $R^8$, n, and m are defined herein.

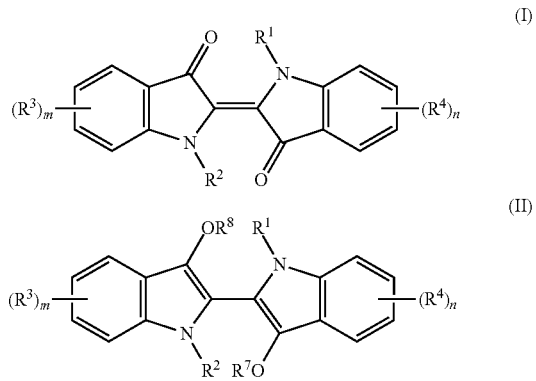

The disclosure also provides compositions comprising (i) one or more compound described herein and (ii) water.

The disclosure further provides kits comprising (i) one or more compound described herein and (ii) a reagent or device that converts the compound to indigo.

The disclosure additionally provides methods of preparing a bath for dyeing a substrate, comprising mixing a compound described herein with water.

The disclosure also provides methods of dyeing a substrate, comprising (i) contacting the textile with an aqueous bath and a compound described herein and (ii) hydrolyzing the compound of step (i).

The disclosure additionally provides dyed substrates prepared according to the methods described herein.

Other aspects and embodiments of the invention will be readily apparent from the following detailed description of the invention.

DETAILED DESCRIPTION OF ILLUSTRATIVE EMBODIMENTS

Embodiments of the present disclosure are directed to improved processes for indigo dyeing a substrate, such as cotton yarn, using a modified indigo compound in place of leuco-indigo. This process provides a number of benefits over conventional indigo dyeing methods. For instance, in contrast with leuco-indigo, the modified indigo compound is stable in the presence of oxygen. Accordingly, contact with atmospheric oxygen will not cause the modified indigo compound to convert to indigo. As such, the modified indigo compound is suitable for dyeing a yarn using a conventional dipping or foam yarn-dyeing process without protecting the dye from contact with atmospheric oxygen, such as through the use of reducing agents or the like.

The inventors found that a modification of indigo or leuco-indigo could increase its affinity for the cotton and potentially eliminate the need for one or more of a large number of dips, the use of reducing agents in the dye bath, or the need to sky the yarn.

Preferably, this modification is environmentally friendly and atom efficient. It also is quickly and completely removable when exposed to a simple reagent or condition in order to leave standard indigo on the yarn.

Accordingly, the dyeing process of embodiments of the present disclosure may be performed without the need for reducing agents in the dye bath. As such, the amount of reducing agents in the dye solution may be significantly decreased or, more preferably, the reducing agents may be eliminated from the dye solution altogether.

The oxygen stability of the modified indigo compound also renders it highly advantageous for foam dyeing processes, in which the dye comes into substantial contact with the atmosphere in which the process is performed. In part because of the instability of leuco-indigo in air, the foam dyeing of textile yarns with indigo has yet to be commercially developed. This is, at least in part, due to the large amounts of an inert gas that are required in order to apply a foam containing leuco-indigo to a yarn. In contrast, the modified indigo compounds may be applied to textile yarns through a foam dyeing process that takes place in air, i.e. without the need for an inert gas environment.

Because the modified indigo compounds of the present disclosure tend to convert to indigo through hydrolysis, contact with water may cause the modified indigo compounds of the present disclosure to begin to convert into water-insoluble indigo. Since the dyeing process preferably comprises contacting the yarn with an aqueous solution containing the modified indigo compound, stability of the modified indigo compound in aqueous solution is important commercially (e.g. for maintenance of a dye bath). Notably, the modified indigo compounds of the present disclosure are capable of remaining in aqueous solution for a commercially significant amount of time before substantial conversion to indigo occurs.

In some embodiments, the modified indigo compounds of the present disclosure remain in aqueous solution (at room temperature) for a period of at least five minutes before substantial conversion to water-insoluble indigo occurs. In other embodiments, the modified indigo compounds of the present disclosure remain in aqueous solution for a period of at least ten minutes before substantial conversion to water-insoluble indigo occurs. In further embodiments, the modified indigo compounds of the present disclosure remain in aqueous solution for a period of at least thirty minutes before substantial conversion to the water-insoluble indigo compound occurs. In yet other embodiments, the modified indigo compounds of the present disclosure remain in aqueous solution for a period of at least one hour before substantial conversion to water-insoluble indigo occurs. In still further embodiments, the modified indigo compounds of the present disclosure remain in aqueous solution for a period of at least three hours before substantial conversion to water-insoluble indigo occurs. In other embodiments, the modified indigo compounds of the present disclosure remain in aqueous solution for a period of at least ten hours before substantial conversion to water-insoluble indigo occurs. In further embodiments, the modified indigo compounds of the present disclosure remain in aqueous solution for a period of at least fifteen hours before substantial conversion to water-insoluble indigo occurs. In yet other embodiments, the modified indigo compounds of the present disclosure remain in aqueous solution for a period of at least twenty hours before substantial conversion to water-insoluble indigo occurs. In still further embodiments, the modified indigo compounds of the present disclosure remain in aqueous solution for a period of at least one day before substantial conversion to water-insoluble indigo occurs. In other embodiments, the modified indigo compounds of the present disclosure remain in aqueous solution for a period of at least one and one-half days before substantial conversion to water-insoluble indigo occurs. In further embodiments, the modified indigo compounds of the present disclosure remain in aqueous solution for a period of at least two days before substantial conversion to water-insoluble indigo occurs. In still other embodiments, the modified indigo compounds of the present disclosure remain in aqueous solution for a period of at least three days before substantial conversion to water-insoluble indigo occurs. In yet further embodiments, the modified indigo compounds of the present disclosure remain in aqueous solution for a period of at least five days before substantial conversion to water-insoluble indigo occurs. In other embodiments, the modified indigo compounds of the present disclosure remain in aqueous solution for a period of at least one week before substantial conversion to water-insoluble indigo occurs. In further embodiments, the modified indigo compounds of the present disclosure remain in aqueous solution for a period of at least ten days before substantial conversion to water-insoluble indigo occurs. In still further embodiments, the modified indigo compounds of the present disclosure remain in aqueous solution for a period of at least two weeks before substantial conversion to water-insoluble indigo occurs. In yet other embodiments, the modified indigo compounds of the present disclosure remain in aqueous solution for a period of at least three weeks before substantial conversion to water-insoluble indigo occurs. In further embodiments, the modified indigo compounds of the present disclosure remain in aqueous solution for a period of at least one month (i.e. 30 days) before substantial conversion to water-insoluble indigo occurs.

The modified indigo compound may also have improved water solubility relative to conventional leuco-indigo.

The modified indigo compounds of the present disclosure also have increased water solubility when compared to leuco-indigo. Accordingly, dyeing yarns with the modified indigo compound provides a process in which more indigo dye can be placed on the yarn per period of contact relative to conventional dyeing methods. In this way, by using a modified indigo compound of the present disclosure, one may increase the speed, and thus the output, of the process by reducing the amount of time that the yarn spends in a dye bath per dip and/or the number of dips to which the yarn is subjected. Moreover, one may obtain a darker indigo dye using a relatively lower contact time and/or fewer dips than would be necessary using a conventional leuco-indigo dye bath. In some embodiments, for example, the concentration of the modified indigo compound in an aqueous dye solution may be at least 0.3 wt. %, at least 0.5 wt. %, at least 0.6 wt. %, at least 0.8 wt. %, at least 1 wt. %, at least 2 wt. %, at least 3 wt. %, at least 5 wt. %, at least 10 wt. %, at least 15 wt. %, or at least 20 wt. %.

The improved water solubility of the modified indigo compounds of the present disclosure also simplifies the process by which the dye bath is controlled, and, more particularly, by which the modified indigo compound is maintained at a substantially constant concentration within the dye bath. This, in turn, minimizes the inclusion of additional chemicals, which leads to decreased costs and a lower environmental impact.

As described above, the modified indigo compounds disclosed herein have a beneficial combination of (a) greater oxygen stability than leuco-indigo (such as may be measured at room temperature) and (b) greater water solubility than leuco-indigo (such as may be measured at room temperature). In some embodiments, the modified indigo compounds may further have (c) greater affinity to cotton than leuco-indigo.

In the present disclosure the singular forms "a", "an" and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about" or "substantially" it will be understood that the particular value forms another embodiment. In general, use of the term "about" or "substantially" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about" or "substantially". In other cases, the gradations used in a series of values may be used to determine the intended range available to the term "about" or "substantially" for each value. Where present, all ranges are inclusive and combinable. That is, references to values stated in ranges include every value within that range.

When a list is presented, unless stated otherwise, it is to be understood that each individual element of that list and every combination of that list is to be interpreted as a separate embodiment. For example, a list of embodiments presented as "A, B, or C" is to be interpreted as including the embodiments, "A," "B," "C," "A or B," "A or C," "B or C," or "A, B, or C."

It is to be appreciated that certain features of the invention which are, for clarity, described herein in the context of separate embodiments, may also be provided in combination in a single embodiment. That is, unless obviously incompatible or excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Finally, while an embodiment may be described as part of a series of steps or part of a more general structure, each said step may also be considered an independent embodiment in itself.

I. THE COMPOUNDS

In solving the problems in the art, the inventors developed modified dye molecules that are likely to bond more strongly to cotton than in the current dyeing process, are soluble in water, can be converted to indigo in one simple step after dyeing, are cost effective or provide a cost saving over the current process, more stable than leuco-indigo, and/or readily dissolves in water, unlike standard, indigo, and readily converts back to indigo quickly and easily without skying.

Furthermore, core dyeing of yarn with the modified dye molecule is possible and controllable; there is a large reduction in production water and waste water; there is a reduction in the chemicals required for the process; the molecule, auxiliary chemistries, and effluent are likely to be suitable for standard wastewater treatment processes; the modification is introduced to indigo in a few simple steps, and is stable; the molecule could be supplied to dye houses in its modified form; and no reducing agents are required. Such benefits can be gleaned using all forms of dyeing, including those discussed below.

The present disclosure provides dye compounds for use in dyeing substrates. The dye compounds comprise an indigo derivative, or a salt thereof, having one or more modification over the chemical structure of indigo. The inventors found that these compounds convert to indigo via hydrolysis. In some embodiments, hydrolysis is accomplished using a hydrolyzing agent, heat, steam, or combinations thereof. Advantageously, these compounds were found to be substantially stable in the presence of an oxidant such as in aqueous solutions, which property is not shared with leuco-indigo. Preferably, the compounds were found to be substantially stable in the presence of oxygen. These compounds were also found to be more stable in the air than other indigo derivatives such as leuco-indigo.

The term "substantially stable" refers to the ability of the compound to maintain its structure and properties thereof. In some embodiments, a compound's stability is maintained without being reduced, oxidized, or reacting with another component of the composition or method discussed herein. In other embodiments, the compound is stable since it maintains its water solubility. In further embodiments, the compound is stable since it does not convert to indigo. Desirably, less than about 50 wt. %, such as less than about 45, less than about 40, less than about 35, less than about 30, less than about 25, less than about 20, less than about 15, less than about 10, or less than about 5 wt. % of the compound in an aqueous solution degrades under atmospheric conditions over a period of about 12 hours in the absence of a reducing agent. Degradation can be measured using any analytical technique which is capable of quantifying a chemical compound including, without limitation, gas chromatography, UV-visible spectrophotometry, nuclear magnetic resonance, mass spectroscopy, or combinations thereof. In some embodiments, about 0.001 to about 50 wt. % of the compound, about 0.001 to about 45, about 0.001 to about 40, about 0.001 to about 35, about 0.001 to about 30, about 0.001 to about 25, about 0.001 to about 20, about 0.001 to about 15, about 0.001 to about 10, or about 0.001 to about 5 wt. % of the compound in an aqueous solution degrades under atmospheric conditions over a period of about 12 hours in the absence of a reducing agent. In further embodiments, 0.001 to about 5 wt. % of the compound in an aqueous solution degrades under atmospheric conditions over a period of about 12 hours in the absence of a reducing agent.

The inventors also found that the compounds described herein have greater water solubility than indigo. In some embodiments, the dye compounds have a water solubility of about 0.2% w/v or greater. In preferred embodiments, the water solubility is about 0.2% w/v or greater in the absence of a reducing agent. In other preferred embodiments, the water solubility is about 0.2% w/v or greater in the presence of oxygen. In yet further embodiments, the water solubility is about 10 to about 100%, about 20 to about 100, about 30 to about 100, about 40 to about 100, about 50 to about 100, about 60 to about 100, about 70 to about 100, about 80 to about 100, about 90 to about 100, about 95 to about 100, about 98 to about 100, about 99 to about 100, or about 100 w//v. The water solubility of the compounds described herein may be measured using techniques known to those skilled in the art including, without limitation, dissolution with agitation, followed by filtration of centrifugation to isolate the soluble solids. The insoluble solids are then dried and weighed and the solubility calculated.

The term "indigo" as used herein refers to the following compound.

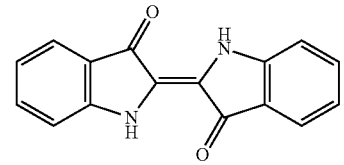 [SMILES: O=C1/C(=C2\Nc3ccccc3C2=O)Nc2ccccc21]

Similarly, the term "leuco-indigo" is used interchangeably with "indigo white" and refers to the following compound. In some embodiments, leuco-indigo exists in the neutral form.

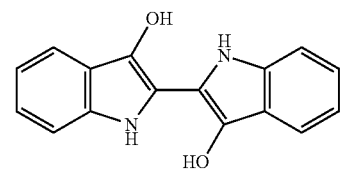 [SMILES: Oc1c(-c2[nH]c3ccccc3c2O)[nH]c2ccccc12]

Leuco-indigo may also exist in a deprotonated form, such as a form which is deprotonated on one or both oxygen atoms. Thus, the term "leuco-indigo" can include the monoanionic and di-anionic forms including the monosodium, monopotassium, monolithium, disodium, dipotassium, or dilithium analogs of the following:

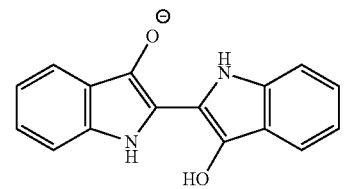

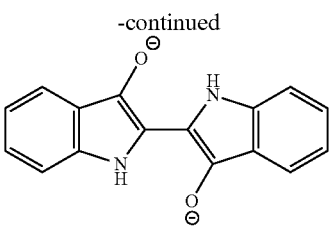

Thus, the one or more modification is designed to enhance the aqueous solubility of the dye derivative lacking the modification. The term, "enhance" as used herein refers to improving the solubility to the dye derivative lacking the modification, improving the affinity of the indigo compound to a substrate, as defined herein, providing an indigo compound that converts to indigo upon removing the modification, or combinations thereof. In some embodiments, the modification is removed by hydrolysis.

In some embodiments, the modification enhances the aqueous water-solubility of the indigo derivative. The modification is made at any position on the indigo backbone or the indigo derivative. In some embodiments, one or more modification is a substituent on indigo or the indigo derivative. In other embodiments, the substituent is on one or more carbon atom. In further embodiments, the substituent is on one or both nitrogen atom. In yet other embodiments, the substituent is on one or both oxygen atoms. The modification may be selected by one skilled in the art and includes, without limitation, acyl, alkyl, alkoxy, amide, amine, anhydride, aryl, carbamate, CN, cycloalkyl, ester, halide, heteroaryl, heterocyclyl, imine, mesylate, $NO_2$, oxime, sulfonate, tosylate, or urea, wherein each substituent is optionally substituted. In some embodiments, the modification results in an indigo compound which is rotationally symmetrical about an axis. In other embodiments, the modification results in an indigo compound which is rotationally asymmetrical about an axis. However, the modification results in a dye compound that is not the methylsulfonate salt of (E)-3,3'-(3,3'-dioxo-[2,2'-biindoline-1,1'-diyl]-1,1'-dicarbonyl)bis(1-methylpyridin-1-ium).

The term "wt. %" or "weight %" as used herein refers to the weight of the referenced compound based on the total weight of the solution. For example, the amount of Compound A in an aqueous solution contain 0.01 wt. % of Compound A is based on the based on the total weight of the components in the aqueous solution.

The term "alkyl" is used herein to refer to both straight- and branched-chain saturated aliphatic hydrocarbon groups. In one embodiment, an alkyl group has 1 to about 10 carbon atoms, i.e., $C_{1-10}$alkyl. In another embodiment, an alkyl group has 1 to about 6 carbon atoms, i.e., $C_{1-6}$alkyl. In a further embodiment, an alkyl group has 1 to about 4 carbon atoms, i.e., $C_{1-4}$alkyl. The alkyl may be unsubstituted or substituted as described herein. The substitution may be on any carbon-atom, as permitted by the stability and valency of the substituent. In some examples, the alkyl is a methyl, ethyl, propyl, butyl, pentyl, hexyl, heptyl, octyl, nonyl, or decyl.

The term "alkoxy" as used herein refers to the O-(alkyl) group, where the point of attachment is through the oxygen-atom and the alkyl group is defined above. In some examples, the alkyl is a methoxy, ethoxy, propoxy, butoxy, pentoxy, hexoxy, heptoxy, octoxy, nonoxy, or decoxy.

"Ester" refers to a —COOR group and is bound through the C-atom. R includes, but is not limited to, alkyl, cycloalkyl, aryl, heteroaryl, or heterocyclyl.

"Acyl" refers to a —C(O)R group which is bound through the C-atom. R includes, but is not limited to, alkyl, cycloalkyl, aryl, heteroaryl, or heterocyclyl.

"Carboxyl" refers to a —C(O)OH group which is bound through the C-atom.

"Amine" refers to —$NH_2$, —NHR, or —$NR_2$ which is bound through the N-atom. Each R, independently, includes, but is not limited to, alkyl, cycloalkyl, aryl, heteroaryl, or heterocyclyl.

"Amide" refers to a —C(O)$NR_2$ group which is bound through the C-atom. Each R, independently, includes, but is not limited to, H, alkyl, cycloalkyl, aryl, heteroaryl, or heterocyclyl.

"Sulfate" refers to a —$SO_3$R group which is bound through the S-atom. Each R includes, but is not limited to, H, alkyl, cycloalkyl, aryl, heteroaryl, or heterocyclyl.

"Sulfonate" refers to a —$SO_2$R group which is bound through the S-atom. Each R includes, but is not limited to, H, alkyl, cycloalkyl, aryl, heteroaryl, or heterocyclyl.

"Carbamate" refers to a —OC(O)$NR_2$ group which is bound through the O-atom. Each R, independently, includes, but is not limited to, H, alkyl, cycloalkyl, aryl, heteroaryl, or heterocyclyl.

"Urea" refers to a —NRC(O)$NR_2$ group which is bound through the N-atom. Each R, independently, includes, but is not limited to, H, alkyl, cycloalkyl, aryl, heteroaryl, or heterocyclyl.

"Imine" refers to a —C(R)=NR group which is bound through the C-atom. R includes, but is not limited to, H, alkyl, cycloalkyl, aryl, heteroaryl, or heterocyclyl.

"Oxime" refers to a —C(R)=NOH group which is bound through the C-atom. R includes, but is not limited to, H, alkyl, cycloalkyl, aryl, heteroaryl, or heterocyclyl.

"Thioether" refers to a —SR group which is bound through the C-atom. R includes, but is not limited to, H, alkyl, cycloalkyl, aryl, heteroaryl, or heterocyclyl.

"Anhydride" refers to a —C(O)OC(O)R which is bound through the C-atom. R includes, but is not limited to, H, alkyl, cycloalkyl, aryl, heteroaryl, or heterocyclyl.

The term "halogen" are "halide" are used interchangeably and refer to Cl, Br, F, or I groups.

"Cycloalkyl" refers to a monocyclic or polycyclic radical that contains carbon and hydrogen, and may be saturated or partially unsaturated. In some embodiments, cycloalkyl groups include 3 to about 12 ring atoms, i.e., $C_{3-12}$cycloalkyl. In other embodiments, cycloalkyl groups include 3 to about 8 ring atoms, i.e., $C_{3-8}$cycloalkyl. In further embodiments, cycloalkyl groups include 5 to about 7 ring atoms, i.e., $C_{5-7}$cycloalkyl. Examples of cycloalkyl groups include, but are not limited to cyclopropyl, cyclobutyl, cyclopentyl, cyclopentenyl, cyclohexyl, cyclohexenyl, cycloheptyl, cyclooctyl, cyclononyl, cyclodecyl, norbornyl, and the like. The cycloalkyl may be unsubstituted or substituted as described herein. The substitution may be on any carbon-atom, as permitted by the stability and valency of the substituent.

"Heterocyclyl" refers to a saturated ring that comprises 3 to 12 carbon atom, i.e., $C_{3-12}$ heterocyclyl, and from 1 to 6 heteroatoms which are nitrogen, oxygen or sulfur. The heterocyclyl is a monocyclic, bicyclic, tricyclic or tetracyclic ring, which may include fused or bridged ring systems. The heteroatoms in the heterocyclyl may be optionally oxidized. The heterocyclyl may be attached to the rest of the molecule through any atom of the ring(s). In some embodiments, the heterocyclyl has 3 to about 18 ring atoms. In some embodiments, heterocyclyl groups include 4 to about 8 ring atoms. In other embodiments, heterocyclyl groups include 5 to about 7 ring atoms. In some preferred embodiments, the heterocyclyl includes, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, monosaccharidyl such as tetrahydropyranyl (glucose), thiomorpholinyl, thiamorpholinyl, 1-oxo-thiomorpholinyl, and 1,1-dioxo-thiomorpholinyl. The heterocyclyl may be unsubstituted or substituted as described herein. The substitution may be on a carbon-atom or heteroatom, as permitted by the stability and valency of the substituent.

The term "aryl" refers to 6-15 membered monocyclic, bicyclic, or tricyclic hydrocarbon ring systems, including bridged, spiro, and/or fused ring systems, in which at least one of the rings is aromatic. An aryl group may contain 6 (i.e., phenyl) or about 9 to about 15 ring atoms, such as about 6 to about 8 ring atoms or about 9 to about 11 ring atoms. In some embodiments, aryl groups include, but are not limited to, naphthyl, indanyl, indenyl, anthryl, phenanthryl, fluorenyl, 1,2,3,4-tetrahydronaphthalenyl, 6,7,8,9-tetrahydro-5H-benzocycloheptenyl, and 6,7,8,9-tetrahydro-5H-benzocycloheptenyl. The aryl may be unsubstituted or substituted as described herein. The substitution may be on any carbon-atom, as permitted by the stability and valency of the substituent.

The term "aryloxy" as used herein refers to the O-(aryl) group, where the point of attachment is through the oxygen-atom and the aryl group is defined above. In some examples, the alkyl is a phenoxy or napthoxy.

"Heteroaryl" refers to a 5- to 18-membered unsaturated or partially unsaturated radical (e.g., $C_{5-13}$heteroaryl) that includes one or more ring heteroatoms selected from nitrogen, oxygen and sulfur. In some embodiments, the heteroaryl is monocyclic, bicyclic, tricyclic or tetracyclic. In other embodiments, the heteroatom(s) in the heteroaryl are optionally oxidized. The heteroaryl may be attached to the rest of the molecule through any atom of the ring(s). In some embodiments, the heteroaryl has 3 to about 18 ring atoms. In some embodiments, heteroaryl groups include 4 to about 8 ring atoms. In other embodiments, heteroaryl groups include 5 to about 7 ring atoms. Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzoxazolyl, benzopyranyl, benzopyranonyl, benzofuranyl, benzofuranonyl, benzofurazanyl, benzothiazolyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furazanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyranyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, thiapyranyl, triazolyl, tetrazolyl, triazinyl, thieno[2,3-d]pyrimidinyl, thieno[3,2-d]pyrimidinyl, thieno[2,3-c]pyridinyl, and thiophenyl (i.e. thienyl). In some embodiments, the heteroaryl is pyridyl. In other embodiments, the heteroaryl is imidazole. The heteroaryl may be unsubstituted or substituted as described herein. The substitution may be on a carbon-atom or heteroatom, as permitted by the stability and valency of the substituent. For example, one N-atom of an imidazole may be substituted. Further, any available carbon-atom may be doubly bonded to an oxygen, i.e., the carbon-atom contains an oxo (=O) group or formyl group (CH=O).

"Substituted" means that the referenced group may have one or more additional groups, radicals or moieties attached. Such groups include, independently, alkyl, cycloalkyl, aryl, heteroaryl, heterocyclyl, alkoxy, aryloxy, OH, CN, halide, $NO_2$, $SO_3R$ (where R is H, halide, alkyl, aryl, cycloalkyl, heteroaryl, or heterocyclyl) such as $SO_3H$ or $SO_3Cl$, C(O)OR (where R is H, alkyl, aryl, cycloalkyl, heteroaryl, or heterocyclyl), OC(O)OR (where R is H, alkyl, aryl, cycloalkyl, heteroaryl, or heterocyclyl) such as $OCO_2$alkyl, OC(O)R (where R is H, alkyl, aryl, cycloalkyl, heteroaryl, or heterocyclyl) such as OC(O)alkyl, $PO_3R_2$ (where R is H, alkyl, aryl, cycloalkyl, heteroaryl, or heterocyclyl), $NR_2$ (where R is H, alkyl, aryl, cycloalkyl, heteroaryl, or heterocyclyl), or a quaternary amine such as $R=(CH_2)_z N^+(R^{10})_3 X^-$, wherein z is 1 or greater (such as z is 1 to 10, 1 to 5, 2 to 10, 2 to 8, or 1, 2, 3, 4, 5, 6, 7, 8, 9, or 10), $R^{10}$ is H, alkyl, aryl, cycloalkyl, heteroaryl, or heterocyclyl, and X is a counteranion as described herein. Examples of $R=(CH_2)_z N^-(R^{10})_3 X^-$ include, without limitation, $R^{10}$—N(CH_3)_3, $R^{10}$—N(CH_2CH_3)_3, $R^{10}$—NH(CH_3)_2, $R^{10}$—NH(CH_2CH_3)_2, $R^{10}$—NH_2CH_3, $R^{10}$—NH_2(CH_2CH_3), or $R^{10}$—NH_3. The substituents themselves may be substituted, for example, a cycloalkyl substituent may itself have a halide substituent at one or more of its ring carbons. In some embodiments, the substituents noted above may be further substituted with $NR_3$ (where R is H, OH, alkyl, aryl, cycloalkyl, heteroaryl, or heterocyclyl) such as $N(CH_3)_3$ or the like. For example, the substituent may be betainyl (OC(O)CH_2N(CH_3)_3), cholinyl (OCH_2CH_2N(CH_3)_3), or carnitinyl (OC(O)CH_2CH(OH)CH_2N(CH_3)_3). The term "optionally substituted" means optional substitution with the specified groups, radicals or moieties.

As used herein, the term "counteranion" as used herein refers to an anion which balances the charge of the base molecule. In some embodiments, any anion which provides a stable salt may be selected. In other embodiments, the anion is acetate, propionate, lactate, citrate, tartrate, succinate, fumarate, maleate, malonate, mandelate, phthalate, Cl, Br, I, F, phosphate, nitrate, sulfate, methanesulfonate, ethanesulfonate, phosphonate, napthalenesulfonate, benzenesulfonate, toluenesulfonate, camphorsulfonate, methanesulfate, ethanesulfate, napthalenesulfate, benzenesulfate, toluenesulfate, camphorsulfate, bisulfate, sulfite, or bisulfite.

In other aspects, the indigo compounds have an affinity to a substrate, as defined herein. The term "affinity to a substrate" as used herein refers to the ability of the dye compound to dye a substrate as described herein as well as leuco-indigo. In some embodiments, the affinity of the indigo compounds to a textile is equal to or within a factor of about 2 to about 3 compared with leuco-indigo. In some embodiments, the affinity is to a textile such as cotton. Such measurements may be made by quantifying the indigo content using post-treatment methods such as sodium hydrosulfite, followed by UV-Vis spectrophotometry as described in Hauser, Improved Determination of Indigo, Textile Chemist and Coloris & American Dyestuff Reporter, 32(2): 33, December 2000.

In further aspects, the indigo compounds convert to indigo upon removing the modification.

In yet other aspects, the indigo compound is not:
(i) N,N'-dinicotinoyl-[2,2'-biindolinylidene]-3,3'-dione;
(i) the N'',N'''-methylpyridinium bis(methylsulfate) salt of N,N'-dinicotinoyl-[2,2'-biindolinylidene]-3,3'-dione;
(iii) N,N'-diacetyl-[2,2'-biindolinylidene]-3,3'-dione;
(iv) N,N'-dipropionyl-[2,2'-bi-indolinylidene]-3,3'-dione;
(v) N,N'-di-isobutyryl-[2,2'-biindolinylidene]-3,3'-dione;
(vi) N,N'-dipivaloyl-[2,2'-biindolinylidene]-3,3'-dione;
(vii) N,N'-bis(cyclohexylcarbonyl)-2,2'-bi-indolinylidene-3,3'-dione;
(viii) N,N'-bis(3-phenylpropionyl)-2,2'-bi-indolinylidene-3,3'-dione;
(ix) N,N'-bis(ethoxycarbonylacetyl)-2,2'-bi-indolinylidene-3,3'-dione;
(x) N,N'-bis(2-phenylacetyl)-[2,2'-bi-indolinylidene]-3,3'-dione;
(xi) N,N'-bis-(p-methoxyphenylacetyl)2,2'-bi-indolinylidene-3,3'-dione;
(xii) N,N'-bis(1-naphthylacetyl)-2,2'-bi-indolinylidene-3,3'-dione;
(xiii) N,N'-bis(2-phenylbutyryl)-2,2'-indolinylidene-3,3'-dione; or
(xiv) (E)-1,1'-di(adamantane-1-carbonyl)-[2,2'-biindolinylidene]-3,3'-dione.

Thus, in some embodiments, the compound is of Formula (I) or a salt thereof.

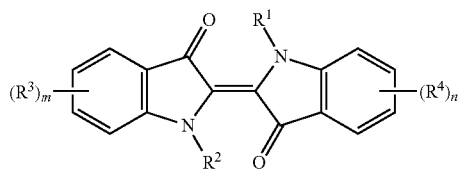

(I)

$R^1$ and $R^2$ may be the same or differ. In some embodiments, one of $R^1$ and $R^2$ is H. In further embodiments, one of $R^1$ and $R^2$ is $SO_3H$.

$R^1$ and $R^2$ may be, independently, H, $SO_3R^C$, $SO_2R^C$, $PO_3(R^C)_2$, C(O)-(optionally substituted $C_{1-9}$glycolyl), C(O)-(optionally substituted $C_{1-6}$alkyl), C(O)-(optionally substituted $C_{1-6}$hydroxyalkyl), C(O)O-(optionally substituted $C_{1-9}$glycolyl), C(O)-(optionally substituted heteroaryl), C(O)-(optionally substituted aryl), C(O)-(optionally substituted heterocyclyl), C(O)NR$^A$R$^B$, C(O)O-(optionally substituted $C_{1-6}$alkyl), C(O)O-(optionally substituted $C_{1-6}$hydroxyalkyl), C(O)O-(optionally substituted heteroaryl), C(O)O-(optionally substituted aryl), or C(O)O-(optionally substituted heterocyclyl). In some embodiments, $R^1$ and $R^2$ are, independently, H, $SO_3R^C$, $SO_2R^C$, $PO_3(R^C)_2$, C(O)-(optionally substituted $C_{1-9}$glyco-lyl), C(O)-(optionally substituted $C_{1-6}$hydroxyalkyl), C(O)-(optionally substituted $C_{1-9}$glycolyl), C(O)-(optionally substituted aryl), C(O)-(optionally substituted heterocyclyl), C(O)NR$^A$R$^B$, C(O)O-(optionally substituted $C_{1-6}$alkyl), C(O)O-(optionally substituted $C_{1-6}$hydroxyalkyl), C(O)O-(optionally substituted aryl), C(O)O-(optionally substituted heteroaryl), C(O)O-(optionally substituted aryl), or C(O)O-(optionally substituted heterocyclyl).

In some embodiments, $R^1$ is C(O)-(optionally substituted alkyl) such as C(O)($C_{1-6}$alkyl substituted with an ester such as C(O)—($C_{1-6}$alkoxy) or C(O)($C_{1-6}$alkyl substituted with aryl such. In other embodiments, $R^1$ is C(O)-(optionally substituted alkyl) such as C(O)($C_{1-6}$alkyl substituted with an ester such as C(O)methoxy, C(O)propoxy, C(O)butoxy, C(O)pentoxy, or C(O)hexoxy) or C(O)($C_{1-6}$alkyl substituted with an aryl such as phenyl substituted with alkyl, cycloalkyl, aryl, heteroaryl, heterocyclyl, alkoxy, aryloxy, OH, CN, or halide, substituted naphthyl, indanyl, indenyl, anthryl, phenanthryl, fluorenyl, 1,2,3,4-tetrahydronaphthalenyl, 6,7,8,9-tetrahydro-5H-benzocycloheptenyl, or 6,7,8,9-tetrahydro-5H-benzocycloheptenyl; C(O)—($C_{3-6}$alkyl such as n-propyl, n-butyl, i-butyl, pentyl, or hexyl). In further embodiments, $R^1$ is C(O)NR$^A$R$^B$, where $R^A$ and $R^B$ are, independently, H, optionally substituted $C_{1-6}$alkyl, optionally substituted $C_{1-6}$hydroxyalkyl, or optionally substituted aryl. In still other embodiments, $R^1$ is C(O)-(optionally substituted heteroaryl). In yet further embodiments, $R^1$ is C(O)O-(optionally substituted heteroaryl). In other embodiments, $R^1$ is C(O)-(optionally substituted aryl). In further embodiments, $R^1$ is C(O)O-(optionally substituted aryl). In yet other embodiments, $R^1$ is C(O)-(optionally substituted heterocyclyl). In other embodiments, $R^1$ is $SO_3H$. Preferably, $R^1$ is C(O)-(optionally substituted pyridyl), such as C(O)-(optionally substituted 2-pyridyl), C(O)-(optionally substituted 3-pyridyl), or C(O)-(optionally substituted 4-pyridyl). In further embodiments, the pyridyl is substituted with one or more $C_{1-6}$alkyl, such as methyl or ethyl. Preferably, the pyridyl is substituted on the N-atom of the pyridyl ring. In other embodiments, $R^1$ is C(O)-(optionally substituted aryl) such as C(O)-(optionally substituted phenyl). Preferably, the phenyl of the $R^1$ group is substituted with one or more $SO_3H$, $SO_3Cl$, $NO_2$, $NH_2$, OH, halide, alkyl, aryl, cycloalkyl, heteroaryl, or heterocyclyl. In yet further embodiments, $R^1$ is C(O)NR$^A$R$^B$, wherein one or both of $R^A$ and $R^B$ is H, optionally substituted $C_{1-6}$hydroxyalkyl such as methylhydroxy, ethylhydroxy, propylhydroxy, butylhydroxy, pentylhydroxy, or hexylhydroxy, or optionally substituted $C_{1-6}$alkyl such as $CH_2C(O)OH$, $CH_2CH_2C(O)OH$, $CH_2CH_2CH_2C(O)OH$. In still other embodiments, $R^1$ is C(O)O-(optionally substituted heterocyclyl) such as C(O)O-(optionally substituted succinic anhydride). In further embodiments, $R_1$ is C(O)O-(optionally substituted alkyl) such as C(O)O(alkyl substituted with heterocyclyl) such as C(O)O(alkyl substituted with a monosaccharide such as glucosyl). In other embodiments, $R^1$ is C(O)(optionally substituted $C_{1-6}$hydroxyalkyl) such as $C(O)CH_2OH$, $C(O)CH_2CH_2OH$, $C(O)CHOHCH_2OH$, $C(O)CH_2CHOHCH_3$, or $C(O)CH_2CHOHCH_2OH$. In yet other embodiments, $R^1$ is C(O)O(optionally substituted $C_{1-6}$hydroxyalkyl) such as $C(O)OCH_2OH$, $C(O)OCH_2CH_2OH$, $C(O)OCHOHCH_2OH$, $C(O)OCH_2CHOHCH_3$, or $C(O)OCH_2CHOHCH_2OH$. In further embodiments, $R^1$ is C(O)O(optionally substituted $C_{1-9}$glycol) such as $C(O)OCH_2OCH_3$, $C(O)(OCH_2CH_2)_2OCH_3$, or $C(O)(OCH_2CH_2)_3OCH_3$. In still further embodiments, $R^1$ is $SO_3R^C$, where $R^C$ is H, OH, optionally substituted $C_{1-6}$alkyl, optionally substituted $C_{3-8}$cycloalkyl, optionally substituted aryl, optionally substituted heteroaryl, or optionally substituted heterocyclyl such as H, OH, optionally substituted $C_{1-6}$alkyl, or optionally substituted aryl. For example, $R^C$ in $SO_3R^C$ is OH. In other embodiments, $R^1$ is $SO_2R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_2R^C$ is aryl substituted with C(O)OH.

In some embodiments, $R^2$ is C(O)-(optionally substituted alkyl) such as $C(O)(C_{1-6}$alkyl substituted with an ester such as $C(O)C_{1-6}$alkoxy). In other embodiments, $R^2$ is C(O)-(optionally substituted alkyl) such as $C(O)(C_{1-6}$alkyl substituted with an ester such as C(O)methoxy, C(O)propoxy, C(O)butoxy, C(O)pentoxy, or C(O)hexoxy) or $C(O)(C_{1-6}$alkyl substituted with an aryl such as (phenyl substituted with alkyl, cycloalkyl, aryl, heteroaryl, heterocyclyl, alkoxy, aryloxy, OH, CN, or halide), substituted naphthyl, indanyl, indenyl, anthryl, phenanthryl, fluorenyl, 1,2,3,4-tetrahydronaphthalenyl, 6,7,8,9-tetrahydro-5H-benzocycloheptenyl, or 6,7,8,9-tetrahydro-5H-benzocycloheptenyl; C(O)—($C_{3-8}$alkyl such as n-propyl, n-butyl, i-butyl, pentyl, or hexyl). In other embodiments, $R^2$ is C(O)O-(optionally substituted alkyl). In further embodiments, $R^2$ is C(O)N-$R^A R^B$, where $R^A$ and $R^B$ are, independently, H or optionally substituted $C_{1-6}$alkyl, or optionally substituted aryl. In still other embodiments, $R^2$ is C(O)-(optionally substituted heteroaryl). In yet further embodiments, $R^2$ is C(O)O-(optionally substituted heteroaryl). In other embodiments, $R^2$ is C(O)-(optionally substituted aryl). In further embodiments, $R^2$ is C(O)O-(optionally substituted aryl). In yet other embodiments, $R^2$ is C(O)-(optionally substituted heterocyclyl). In still further embodiments, $R^2$ is C(O)O-(optionally substituted heterocyclyl). In other embodiments, $R^2$ is $SO_3H$. Preferably, $R^2$ is C(O)-(optionally substituted pyridyl), such as C(O)-(optionally substituted 2-pyridyl), C(O)-(optionally substituted 3-pyridyl), or C(O)-(optionally substituted 4-pyridyl). In further embodiments, the pyridyl is substituted with one or more $C_{1-6}$alkyl, such as methyl or ethyl. Preferably, the pyridyl is substituted on the N-atom of the pyridyl ring. In other embodiments, $R^2$ is C(O)-(optionally substituted aryl) such as C(O)-(optionally substituted phenyl). Preferably, the phenyl of the $R^2$ group is substituted with one or more $SO_3H$, $SO_3Cl$, $NO_2$, $NH_2$, OH, halide, alkyl, aryl, cycloalkyl, heteroaryl, heterocyclyl and as substituents. In yet further embodiments, $R^2$ is $C(O)NR^A R^B$, wherein one or both of $R^A$ and $R^B$ is H, optionally substituted $C_{1-6}$hydroxyalkyl such as methylhydroxy, ethylhydroxy, propylhydroxy, butylhydroxy, pentylhydroxy, or hexylhydroxy, or optionally substituted $C_{1-6}$alkyl such as $CH_2C(O)OH$, $CH_2CH_2C(O)OH$, $CH_2CH_2CH_2C(O)OH$. In still other embodiments, $R^2$ is C(O)O-(optionally substituted heterocyclyl) such as C(O)O-(optionally substituted succinic anhydride).

In further embodiments, $R^2$ is C(O)O-(optionally substituted alkyl) such as C(O)O(alkyl substituted with heterocyclyl) such as C(O)O(alkyl substituted with a monosaccharide such as glucosyl). In other embodiments, $R^2$ is C(O)(optionally substituted $C_{1-6}$hydroxyalkyl) such as $C(O)CH_2OH$, $C(O)CH_2CH_2OH$, $C(O)CHOHCH_2OH$, $C(O)CH_2CHOHCH_3$, or $C(O)CH_2CHOHCH_2OH$. In yet other embodiments, $R^2$ is C(O)O(optionally substituted $C_{1-6}$hydroxyalkyl) such as $C(O)OCH_2OH$, $C(O)OCH_2CH_2OH$, $C(O)OCHOHCH_2OH$, $C(O)OCH_2CH_2OH$, $C(O)OCH_2OCH_3$, or $C(O)OCH_2CHOHCH_2OH$. In further embodiments, $R^2$ is C(O)O(optionally substituted $C_{1-9}$glycol) such as C(O)OCH$_2$CH$_2$OCH$_3$, $C(O)(OCH_2CH_2)_2OCH_3$, or $C(O)(OCH_2CH_2)_3OCH_3$. In still further embodiments, $R^2$ is $SO_3R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_3R^C$ is aryl substituted with C(O)OH. In other embodiments, $R^2$ is $SO_2R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_2R^C$ is aryl substituted with C(O)OH.

In certain embodiments, $R^3$ and $R^4$ are selected such that they do not affect the properties afforded by the $R^1$ and/or $R^2$ groups, i.e., solubility and hydrolysis to name a few. In some embodiments, $R^3$ and $R^4$ are, independently, H, halide, optionally substituted $C_{1-6}$alkyl, optionally substituted $C_{1-6}$alkoxy, $SO_3H$, or optionally substituted aryl. In some embodiments, $R^3$ is halide such as Cl, Br, F, or I. In some embodiments, $R^4$ is halide such as Cl, Br, F, or I. In other embodiments, $R^3$ is $C_{1-6}$alkyl such as methyl, ethyl, propyl, butyl, pentyl, or hexyl. In further embodiments, $R^3$ is $C_{1-6}$alkoxy, such as methoxy, ethoxy, propoxy, butoxy, pentoxy, or hexoxy.

In still other embodiments, $R^3$ is $SO_3H$. In yet further embodiments, $R^4$ is $C_{1-6}$alkyl such as methyl, ethyl, propyl, butyl, pentyl, or hexyl. In other embodiments, $R^4$ is $C_{1-6}$alkoxy, such as methoxy, ethoxy, propoxy, butoxy, pentoxy, or hexoxy. In further embodiments, $R^4$ is $SO_3H$.

In the structure of Formula (I), m and n are, independently, 0 to 4. In some embodiments, m and n are the same. In other embodiments, m and n differ. In further embodiments, m is 0. In yet other embodiments, n is 0. In still other embodiments, m and n are 1. In yet further embodiments, m and n are 2. In other embodiments, m and n are 3. In further embodiments, m and n are 4.

In some aspects, $R^3$ and $R^4$ are not H, when $R^1$ and $R^2$ are both 1-methyl-pyrid-3-yl or pyrid-3-yl. However, the compound where $R^3$ and $R^4$ are H, when $R_1$ and $R^2$ are both 1-methyl-pyrid-3-yl or pyrid-3-yl, i.e., the following compounds, may be used in the methods described herein.
(i) N,N'-dinicotinoyl-[2,2'-biindolinylidene]-3,3'-dione;
(i) the N''',N'''-methylpyridinium bis(methylsulfate) salt of N,N'-dinicotinoyl-[2,2'-biindolinylidene]-3,3'-dione;
(iii) N,N'-diacetyl-[2,2'-biindolinylidene]-3,3'-dione;
(iv) N,N'-dipropionyl-[2,2'-bi-indolinylidene]-3,3'-dione;
(v) N,N'-di-isobutyryl-[2,2'-biindolinylidene]-3,3'-dione;
(vi) N,N'-dipivaloyl-[2,2'-biindolinylidene]-3,3'-dione;
(vii) N,N'-bis(cyclohexylcarbonyl)-2,2'-bi-indolinylidene-3,3'-dione;
(viii) N,N'-bis(3-phenylpropionyl)-2,2'-bi-indolinylidene-3,3'-dione;
(ix) N,N'-bis(ethoxycarbonylacetyl)-2,2'-bi-indolinylidene-3,3'-dione;
(x) N,N'-bis(2-phenylacetyl)-[2,2'-bi-indolinylidene]-3,3'-dione;
(xi) N,N'-bis-(p-methoxyphenylacetyl)2,2'-bi-indolinylidene-3,3'-dione;
(xii) N,N'-bis(1-naphthylacetyl)-2,2'-bi-indolinylidene-3,3'-dione;
(xiii) N,N'-bis(2-phenylbutyryl)-2,2'-indolinylidene-3,3'-dione; or
(xiv) (E)-1,1'-di(adamantane-1-carbonyl)-[2,2'-biindolinylidene]-3,3'-dione.

In some preferred embodiments, the compound of Formula (I) is Formulae (I-A)-(I-I):
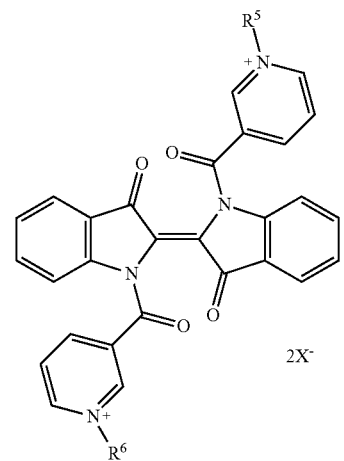
(I-A)
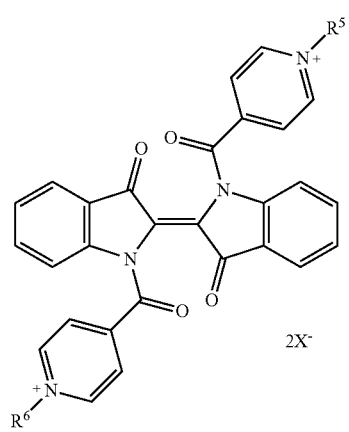
(I-B)
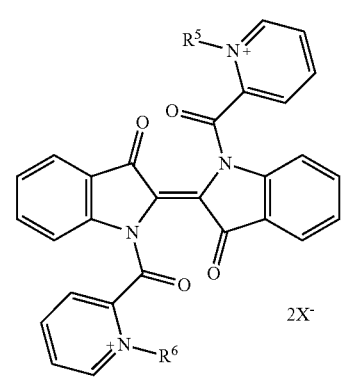
(I-C)
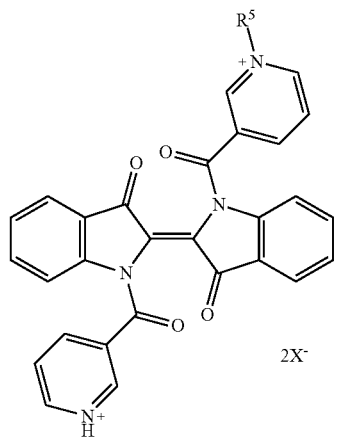
(I-D)
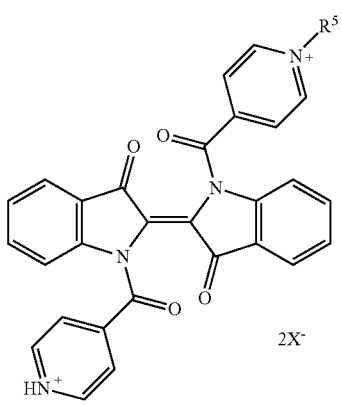
(I-E)
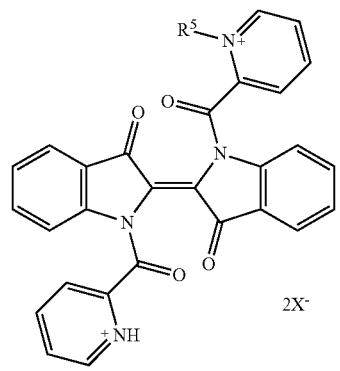
(I-F)
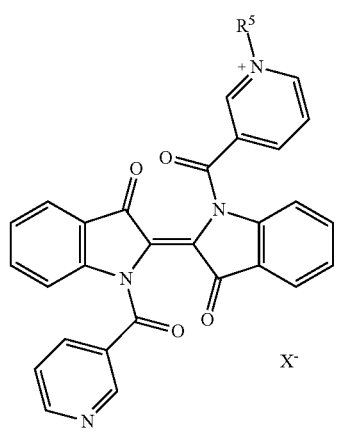
(I-G)

-continued (I-H)

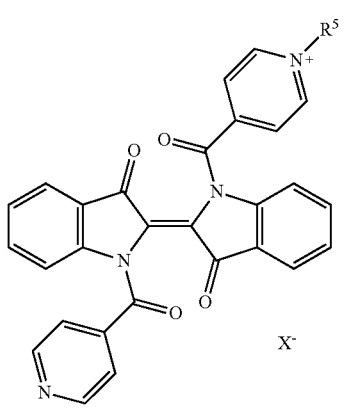

X⁻

(I-I)

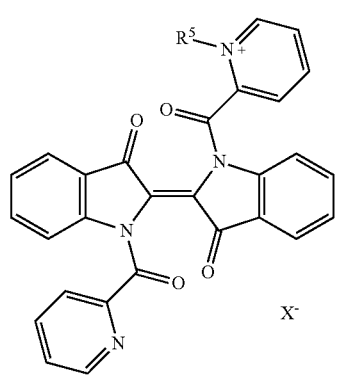

X⁻

In these structures, $R^5$ and $R^6$ are, independently, H or $C_{1-6}$alkyl and X is halide, sulfate, $C_{1-6}$alkyl sulfate, bisulfate, or phosphate. In some embodiments, $R^5$ and $R^6$ are H. In other embodiments, $R^5$ and $R^6$ are $C_{1-6}$alkyl. In further embodiments, X is halide. In still other embodiments, X is $C_{1-6}$alkyl sulfate such as $MeSO_4$. In yet further embodiments, X is bisulfate. In other embodiments, X is phosphate. For the compound of Formula (I-C), both $R^5$ and $R^6$ are not $CH_3$ when X is $CH_3SO_4^-$.

In some embodiments, preferred compounds encompassed by Formula (I) include the following.

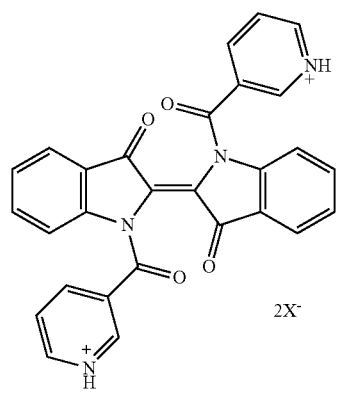

2X⁻

-continued

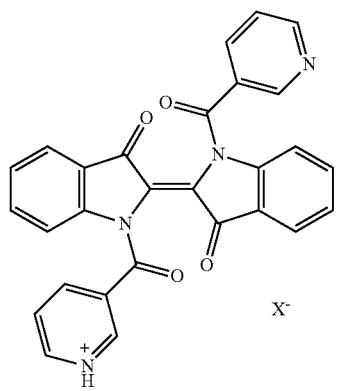

X⁻

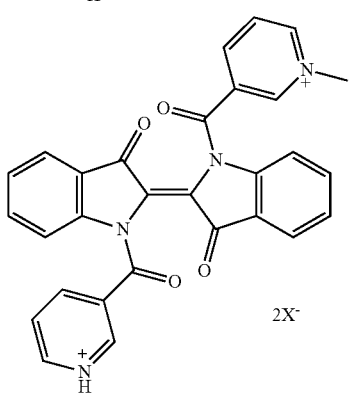

2X⁻

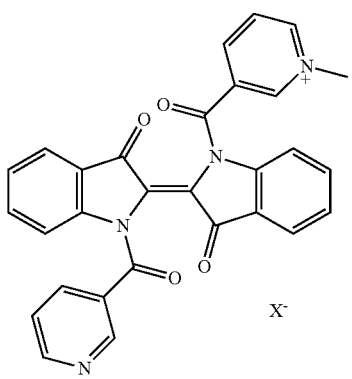

X⁻

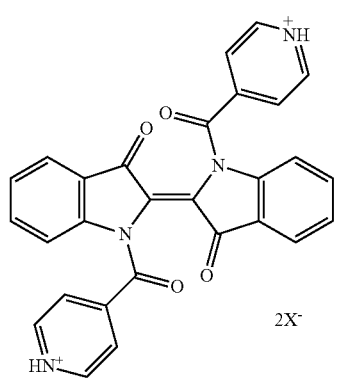

2X⁻

-continued
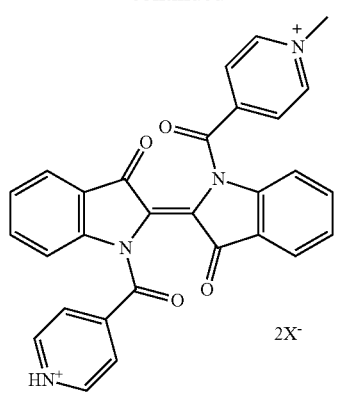
2X⁻
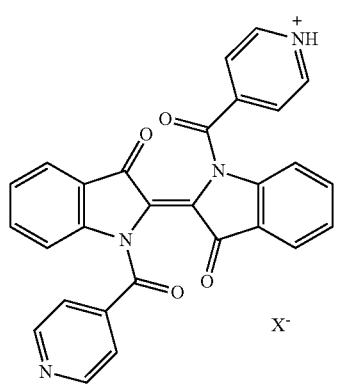
X⁻
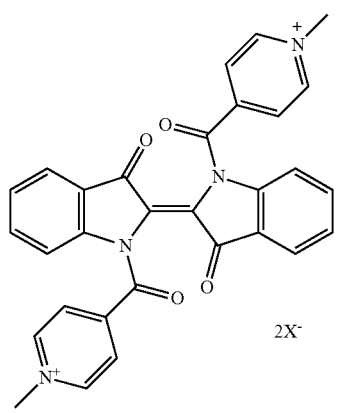
2X⁻
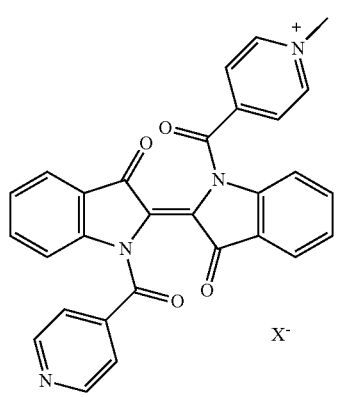
X⁻
-continued
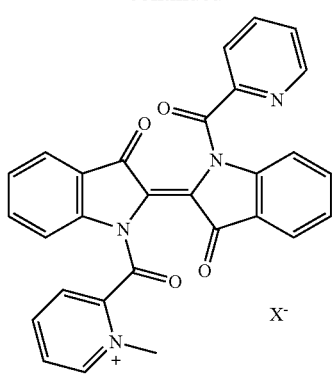
X⁻
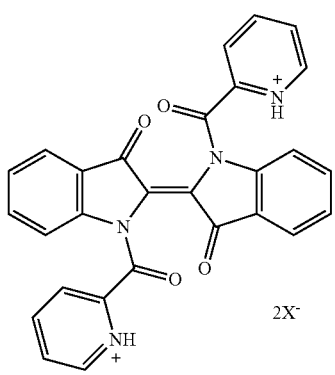
2X⁻
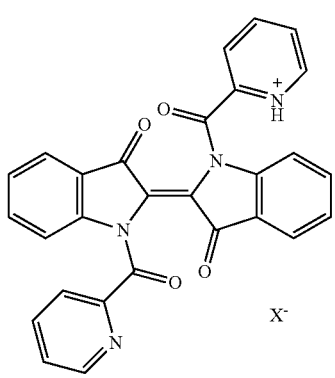
X⁻
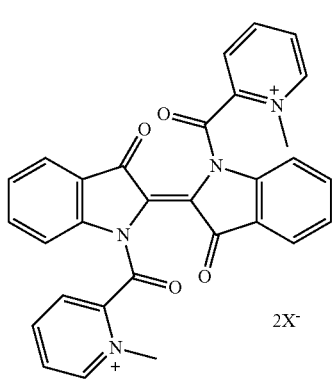
2X⁻

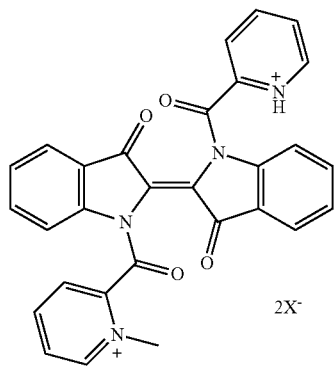
In other preferred embodiments, the compound of Formula (I) is the following:
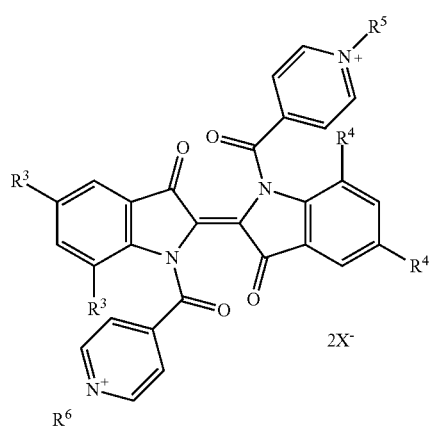
wherein X is not $CH_3SO_4$.
In some preferred embodiments, the compound of Formula (I) is Formulae (I-J)-(I-R):
(I-J)
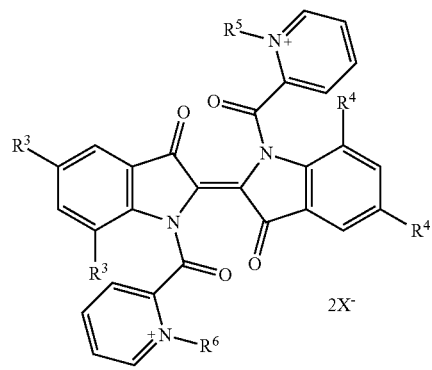
(I-K)
(I-L)
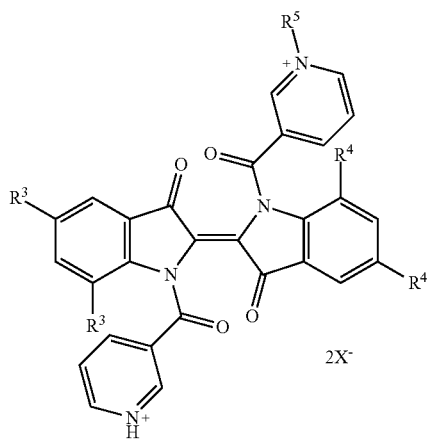
(I-M)
(I-N)
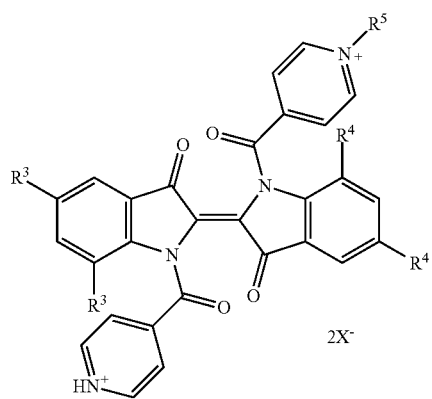

-continued (I-O)
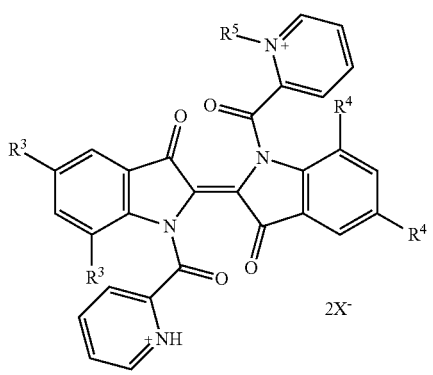
2X⁻

(I-P)
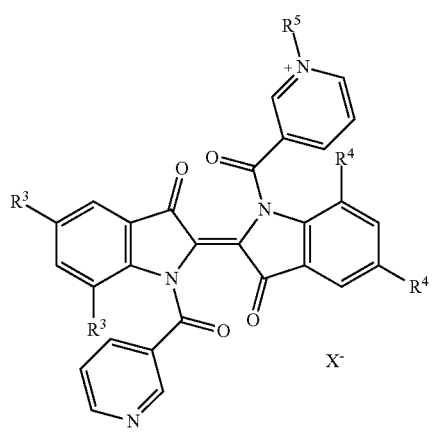
X⁻

(I-Q)
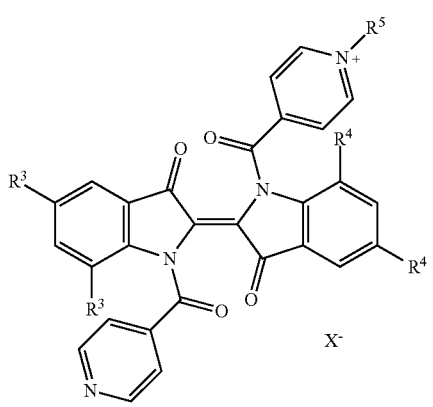
X⁻

(I-R)
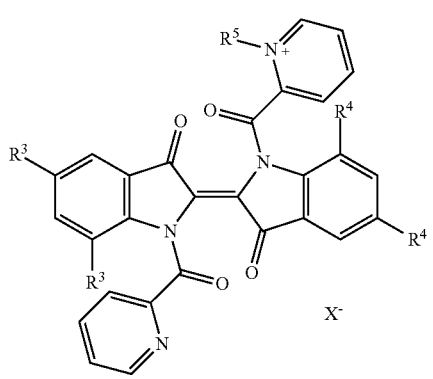
X⁻

In these structures, $R^3$ and $R^4$ are, independently, halide, preferably Br, $R^5$ and $R^6$ are, independently, H or $C_{1-6}$alkyl and X is halide, sulfate, $C_{1-6}$alkylsulfate, bisulfate, or phosphate. In some embodiments, $R^5$ and $R^6$ are H. In other embodiments, $R^5$ and $R^6$ are $C_{1-6}$alkyl. In further embodiments, X is halide. In still other embodiments, X is $C_{1-6}$alkylsulfate. In yet further embodiments, X is bisulfate. In other embodiments, X is phosphate.

In other embodiments, preferred compounds encompassed by Formula (I) are the following.

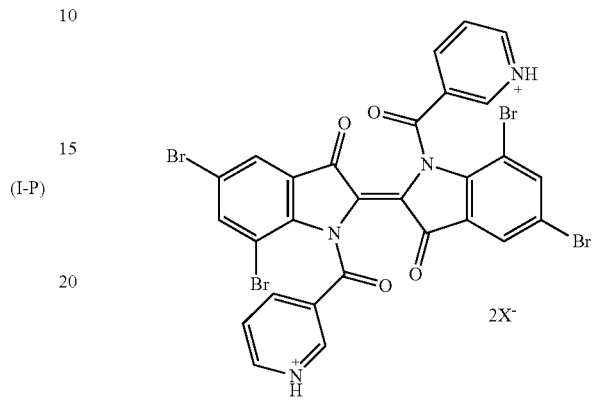
2X⁻

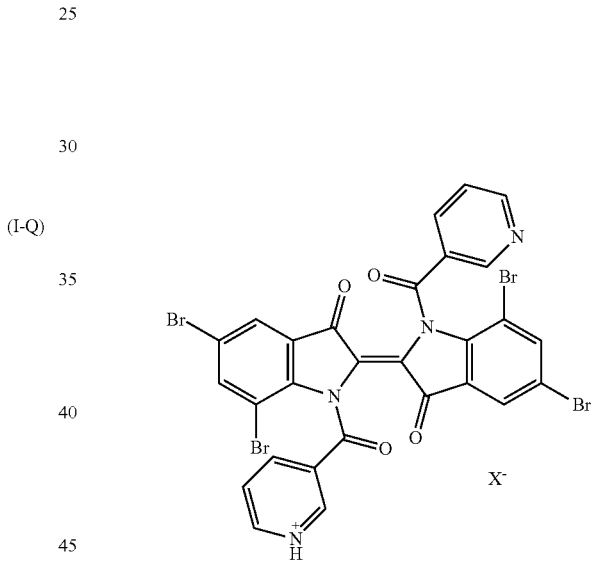
X⁻

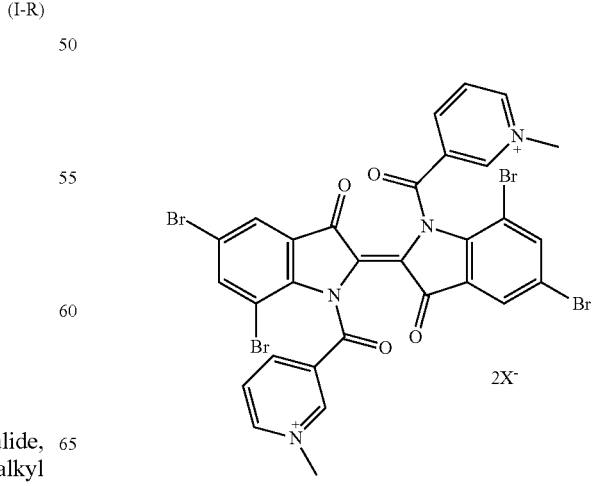
2X⁻

29
-continued
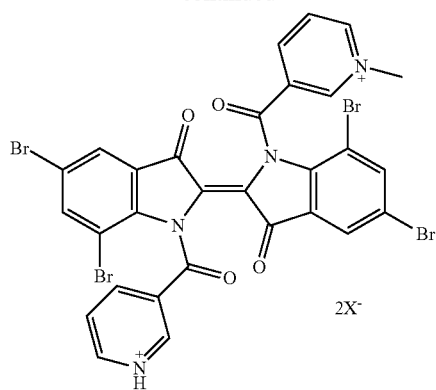
2X⁻
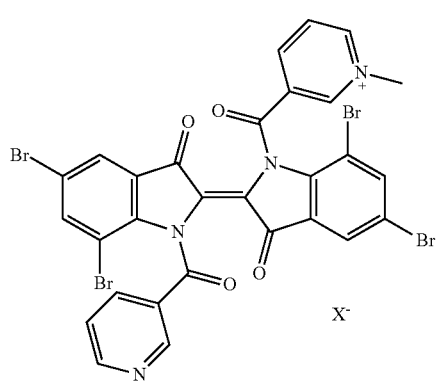
X⁻
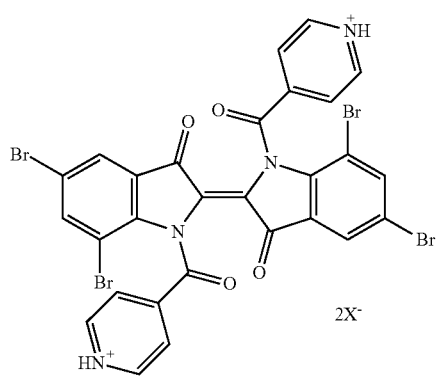
2X⁻
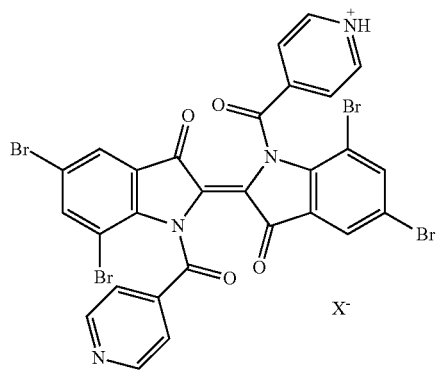
X⁻
30
-continued
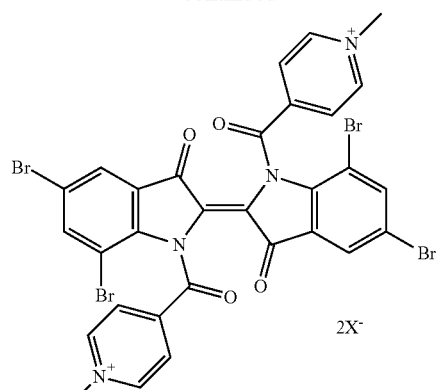
2X⁻
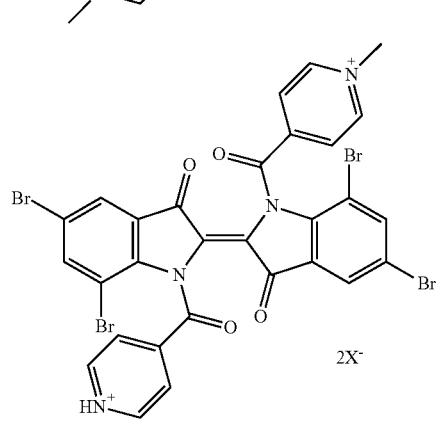
2X⁻
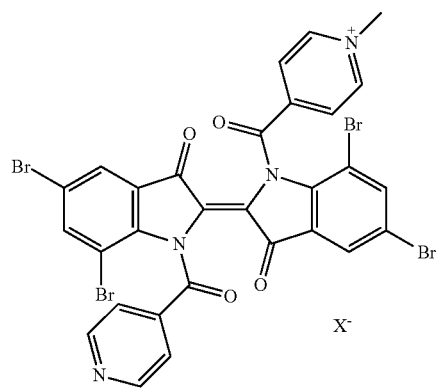
X⁻
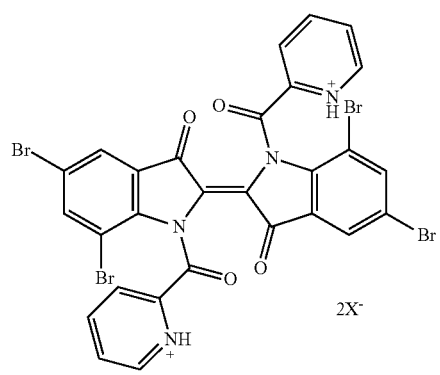
2X⁻

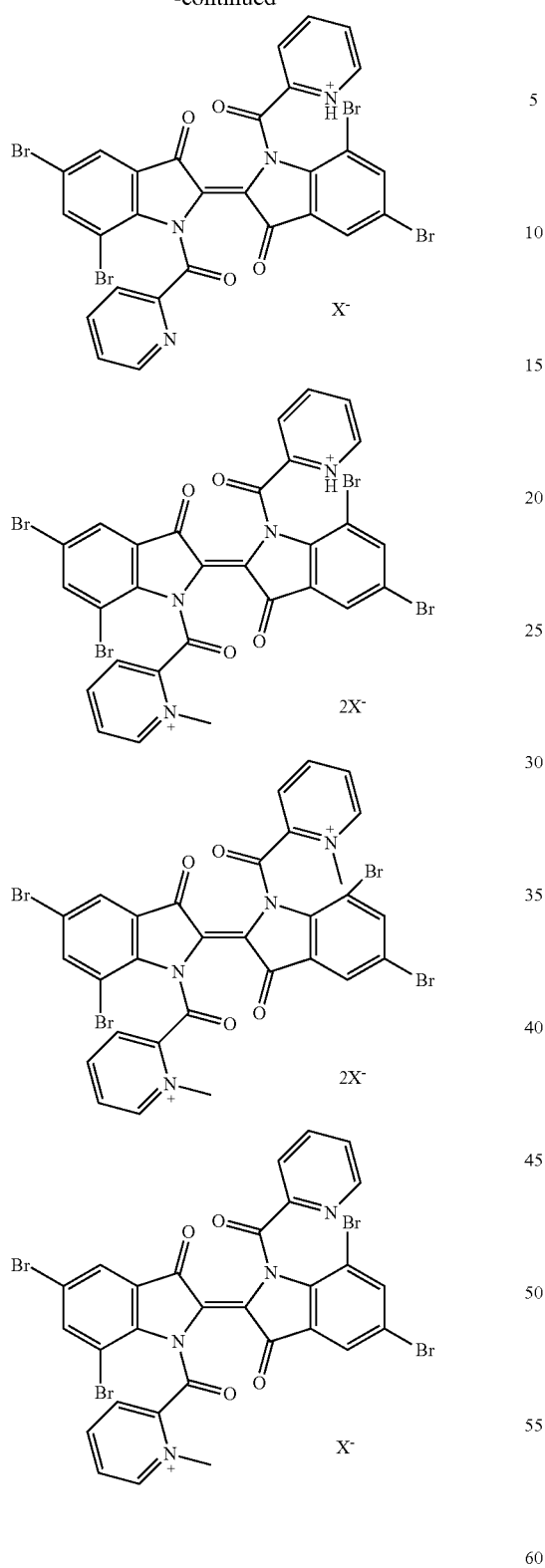
In the above compounds, X is a counteranion as described herein. In further embodiments, preferred compounds encompassed by Formula (I) include the following or a salt thereof.
In further embodiments, preferred compounds encompassed by Formula (I) are the following.

33
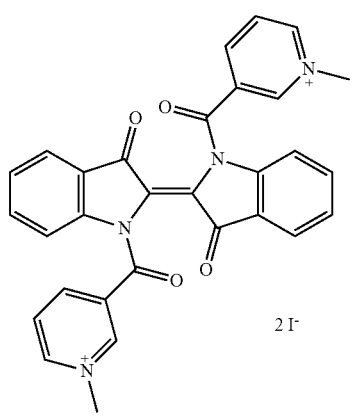
2 I⁻
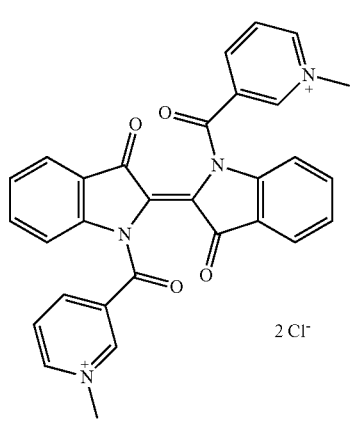
2 Cl⁻
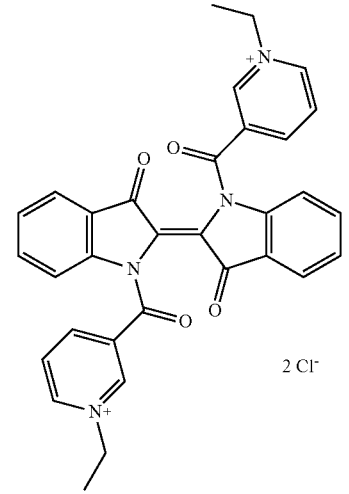
2 Cl⁻
34
-continued
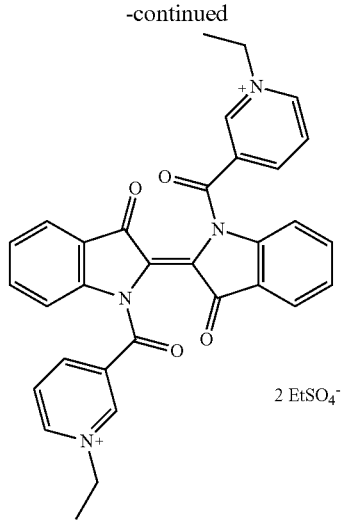
2 EtSO₄⁻
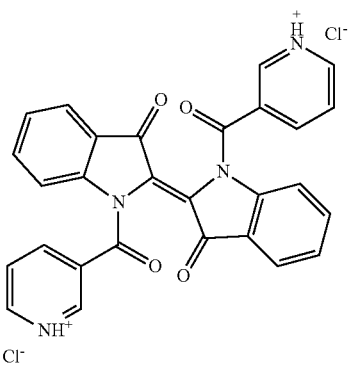
2 Cl⁻
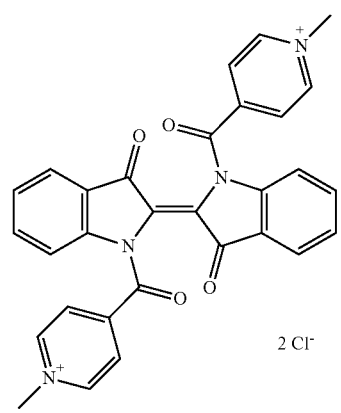
2 Cl⁻
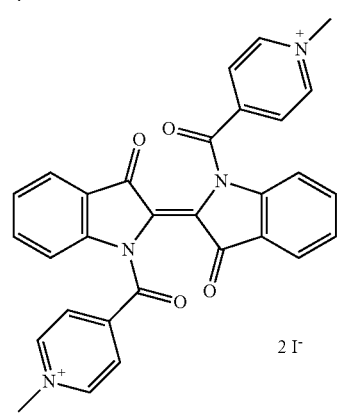
2 I⁻

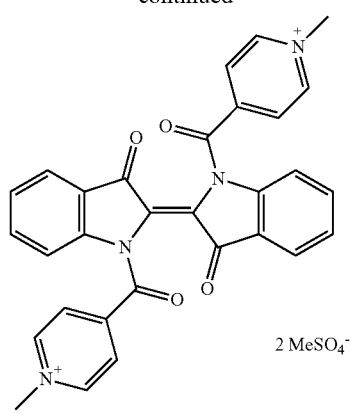
2 MeSO4-
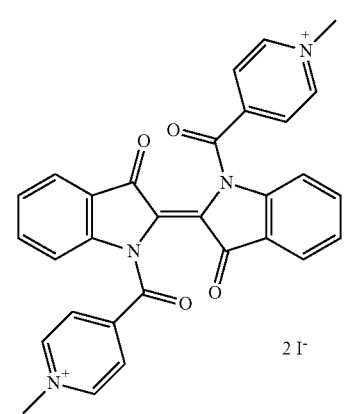
2 I-
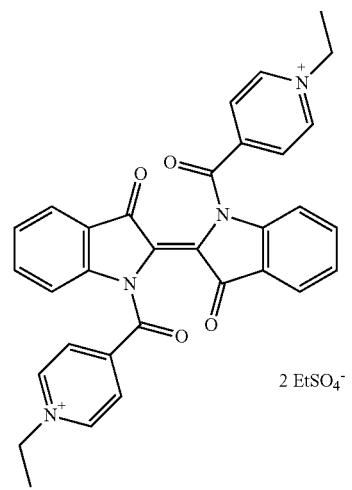
2 EtSO4-
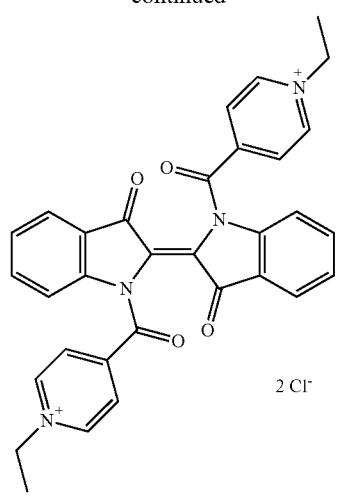
2 Cl-
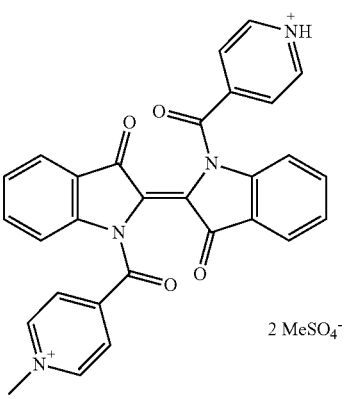
2 MeSO4-
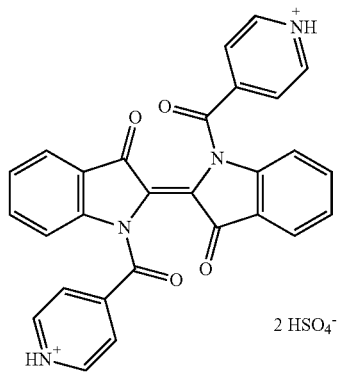
2 HSO4-
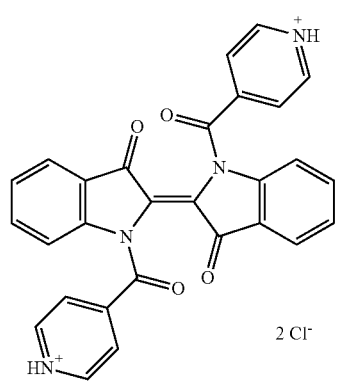
2 Cl- 37
-continued
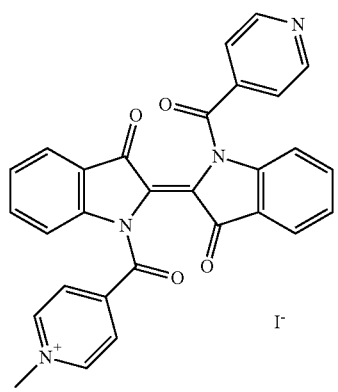
I⁻
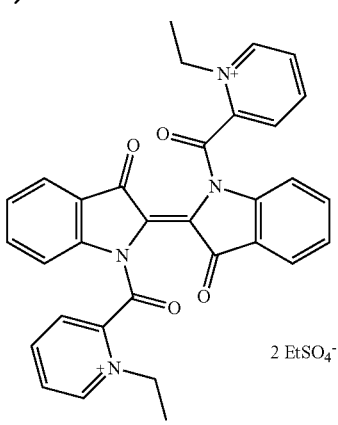
2 EtSO₄⁻
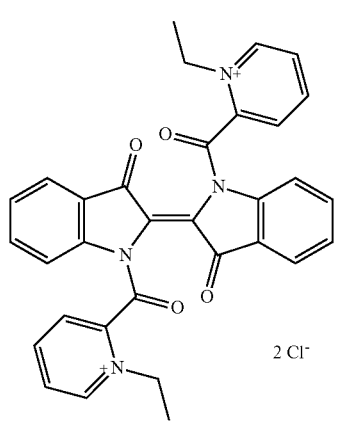
2 Cl⁻
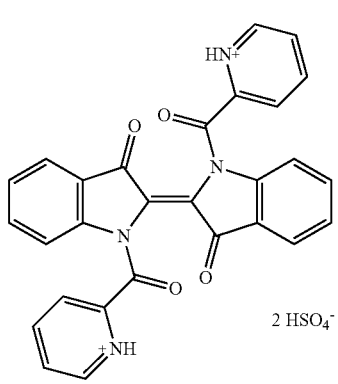
2 HSO₄⁻
38
-continued
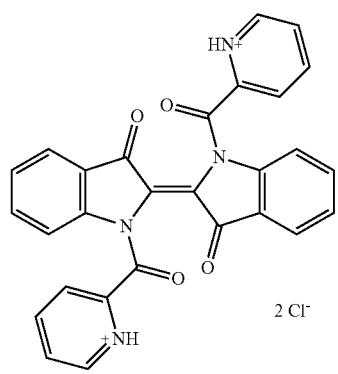
2 Cl⁻
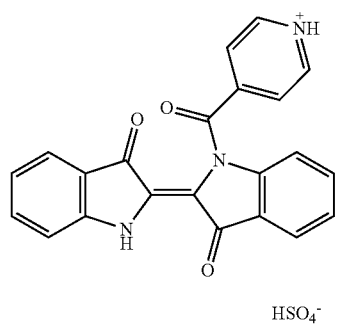
HSO₄⁻
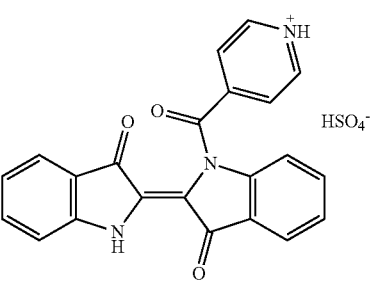
HSO₄⁻
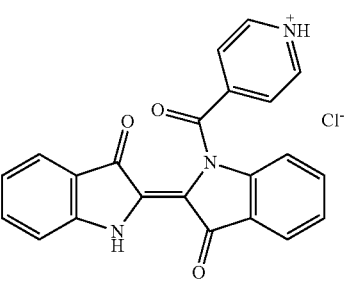
Cl⁻
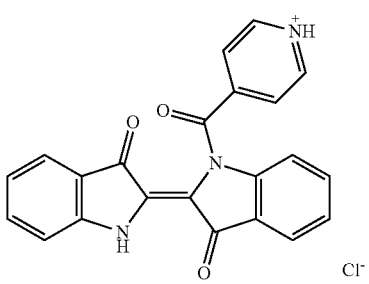
Cl⁻

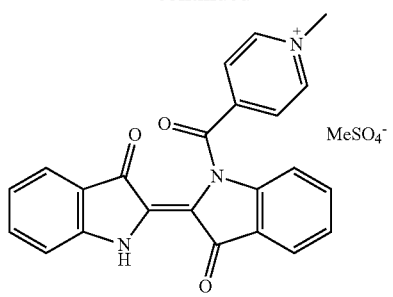

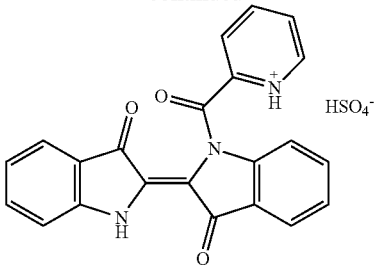

In still further embodiments, preferred compounds encompassed by Formula (I) is of Formula (I-S) or a salt thereof.

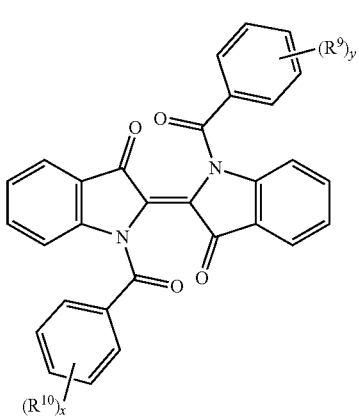

(I-S)

In this structure of Formula (I-S), $R^9$ and $R^{10}$ are, independently alkyl, cycloalkyl, aryl, heteroaryl, heterocyclyl, alkoxy, aryloxy, OH, CN, halide, $NO_2$, $SO_3R$ (where R is H, halide, alkyl, aryl, cycloalkyl, heteroaryl, or heterocyclyl) such as $SO_3H$ or $SO_3Cl$, C(O)OR (where R is H, alkyl, aryl, cycloalkyl, heteroaryl, or heterocyclyl), OC(O)OR (where R is H, alkyl, aryl, cycloalkyl, heteroaryl, or heterocyclyl) such as $OCO_2$alkyl, OC(O)R (where R is H, alkyl, aryl, cycloalkyl, heteroaryl, or heterocyclyl) such as OC(O)alkyl, $PO_3R^2$ (where R is H, alkyl, aryl, cycloalkyl, heteroaryl, or heterocyclyl), $NR_2$ (where R is H, alkyl, aryl, cycloalkyl, heteroaryl, or heterocyclyl), or a quaternary amine, x is 0-5, and y is 0-5. In some embodiments, $R^9$ and $R^{10}$ are $SO_3H$ or $SO_3C_1$. In other embodiments, $R^9$ and $R^{10}$ are $NO_2$, $NH_2$, OH, halide, $C_{1-6}$alkyl, aryl, $C_{3-8}$cycloalkyl, heteroaryl, or heterocyclyl. In further embodiments, x is 1. In yet other embodiments, y is 1. In still further embodiments, x and y are 1. In yet other embodiments, preferred compounds encompassed by Formula (I) are the following or a salt thereof.

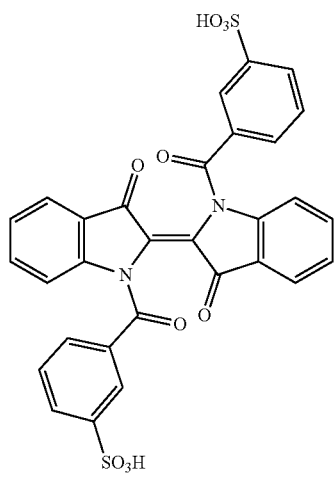

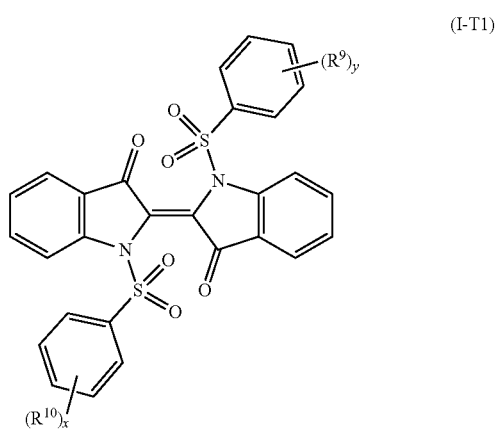

(I-T1)

In this structure of Formula (I-T1), $R^9$ and $R^{10}$ are, independently alkyl, cycloalkyl, aryl, heteroaryl, heterocyclyl, alkoxy, aryloxy, OH, CN, halide, $NO_2$, $SO_3R$ (where R is H, halide, alkyl, aryl, cycloalkyl, heteroaryl, or heterocyclyl) such as $SO_3H$ or $SO_3Cl$, C(O)R (where R is H, $NH_2$, alkyl, aryl, cycloalkyl, heteroaryl, or heterocyclyl), C(O)OR (where R is H, alkyl, aryl, cycloalkyl, heteroaryl, or heterocyclyl), OC(O)OR (where R is H, alkyl, aryl, cycloalkyl, heteroaryl, or heterocyclyl) such as $OCO_2$alkyl, OC(O)R (where R is H, alkyl, aryl, cycloalkyl, heteroaryl, or heterocyclyl) such as OC(O)alkyl, $PO_3R^2$ (where R is H, alkyl, aryl, cycloalkyl, heteroaryl, or heterocyclyl), $NR_2$ (where R is H, alkyl, aryl, cycloalkyl, heteroaryl, or heterocyclyl), or a quaternary amine, x is 0-5, and y is 0-5. In some embodiments, $R^9$ and $R^{10}$ are C(O)OR such as $CO_2H$, $C(O)NH_2$, or $NO_2$. In other embodiments, $R^9$ and $R^{10}$ are $C_{1-6}$alkyl. In further embodiments, x is 1. In yet other embodiments, y is 1. In still further embodiments, x and y are 1.

In some embodiments, a preferred compound encompassed by Formula (I) is the following or a salt thereof:

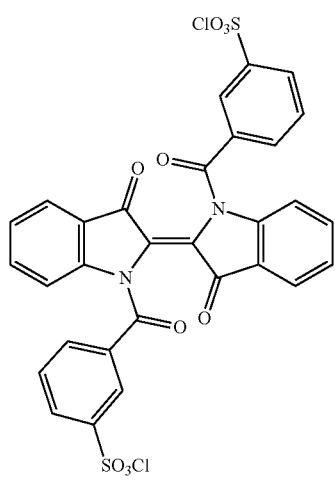

In further embodiments, preferred compounds encompassed by Formula (I) is of Formula (I-T) or a salt thereof.

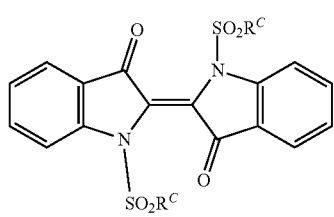

(I-T)

In this structure of Formula (I-T), each $R^C$ is, independently, H, optionally substituted $C_{1-6}$alkyl, optionally substituted $C_{3-8}$cycloalkyl, optionally substituted aryl, optionally substituted heteroaryl, or optionally substituted heterocyclyl. In some aspects, each $R^C$ is H, optionally substituted $C_{1-6}$alkyl, or optionally substituted aryl. In some aspects, $R^C$ is optionally substituted aryl such as optionally substituted phenyl. In further aspects, $R^C$ is aryl substituted with C(O)OH.

In further embodiments, preferred compounds encompassed by Formula (I) is of Formula (I-T1) or a salt thereof.

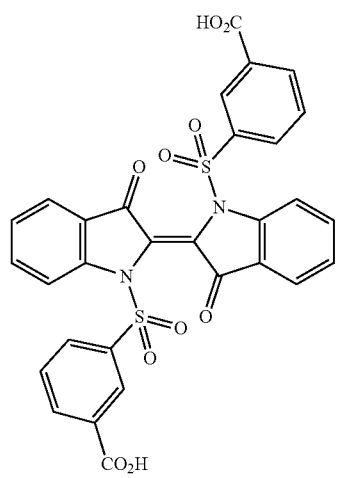 [SMILES: O=C(O)c1cccc(S(=O)(=O)N2/C(=C3\C(=O)c4ccccc4N3S(=O)(=O)c3cccc(C(=O)O)c3)C(=O)c3ccccc32)c1]

In further embodiments, preferred compounds encompassed by Formula (I) is of Formula (I-V) or a salt thereof.

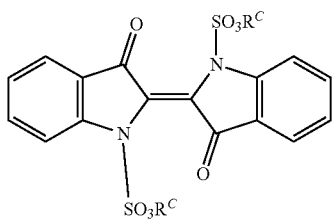

(I-V)

In this structure of Formula (I-U), each $R^C$ is, independently, H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. In other aspects, $R^C$ is H.

In some embodiments, a preferred compound encompassed by Formula (I) is the following or a salt thereof.

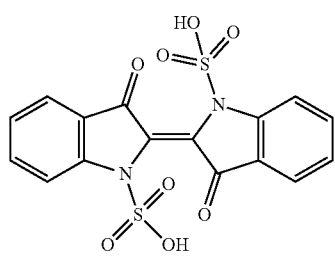 [SMILES: O=C1/C(=C2/C(=O)c3ccccc3N2S(=O)(=O)O)N(S(=O)(=O)O)c2ccccc21]

In further embodiments, preferred compounds encompassed by Formula (I) is of Formula (I-W) or a salt thereof.

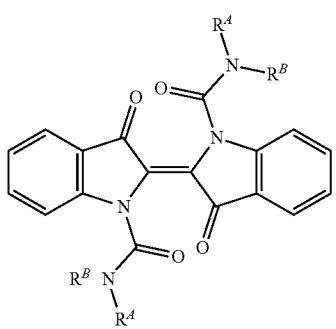

(I-W)

In this structure of Formula (I-W), one or both of $R^A$ and $R^B$ is H, optionally substituted $C_{1-6}$hydroxyalkyl, optionally substituted $C_{1-6}$alkyl, or optionally substituted aryl. In some embodiments, one or both of $R^A$ and $R^B$ is methylhydroxy, ethylhydroxy, propylhydroxy, butylhydroxy, pentylhydroxy, or hexylhydroxy. In other embodiments, one or both of $R^A$ and $R^B$ is $CH_2C(O)OH$, $CH_2CH_2C(O)OH$, or $CH_2CH_2CH_2C(O)OH$.

In further embodiments, preferred compounds encompassed by Formula (I) are the following or a salt thereof.

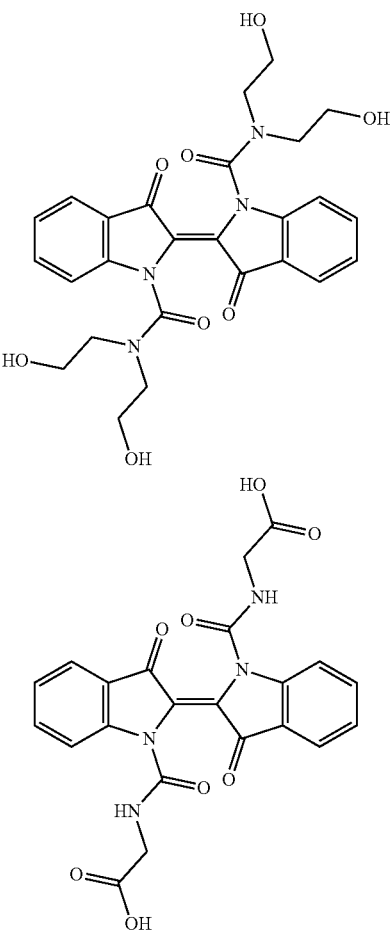

In further embodiments, preferred compounds encompassed by Formula (I) is of Formula (I-X) or a salt thereof.

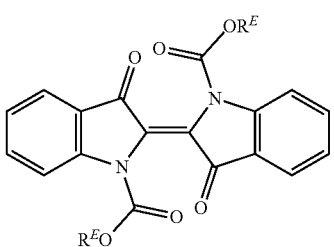

(I-X)

In this structure of Formula (I-X), one or both $R^E$ is H, optionally substituted $C_{1-6}$alkyl, $C_{1-6}$hydroxyalkyl, optionally substituted aryl, optionally substituted $C_{3-8}$cycloalkyl, optionally substituted heteroaryl, or optionally substituted heterocyclyl. In some aspects, $R^E$ is optionally substituted $C_{1-6}$alkyl such as C(O)O(alkyl substituted with heterocyclyl), e.g., C(O)O(alkyl substituted with a monosaccharide such as glucosyl). In other aspects, $R^E$ is optionally substituted $C_{1-6}$hydroxyalkyl such as $C(O)OCH_2OH$, $C(O)OCH_2CH_2OH$, $C(O)OCHOHCH_2OH$, $C(O)OCH_2CHOHCH_3$, or $C(O)OCH_2CHOHCH_2OH$. In further aspects, $R^E$ is optionally substituted heterocyclyl such as optionally substituted succinic anhydride. In yet other aspects, $R^E$ is optionally substituted $C_{1-9}$glycol such as $C(O)OCH_2CH_2OCH_3$, $C(O)(OCH_2CH_2)_2OCH_3$, or $C(O)(OCH_2CH_2)_3OCH_3$.

In other embodiments, preferred compounds encompassed by Formula (I) are the following or a salt thereof.

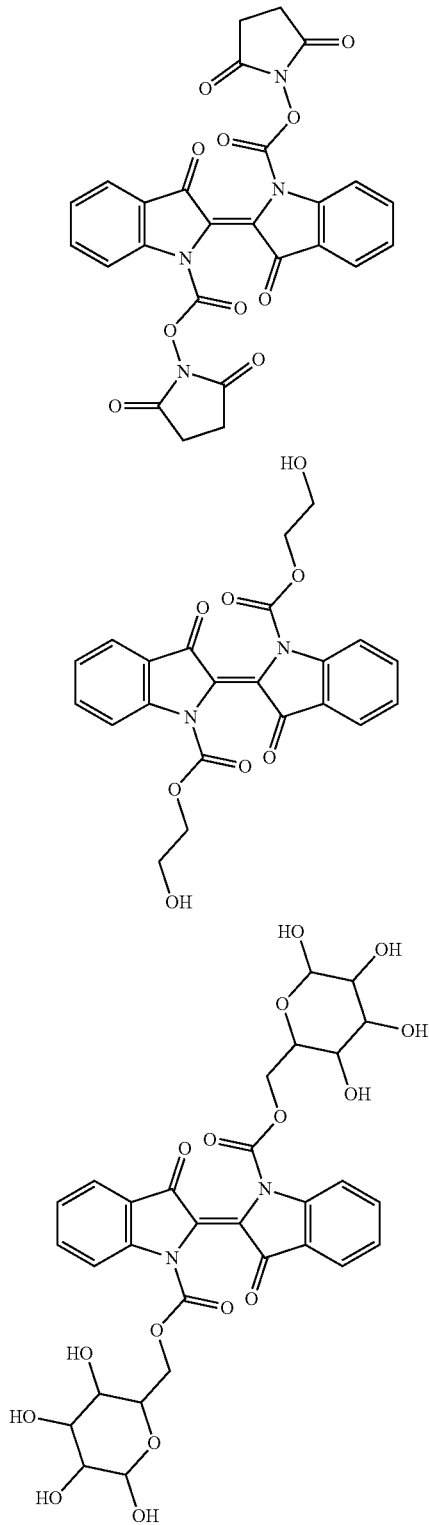

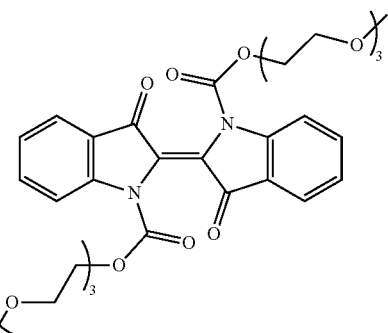

In further embodiments, preferred compounds encompassed by Formula (I) is of Formula (I-Y) or a salt thereof.

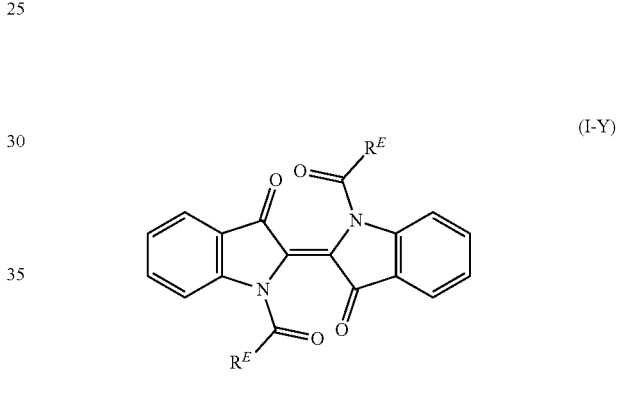

In this structure of Formula (I-X), one or both $R^E$ is H, optionally substituted $C_{1-6}$alkyl (such as substituted methyl, n-propyl, substituted i-propyl, alkyl substituted with phenyl substituted with alkyl, cycloalkyl, aryl, heteroaryl, heterocyclyl, alkoxy, aryloxy, OH, CN, or halide), alkyl substituted with naphthyl, alkyl substituted with indanyl, alkyl substituted with indenyl, alkyl substituted with anthryl, alkyl substituted with phenanthryl, alkyl substituted with fluorenyl, alkyl substituted with 1,2,3,4-tetrahydronaphthalenyl, alkyl substituted with 6,7,8,9-tetrahydro-5H-benzocycloheptenyl, or alkyl substituted with 6,7,8,9-tetrahydro-5H-benzocycloheptenyl), optionally substituted $C_{1-6}$hydroxyalkyl, optionally substituted heterocyclyl, or optionally substituted $C_{1-6}$hydroxyalkyl. In some aspects, $R^E$ is optionally substituted $C_{1-6}$hydroxyalkyl such as $C(O)CH_2OH$, $C(O)CH_2CH_2OH$, $C(O)CHOHCH_2OH$, $C(O)CH_2CHOHCH_3$, or $C(O)CH_2CHOHCH_2OH$. In other aspects, $R^E$ is optionally substituted $C_{1-6}$alkyl such as $C_{1-6}$alkyl substituted with an ester, e.g., $C(O)$methoxy, $C(O)$propoxy), $C(O)$butoxy, $C(O)$pentoxy, or $C(O)$hexoxy.

In other embodiments, preferred compounds encompassed by Formula (I) is the following or a salt thereof.

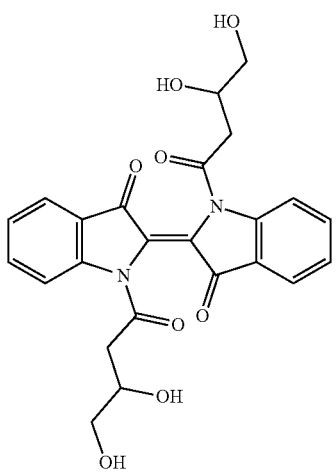 [SMILES: O=C1/C(=C2/C(=O)c3ccccc3N2C(=O)CC(O)CO)N(C(=O)CC(O)CO)c2ccccc21]

In further embodiments, the compound is of Formula (II) or a salt thereof:

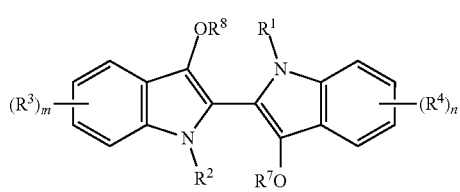

In the structure of Formula (II), all of $R^1$, $R^2$, $R^7$, and $R^8$ are not H. $R^1$ and $R^2$ may be the same or different. In some embodiments, $R^1$ or $R^2$ is H. In other embodiments, $R^1$ and $R^2$ are H.

$R^1$ and $R^2$ are, independently, H, $SO_3R^C$, $SO_2R^C$, $PO_3(R^C)_2$, C(O)-(optionally substituted $C_{1-9}$glycolyl), C(O)-(optionally substituted $C_{1-6}$alkyl), C(O)-(optionally substituted $C_{1-6}$hydroxyalkyl), C(O)-(optionally substituted $C_{1-9}$glycolyl), C(O)-(optionally substituted heteroaryl), C(O)-(optionally substituted aryl), C(O)-(optionally substituted heterocyclyl), C(O)$NR^AR^B$, C(O)O-(optionally substituted $C_{1-6}$alkyl), C(O)O-(optionally substituted $C_{1-6}$hydroxyalkyl), C(O)O-(optionally substituted heteroaryl), C(O)O-(optionally substituted aryl), or C(O)O-(optionally substituted heterocyclyl);

In some embodiments, $R^1$ is C(O)-(optionally substituted alkyl) such as C(O)($C_{1-6}$alkyl substituted with an ester such as C(O)$C_{1-6}$alkoxy). In other embodiments, $R^1$ is C(O)O-(optionally substituted alkyl). In further embodiments, $R^1$ is C(O)$NR^AR^B$, where $R^A$ and $R^B$ are, independently, H or optionally substituted $C_{1-6}$alkyl, or optionally substituted aryl. In still other embodiments, $R^1$ is C(O)-(optionally substituted heteroaryl). In yet further embodiments, $R^1$ is C(O)O-(optionally substituted heteroaryl). In other embodiments, $R^1$ is C(O)-(optionally substituted aryl). In further embodiments, $R^1$ is C(O)O-(optionally substituted aryl). In yet other embodiments, $R^1$ is C(O)-(optionally substituted heterocyclyl). In still further embodiments, $R^1$ is C(O)O-(optionally substituted heterocyclyl). In other embodiments, $R^1$ is $SO_3H$. Preferably, $R^1$ is C(O)-(optionally substituted pyridyl), such as C(O)-(optionally substituted 2-pyridyl), C(O)-(optionally substituted 3-pyridyl), or C(O)-(optionally substituted 4-pyridyl). In further embodiments, the pyridyl is substituted with one or more $C_{1-6}$alkyl, such as methyl or ethyl. Preferably, the pyridyl is substituted on the N-atom of the pyridyl ring. In other embodiments, $R^1$ is C(O)-(optionally substituted aryl) such as C(O)-(optionally substituted phenyl). Preferably, the phenyl of the $R^1$ group is substituted with one or more $SO_3H$, $SO_3Cl$, $NO_2$, $NH_2$, OH, halide, alkyl, aryl, cycloalkyl, heteroaryl, heterocyclyl and as substituents. In yet further embodiments, $R^1$ is C(O)$NR^AR^B$, wherein one or both of $R^A$ and $R^B$ is H, optionally substituted $C_{1-6}$hydroxyalkyl such as methylhydroxy, ethylhydroxy, propylhydroxy, butylhydroxy, pentylhydroxy, or hexylhydroxy, or optionally substituted $C_{1-6}$alkyl such as $CH_2C(O)OH$, $CH_2CH_2C(O)OH$, $CH_2CH_2CH_2C(O)OH$. In still other embodiments, $R^1$ is C(O)O-(optionally substituted heterocyclyl) such as C(O)O-(optionally substituted succinic anhydride). In further embodiments, $R^1$ is C(O)O-(optionally substituted alkyl) such as C(O)O(alkyl substituted with heterocyclyl) such as C(O)O(alkyl substituted with a monosaccharide such as glucosyl). In other embodiments, $R^1$ is C(O)(optionally substituted $C_{1-6}$hydroxyalkyl) such as C(O)$CH_2OH$, C(O)$CH_2CH_2OH$, C(O)CHOHCH$_2$OH, C(O)$CH_2CHOHCH_3$, or C(O)$CH_2CHOHCH_2OH$. In yet other embodiments, $R^1$ is C(O)O(optionally substituted $C_{1-6}$hydroxyalkyl) such as C(O)O$CH_2OH$, C(O)O$CH_2CH_2OH$, C(O)OCHOHCH$_2$OH, C(O)O$CH_2CHOHCH_3$, or C(O)O$CH_2CHOHCH_2OH$. In further embodiments, $R^1$ is C(O)(optionally substituted $C_{1-9}$glycol) such as C(O)O$CH_2CH_2OCH_3$, C(O)(O$CH_2CH_2)_{20}CH_3$, or C(O)(O$CH_2CH_2)_3OCH_3$. In still further embodiments, $R^1$ is $SO_3R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_3R^C$ is aryl substituted with C(O)OH. In other embodiments, $R^1$ is $SO_2R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_2R^C$ is aryl substituted with C(O)OH.

In some embodiments, $R^2$ is C(O)-(optionally substituted alkyl) such as C(O)($C_{1-6}$alkyl substituted with an ester such as C(O)$C_{1-6}$alkoxy). In other embodiments, $R^2$ is C(O)O-(optionally substituted alkyl). In further embodiments, $R^2$ is C(O)$NR^AR^B$, where $R^A$ and $R^B$ are, independently, H or optionally substituted $C_{1-6}$alkyl, or optionally substituted aryl. In still other embodiments, $R^2$ is C(O)-(optionally substituted heteroaryl). In yet further embodiments, $R^2$ is C(O)O-(optionally substituted heteroaryl). In other embodiments, $R^2$ is C(O)-(optionally substituted aryl). In further embodiments, $R^2$ is C(O)O-(optionally substituted aryl). In yet other embodiments, $R^2$ is C(O)-(optionally substituted heterocyclyl). In still further embodiments, $R^2$ is C(O)O-(optionally substituted heterocyclyl). In other embodiments, $R^2$ is $SO_3H$. Preferably, $R^2$ is C(O)-(optionally substituted pyridyl), such as C(O)-(optionally substituted 2-pyridyl), C(O)-(optionally substituted 3-pyridyl), or C(O)-(optionally substituted 4-pyridyl). In further embodiments, the pyridyl is substituted with one or more $C_{1-6}$alkyl, such as methyl or ethyl. Preferably, the pyridyl is substituted on the N-atom of the pyridyl ring. In other embodiments, $R^2$ is C(O)-(optionally substituted aryl) such as C(O)-(optionally substituted phenyl). Preferably, the phenyl of the $R^2$ group is substituted with one or more $SO_3H$, $SO_3Cl$, $NO_2$, $NH_2$, OH, halide, alkyl, aryl, cycloalkyl, heteroaryl, heterocyclyl and as substituents. In yet further embodiments, $R^2$ is C(O)$NR^AR^B$, wherein one or both of $R^A$ and $R^B$ is H, optionally substituted $C_{1-6}$hydroxyalkyl such as methylhydroxy, ethylhydroxy, propylhydroxy, butylhydroxy, pentylhydroxy, or hexylhydroxy, or optionally substituted $C_{1-6}$alkyl such as $CH_2C(O)$ OH, $CH_2CH_2C(O)OH$, $CH_2CH_2CH_2C(O)OH$. In still other embodiments, $R^2$ is C(O)O-(optionally substituted heterocyclyl) such as C(O)O-(optionally substituted succinic anhydride). In further embodiments, $R^2$ is C(O)O-(optionally substituted alkyl) such as C(O)O(alkyl substituted with heterocyclyl) such as C(O)O(alkyl substituted with a monosaccharide such as glucosyl). In other embodiments, $R^2$ is C(O)(optionally substituted $C_{1-6}$hydroxyalkyl) such as C(O) $CH_2OH$, $C(O)CH_2CH_2OH$, $C(O)CHOHCH_2OH$, $C(O)$ $CH_2CHOHCH_3$, or $C(O)CH_2CHOHCH_2OH$. In yet other embodiments, $R^2$ is C(O)O(optionally substituted $C_{1-6}$hydroxyalkyl) such as $C(O)OCH_2OH$, $C(O)OCH_2CH_2OH$, $C(O)OCHOHCH_2OH$, $C(O)OCH_2CHOHCH_3$, or $C(O)$ $OCH_2CHOHCH_2OH$. In further embodiments, $R^2$ is C(O) (optionally substituted $C_{1-9}$glycol) such as $C(O)$ $OCH_2CH_2OCH_3$, $C(O)(OCH_2CH_2)_{20}CH_3$, or $C(O)$ $(OCH_2CH_2)_3OCH_3$. In still further embodiments, $R^2$ is $SO_3R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_3R^C$ is aryl substituted with C(O)OH. In other embodiments, $R^2$ is $SO_2R^C$, where $R^C$ is H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. For example, $R^C$ in $SO_2R^C$ is aryl substituted with C(O)OH.

In some embodiments, $R^3$ and $R^4$ are, independently, H, halide, optionally substituted $C_{1-6}$alkyl, optionally substituted $C_{1-6}$alkoxy, $SO_3H$, or optionally substituted aryl. In some embodiments, $R^3$ is halide such as Cl, Br, F, or I. In some embodiments, $R^4$ is halide such as Cl, Br, F, or I. In other embodiments, $R^3$ is $C_{1-6}$alkyl such as methyl, ethyl, propyl, butyl, pentyl, or hexyl. In further embodiments, $R^3$ is $C_{1-6}$alkoxy, such as methoxy, ethoxy, propoxy, butoxy, pentoxy, or hexoxy. In still other embodiments, $R^3$ is $SO_3H$. In yet further embodiments, $R^4$ is $C_{1-6}$alkyl such as methyl, ethyl, propyl, butyl, pentyl, or hexyl. In other embodiments, $R^4$ is $C_{1-6}$alkoxy, such as methoxy, ethoxy, propoxy, butoxy, pentoxy, or hexoxy. In further embodiments, $R^4$ is $SO_3H$.

In some embodiments, $R^7$ and $R^8$ are, independently, H, $SO_3R^C$, $SO_2R^C$, $PO_3(R^C)_2$, $C(O)NR^AR^B$, C(O)-(optionally substituted $C_{1-6}$alkyl), C(O)-(optionally substituted aryl), C(O)-(optionally substituted $C_{1-9}$glycolyl), C(O)-(optionally substituted $C_{1-6}$hydroxyalkyl), C(O)-(optionally substituted heteroaryl), C(O)-(optionally substituted heterocyclyl), C(O)O-(optionally substituted $C_{1-6}$alkyl), C(O)O-(optionally substituted aryl), C(O)O-(optionally substituted $C_{1-9}$glycolyl), C(O)O-(optionally substituted $C_{1-6}$hydroxyalkyl), C(O)O-(optionally substituted heteroaryl), or C(O) O-(optionally substituted heterocyclyl). Preferably, both $R^7$ and $R^8$ are not $SO_3H$. In other embodiments, $R^7$ and $R^8$ are, independently, H, $SO_3R^C$, $SO_2R^C$, $PO_3(R^C)_2$, $C(O)NR^AR^B$, C(O)-(optionally substituted $C_{1-9}$glycolyl), C(O)-(optionally substituted heteroaryl), C(O)-(optionally substituted heterocyclyl), C(O)-(optionally substituted $C_{1-6}$hydroxyalkyl), C(O)O-(optionally substituted aryl), C(O)O-(optionally substituted $C_{1-6}$alkyl), C(O)O-(optionally substituted $C_{1-9}$glycolyl), C(O)O-(optionally substituted $C_{1-6}$hydroxyalkyl), C(O)O-(optionally substituted heteroaryl), or C(O) O-(optionally substituted heterocyclyl).

In some embodiments, $R^7$ and $R^8$ are, independently, H, $SO_3H$, or $C(O)C_{1-6}$alk-$C(O)C_{1-6}$alkoxy. In further embodiments, $R^7$ or $R^8$ is H. In further embodiments, $R^7$ and $R^8$ are H. In other embodiments, $R^7$ or $R^8$ is $SO_3H$. In yet further embodiments, $R^7$ and $R^8$ are $SO_3H$. In still other embodiment, $R^7$ and $R^8$ are not both when both $R^1$ and $R^2$ are H. In further embodiments, $R^7$ is $C(O)C_{1-6}$alk-$C(O)C_{1-6}$alkoxy such as $C(O)CH_2C(O)CH_2CH_3$. In yet other embodiments, $R^8$ is H. In still further embodiments, $R^8$ is $SO_3H$. In other embodiments, $R^7$ is $C(O)C_{1-6}$alk-$C(O)C_{1-6}$alkoxy such as $C(O)CH_2C(O)CH_2CH_3$. In still further embodiments, one or both of $R^7$ and $R^8$ are C(O)(optionally substituted heteroaryl) such as C(O)(optionally substituted pyridyl). In other embodiments, one or both of $R^7$ and $R^8$ are C(O) (optionally substituted $C_{1-6}$alkyl) such as $C(O)(C_{1-6}$alkyl substituted with $C(O)O(C_{1-6}$alkyl) such as $C(O)OCH_2CH_3$), C(O)-(substituted methyl), C(O)-(substituted t-butyl), C(O)-(optionally substituted ethyl), C(O)-(unsubstituted propyl), C(O)-(propyl substituted with alkyl, cycloalkyl, heteroaryl, heterocyclyl, alkoxy, aryloxy, OH, CN, or halide), C(O)-(optionally substituted n-butyl), C(O)-(optionally substituted i-butyl), C(O)-(optionally substituted pentyl), or C(O)-(optionally substituted hexyl). Thus, in this example, one of $R^7$ or $R^8$ is $C(O)C_{1-6}$alkC(O)$C_{1-6}$alkoxy such as $C(O)CH_2C(O)OCH_2CH_3$ and the other is H. In other examples, $R^7$ and $R^8$ is $C(O)C_{1-6}$alk-$C(O)C_{1-6}$alkoxy such as $C(O)CH_2C(O)OCH_2CH_3$. In further embodiments, one or both of $R^7$ and $R^8$ are C(O)-(optionally substituted aryl) such as C(O)-(phenyl substituted with alkyl, cycloalkyl, aryl, heteroaryl, heterocyclyl, alkoxy, aryloxy, OH, CN, or halide), C(O)-(substituted naphthyl), C(O)-(optionally substituted indanyl), C(O)-(optionally substituted indenyl), C(O)-(optionally substituted anthryl), C(O)-(optionally substituted phenanthryl), C(O)-(optionally substituted fluorenyl), C(O)-(optionally substituted 1,2,3,4-tetrahydronaphthalenyl), C(O)-(optionally substituted 6,7,8,9-tetrahydro-5H-benzocycloheptenyl), or C(O)-(optionally substituted 6,7,8,9-tetrahydro-5H-benzocycloheptenyl). For example one or both of $R^7$ and $R^8$ is C(O)(phenyl is substituted with $CO_2H$).

In the structure of Formula (II), m and n are, independently, 0 to 4. In some embodiments, m and n are the same. In other embodiments, m and n differ. In further embodiments, m is 0. In yet other embodiments, n is 0. In still other embodiments, m and n are 1. In yet further embodiments, m and n are 2. In other embodiments, m and n are 3. In further embodiments, m and n are 4.

In some aspects, the compound of Formula (II) is not:

(i) 1H,1'H-[2,2'-biindole]-3,3'-diyl diacetate;

(ii) 3,3'-bis(phenylacetoxy)-2,2'-bi-indolyl;

(iii) 3,3'-bis(p-methoxyphenylacetoxy)-2,2'-bi-indolyl;

(iv) 3,3'-bis(1-napthylacetoxy)-2,2'-bi-indolyl;

(v) 3,3'-bis(phenylbutyryloxy)-2,2'-bi-indolyl;

(vi) 3,3'-bis(pivaloyloxy)-2,2'-bi-indolyl;

(vii) 3,3'-bis(1-adamantylcarbonyloxy)-2,2'-bi-indolyl;

(viii) 3,3'-bis(ethoxycarbonylacetoxy)-2,2'-bi-indolyl.

In further embodiments, preferred compounds encompassed by Formula (II) is of Formula (II-A) or a salt thereof.

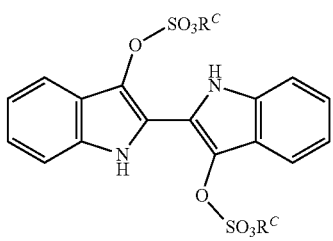

(II-A)

In this structure of Formula (II-A), each $R^C$ is, independently, H, optionally substituted $C_{1-6}$alkyl, optionally substituted $C_{3-8}$cycloalkyl, optionally substituted aryl, optionally substituted heteroaryl, or optionally substituted heterocyclyl such as H, optionally substituted $C_{1-6}$alkyl, or optionally substituted aryl. In some aspects, one $R^C$ is H. In further aspects, both $R^C$ are H.

In some embodiments, a preferred compound encompassed by Formula (II) is the following or a salt thereof.

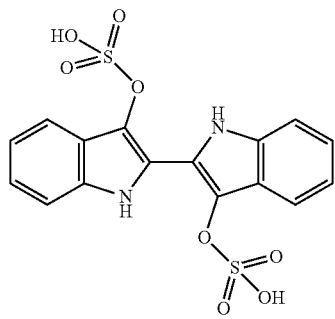 [SMILES: O=S(=O)(O)Oc1c(-c2[nH]c3ccccc3c2OS(=O)(=O)O)[nH]c2ccccc12]

In further embodiments, a preferred compound encompassed by Formula (II) is of Formula (II-B) or a salt thereof.

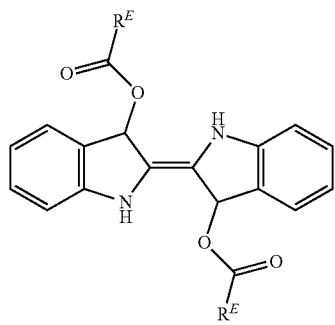

(II-B)

In this structure of Formula (II-B), one or both $R^E$ is H, optionally substituted $C_{1-6}$alkyl, or optionally substituted heteroaryl, provided that both $R^E$ are not H. In some aspects, one or both $R^E$ is optionally substituted $C_{1-6}$alkyl such as $C_{1-6}$alkyl substituted with an ester. In other aspects, one $R^E$ is optionally substituted $C(O)C_{1-6}$alk-$C(O)C_{1-6}$alkoxy such as $C(O)CH_2C(O)CH_2CH_3$ and the other is H. In further aspects, both $R^E$ are optionally substituted $C(O)C_{1-6}$alk-$C(O)C_{1-6}$alkoxy such as $C(O)CH_2C(O)CH_2CH_3$. In yet other aspects, one $R^E$ is H. In further aspects, one or both $R^E$ is optionally substituted heteroaryl such as optionally substituted pyridyl. In yet other aspects, one or both $R^E$ is substituted methyl, ethyl, propyl, n-butyl, substituted t-butyl, i-butyl, pentyl, or hexyl. In further aspects, one or both of $R^E$ is substituted phenyl substituted with alkyl, cycloalkyl, aryl, heteroaryl, heterocyclyl, aryloxy, OH, CN, or halide; substituted naphthyl; optionally substituted indanyl; optionally substituted indenyl; optionally substituted anthryl; optionally substituted phenanthryl; optionally substituted fluorenyl; optionally substituted 1,2,3,4-tetrahydronaphthalenyl; optionally substituted 6,7,8,9-tetrahydro-5H-benzocycloheptenyl; or optionally substituted 6,7,8,9-tetrahydro-5H-benzocycloheptenyl.

In still other embodiments, preferred compounds encompassed by Formula (II) are the following or a salt thereof.

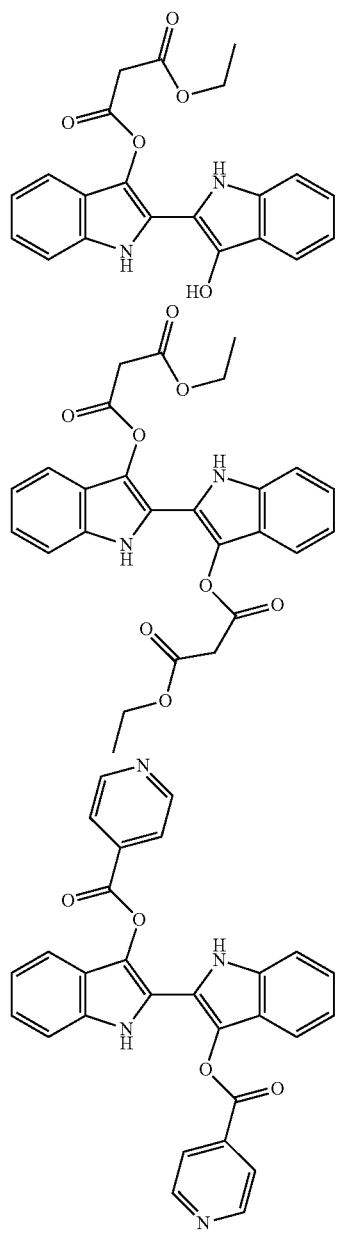

The compounds discussed above may also be used in the form of salts derived from acceptable acids, bases, alkali metals and alkaline earth metals. Thus, the compounds described herein may exist as the free base or a salt thereof.

Preferably, the salts are formed via ionic interactions, covalent interactions, or combinations thereof. For example, the salts may be formed by alkylating a heteroatom such as a N-atom within the compound and having a counteranion ionically bound to the heteroatom. The counteranion may be selected by those skilled in the art and includes those anions from the acids identified above and below.

The salts can be formed from organic and inorganic acids including, e.g., carboxylic acids such as acetic, propionic, lactic, citric, tartaric, succinic, fumaric, maleic, malic, malonic, mandelic, and phthalic acids, hydrochloric (Cl⁻), hydrobromic (Br⁻), hydroiodic (I⁻), hydrofluoric (F⁻), phosphoric, nitric, sulfuric, methanesulfonic, phosphoric, napthalenesulfonic, benzenesulfonic, toluenesulfonic, camphorsulfonic, and similarly known acceptable acids. In some embodiments, the salt is a sulfate salt, alkylsulfate salt, bisulfate salt, phosphate salt, halide salt, sulfite salt, or bisulfite salt. In further embodiments, the compounds are a sulfate salt. In other embodiments, the compound exists as an alkylsulfate salt such as a methylsulfate or ethylsulfate salt. In further embodiments, the compound exists as a halide salt such as an iodide salt, chloride salt, bromide salt, or fluoride salt. In other embodiments, the compound exists as a bisulfate salt. In yet further embodiments, the compound exists as a phosphate salt.

In other embodiments, salts may also be formed from inorganic bases, desirably alkali metal salts including, e.g., sodium, lithium, or potassium, such as alkali metal hydroxides. Examples of inorganic bases include, without limitation, sodium hydroxide, potassium hydroxide, calcium hydroxide, and magnesium hydroxide.

Salts may also be formed from organic bases, such as ammonium salts, mono-, di-, and trimethylammonium, mono-, di- and triethylammonium, mono-, di- and tripropylammonium, ethyldimethylammonium, benzyldimethylammonium, cyclohexylammonium, benzyl-ammonium, dibenzylammonium, piperidinium, morpholinium, pyrrolidinium, piperazinium, 1-methylpiperidinium, 4-ethylmorpholinium, 1-isopropylpyrrolidinium, 1,4-dimethylpiperazinium, 1 n-butyl piperidinium, 2-methylpiperidinium, 1-ethyl-2-methylpiperidinium, mono-, di- and triethanolammonium, ethyl diethanolammonium, n-butylmonoethanolammonium, tris(hydroxymethyl)methylammonium, phenylmono-ethanolammonium, diethanolamine, ethylenediamine, choline, betaine, carnitine, and the like. In one example, the base is selected from among sodium hydroxide, lithium hydroxide, potassium hydroxide, and mixtures thereof.

The compounds discussed herein may also encompass tautomeric forms of the structures provided herein, where such forms may be formed.

Embodiments of modified indigo compounds that have been found particularly useful for the dyeing of textile yarns are those that comprise an indigo compound in which at least one of the amine groups is functionalized with an amidopyridine or a salt thereof. For example, in some embodiments, the modified indigo compound may be selected from a compound having the following base structure, or a salt thereof.

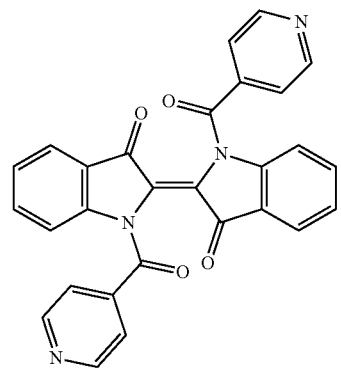 [SMILES: O=C1/C(=C2/C(=O)c3ccccc3N2C(=O)c2ccncc2)N(C(=O)c2ccncc2)c2ccccc21]

By the compound having the above-shown base structure, it is meant that each position in the above structure may include additional unshown substituents. For instance, in some embodiments, the nitrogen atom of each pyridine ring may comprise an alkane substituent, such as a methyl group, an ethyl group, or a propyl group, which is represented by R1 and R2 in the structure below. In some embodiments, the salt is formed by the nitrogen atom of the each pyridine ring acting as an anion, with the cation being selected from the group consisting of the halogens (e.g. chlorine, bromine, iodine, methyl chloride, and the like) and the sulfates, such as methyl sulfate, ethyl sulfate, and the like. For example, the anion may comprise one of the following structures.

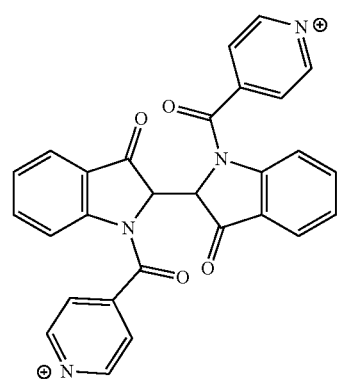

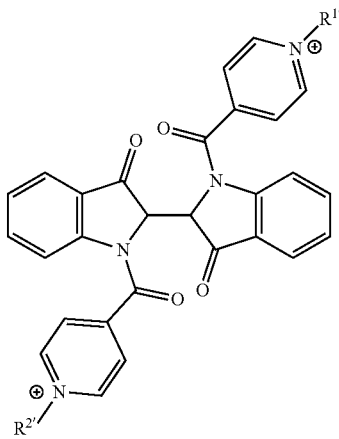

Particularly preferred modified indigo compound salts are shown below.

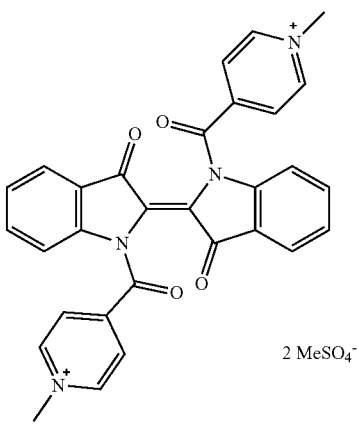

2 MeSO₄⁻

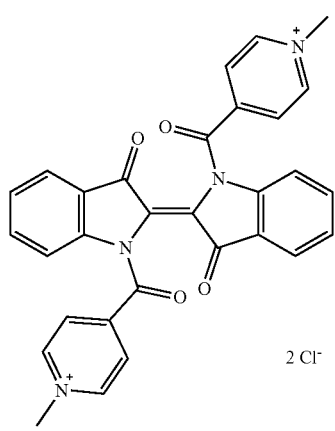

2 Cl⁻

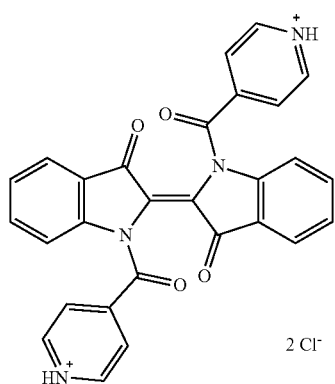

2 Cl⁻

In addition to being readily convertible to indigo by the mechanisms described herein, each of these compounds has been found to have a particularly beneficial combination of oxygen stability, water stability, and water solubility that make them particularly suitable for dyeing as described herein.

In some embodiments, a bridge may link the pyridine ring with the rest of the modified indigo compound. For example, in some embodiments, the modified indigo compound may be selected from a compound having the following base structure, or a salt thereof:

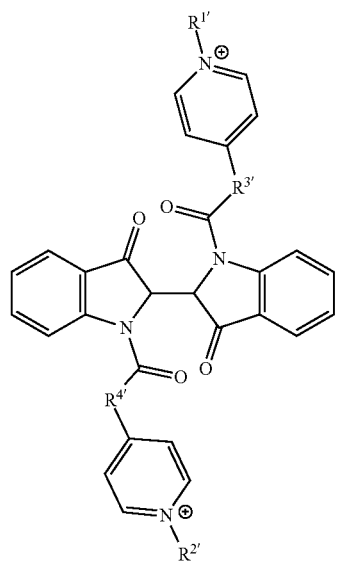

in which $R^{3'}$ and $R^{4'}$ may be an alkyl group, such as methyl, ethyl, propyl, or the like, or an alkoxide group. By the compound having the above-shown base structure, it is meant that each position in the above structure may include additional unshown substituents. Moreover, in the above structure, the nitrogen atom of each pyridine ring may comprise an alkane substituent, such as a methyl group, an ethyl group, or a propyl group, which is represented by $R^{1'}$ and $R^{2'}$. In other embodiments, $R^{1'}$ and $R^{2'}$ in the above structure may simply be hydrogen. In some embodiments, the salt may be formed by the nitrogen atom of each pyridine ring acting as an anion, with the cation being selected from the group consisting of the halogens (e.g. chlorine, bromine, iodine, methyl chloride, and the like) and the sulfates, such as methyl sulfate, ethyl sulfate, and the like.

In contrast to the structures described above, in which the nitrogen atom of the pyridine ring is in the 3 position, the nitrogen atom of the pyridine ring may also be located in either the 2 or 4 positions. In some embodiments, for instance, the modified indigo compound may be selected from a compound having the following base structure, or a salt thereof:

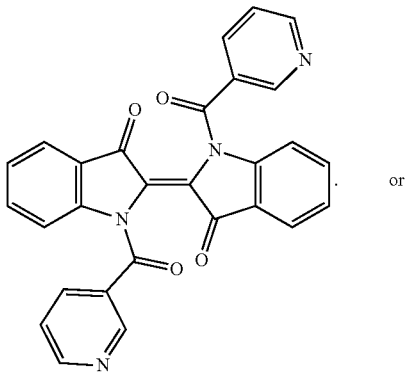

or

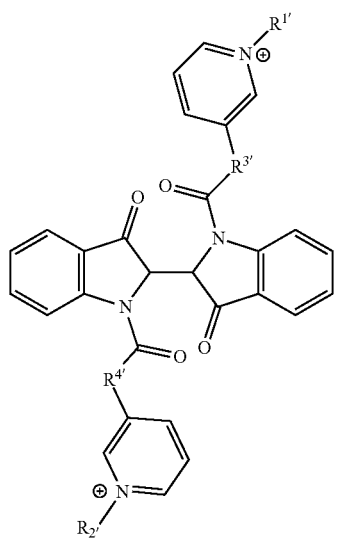

As with the above, by the compound having the above-shown base structure, it is meant that each position in the above structure may include additional unshown substituents. For instance, in some embodiments, the nitrogen atom of each pyridine ring may comprise an alkane substituent, such as a methyl group, an ethyl group, or a propyl group, which may be represented by $R^{1'}$ and $R^{2'}$ in the above structure. In other embodiments, $R^{1'}$ and $R^{2'}$ in the above structure may simply be hydrogen. Moreover, in some embodiments, the bridge linking the pyridine ring with the rest of the modified indigo compound represented by $R^{3'}$ and $R^{4'}$ in the above structure may be lacking.

In other embodiments, $R^{3'}$ and $R^{4'}$ may be an alkyl group, such as methyl, ethyl, propyl, or the like, or an alkoxide group. In some embodiments, the salt is formed by the nitrogen atom of each pyridine ring acting as an anion, with the cation being selected from the group consisting of the halogens (e.g. chlorine, bromine, iodine, methyl chloride, and the like) and the sulfates, such as methyl sulfate, ethyl sulfate, and the like. For example, in some embodiments, the modified indigo compound may be selected from the following salts:

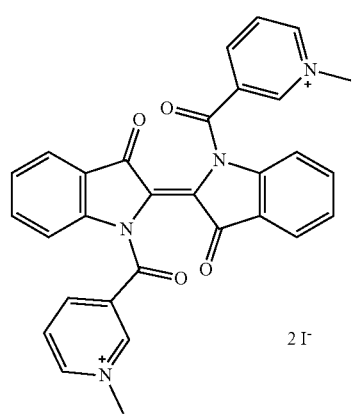

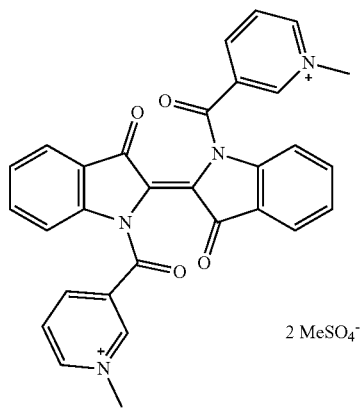

In contrast to the structures described above, in which the nitrogen atom of the pyridine ring is in the 2, 3, or 4 positions, the nitrogen atom of the pyridine ring may also be located in either the 1 or 5 positions. In some embodiments, for instance, the modified indigo compound may be selected from a compound having the following base structure, or a salt thereof:

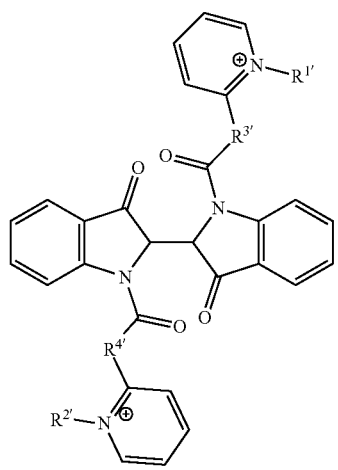

Again, by the compound having the above-shown base structure, it is meant that each position in the above structure may include additional unshown substituents. For instance, in some embodiments, the nitrogen atom of each pyridine ring may comprise an alkane substituent, such as a methyl group, an ethyl group, or a propyl group, which may be represented by $R^{1'}$ and $R^{2'}$, in the above structure. In other embodiments, $R^{1'}$ and $R^{2'}$ in the above structure may simply be hydrogen. Moreover, in some embodiments, the bridge linking the pyridine ring with the rest of the modified indigo compound represented by $R^{3'}$ and $R^{4'}$ in the above structure may be lacking. In other embodiments, $R^{3'}$ and $R^{4'}$ may be an alkyl group, such as methyl, ethyl, propyl, or the like, or an alkoxide group.

II. METHODS OF PRODUCTION

The compounds described above may be prepared by known chemical synthesis techniques. Among such preferred techniques known to one of skill in the art are included the synthetic methods described in conventional textbooks relating to the construction of synthetic compounds.

The above compounds comprising an indigo compound in which at least one of the amine groups is functionalized with an amido-pyridine or a salt thereof may generally be prepared according to Schemes 1-3.

Scheme 1

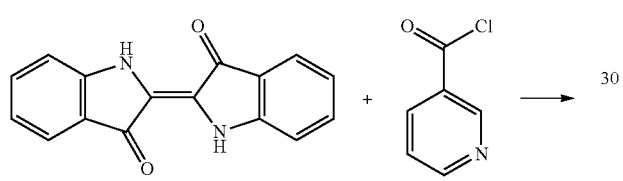

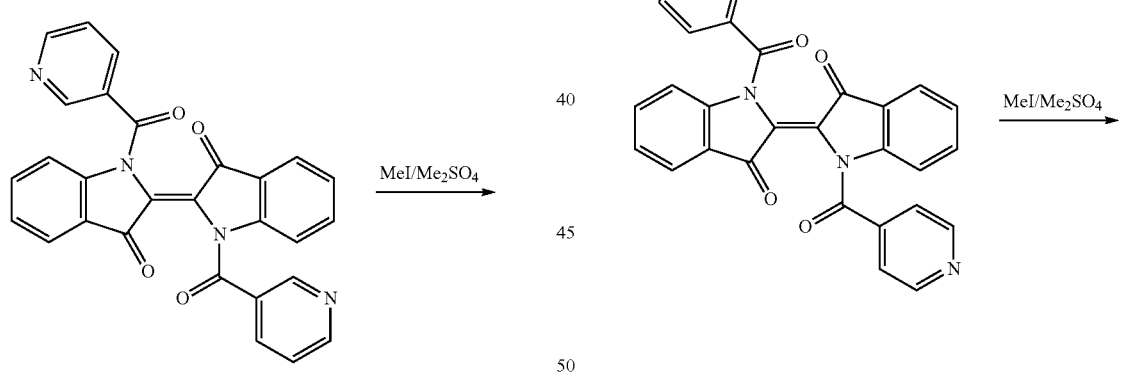

-continued

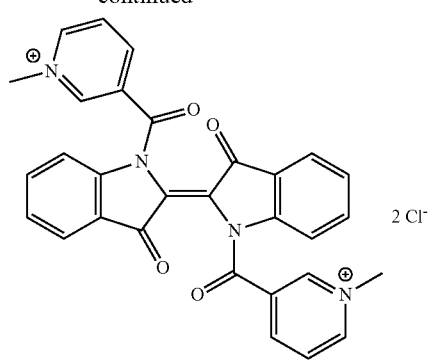

Scheme 2

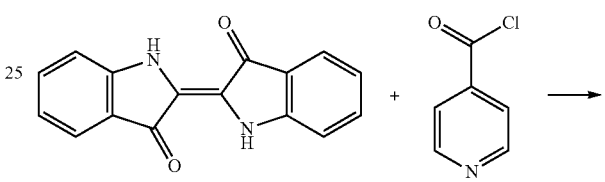

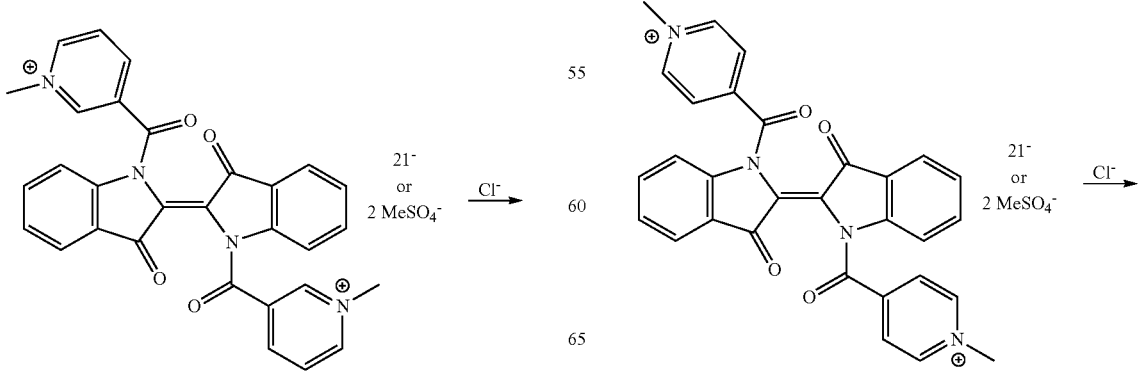

-continued

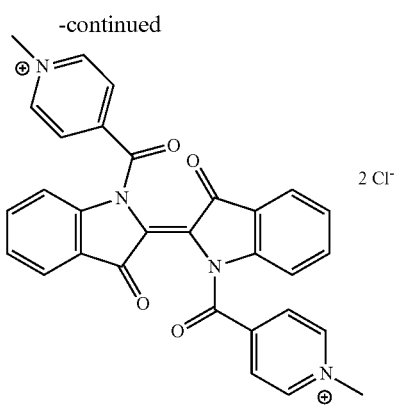

2 Cl⁻

Scheme 3

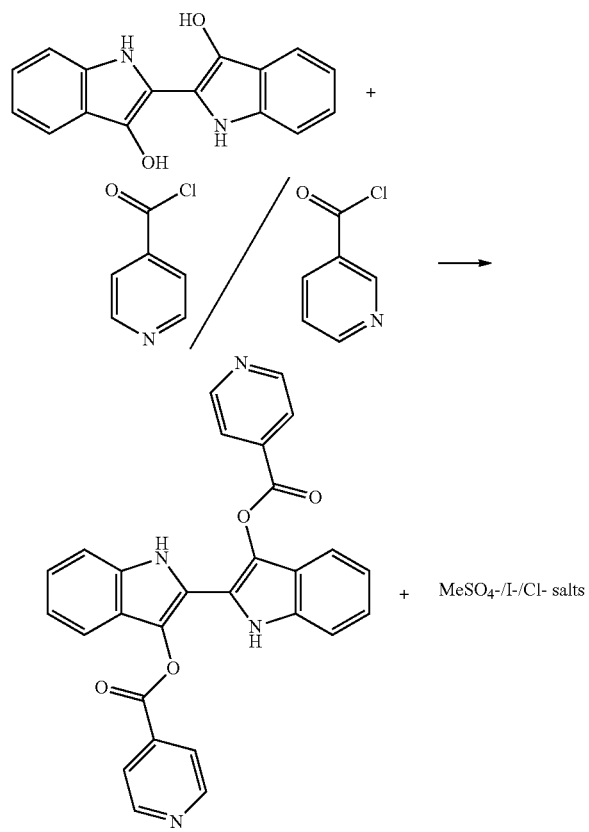

+ MeSO₄⁻/I⁻/Cl⁻ salts

In some embodiments, it may be desirable to dry the modified indigo compound at the conclusion of this process, so as to remove all or substantially all of the water. In doing so, one may prepare a powder comprising the modified indigo compound. This powder may be easily shipped and stored and will not convert to indigo during shipping and/or storage. Moreover, the powder may easily be dissolved at the mill to form the dye. Alternatively, the modified indigo compound may be added to a non-aqueous solvent for shipping and/or storage.

In some embodiments, the modified indigo compound may be prepared at the mill at which the dyeing occurs and/or immediately before the dyeing process. For instance, in some embodiments, one or more steps in the preparation process may be performed immediately prior to use of the modified indigo compound for dyeing. As an example, the following compound:

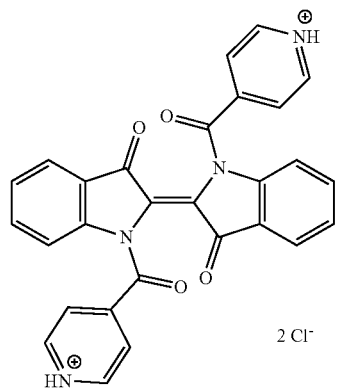 [SMILES: O=C1/C(=C2/C(=O)c3ccccc3N2C(=O)c2cc[nH+]cc2)N(C(=O)c2cc[nH+]cc2)c2ccccc21]

2 Cl⁻ may be prepared by contacting the base structure (represented by the following:

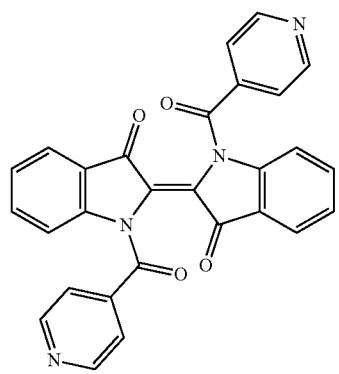 [SMILES: O=C1/C(=C2/C(=O)c3ccccc3N2C(=O)c2ccncc2)N(C(=O)c2ccncc2)c2ccccc21]

with an acid, such as hydrochloric acid. Such a step could easily be performed at the mill and immediately prior to use. This may be particularly beneficial where, for example, the intermediate structure may be more stable and/or easier to store than the modified indigo compound that is used in the dyeing process.

III. COMPOSITIONS CONTAINING THE COMPOUND

Compositions useful herein, in one embodiment, contain a compound discussed above in a diluent. The term "diluent" as used herein refers to a liquid compound that is capable of solubilizing some or all of the compounds discussed herein. In some embodiments, the diluent is water. In other embodiments, the diluent contains water and an organic solvent such as low vapor pressure organic solvents. In further embodiments, the diluent contains an organic solvent. Examples of organic solvents include, without limitation, glycols such as diethylene glycol monomethyl ether, triethylene glycol monomethyl ether, diethylene glycol monoethyl ether, triethylene glycol monoethyl ether, propylene glycol, alcohols such as glycerol, ketones, amines, or combinations thereof.

The compositions may also include optional suitable inert or inactive ingredients that are useful in compositions for dyeing substrates. The compositions may further include standard dyeing chemicals such as those described in Denim, Manufacture, Finishing and Applications, 1st Edition, Ed.: Roshan Paul, Woodhead Publishing, Apr. 23, 2015; Handbook of Textile and Industrial Dyeing, Principles, Processes and Types of Dyes, 1st Edition, Ed.: M. Clark, Woodhead Publishing, Oct. 25, 2011; and Handbook of Textile and Industrial Dyeing, Volume 2: Applications of Dyes, 1st Edition, Ed.: M. Clark, Woodhead Publishing, Oct. 25, 2011.

In some embodiments, the standard dyeing chemicals prepare the substrate for dyeing, i.e., a pretreating step. In other embodiments, the standard dyeing chemicals are useful in the step of dyeing the substrate. In further embodiments, the standard dyeing chemicals are useful in dyeing denim. In yet other embodiments, the standard dyeing chemicals are useful after dyeing is complete, i.e., a post-treating step such as a hydrolyzing step, neutralizing step, or a rinsing step. These compounds include, without limitation, one or more of an acid, cationic agent, chelating agent, color retention agent, coloring agent, dispersant, foaming agent, mercerization reagent, penetration enhancer, pH buffering agent, salt, stabilizing agent, solubilizing agent, surfactant, thickening agent, tracer, viscosity modifier, or wetting agent. One of skill in the art would be able to determine if a standard dyeing chemical may be used before, during, or after dyeing the substrate.

In other embodiments, the composition contains a cationic agent. In some embodiments the cationic agent is an ammonium salt such as diallyldimethylammonium chloride, polymerized diallyldimethylammonium chloride, [2-(acryloyloxy)ethyl] trimethylammonium chloride, 3-chloro-2-hydroxylpropyl trimethyl-ammonium chloride, or combinations thereof.

The composition may further comprise a solubilizing agent. In some embodiments, the solubilizing is an organic solvent, surfactant, or emulsifier. In other embodiments, the organic solvent is a low vapor pressure organic solvent. Examples of organic solvents include, without limitation, diethylene glycol monomethyl ether, triethylene glycol monomethyl ether, diethylene glycol monoethyl ether, triethylene glycol monoethyl ether, propylene glycol, glycerol, or combinations thereof. In further embodiments, the surfactant is glyceryl monostearate, polyoxoethylated castor oil, polysorbates such as the Tween® surfactants, sodium lauryl sulfate, sodium dodecyl sulfate, sorbitan esters such as the Span® or Arlacel™ surfactants, stearyl alcohols, cetyl alcohols, triethanolamine, or the Triton™ X-100 surfactant, among others.

The composition may also contain a stabilizing agent. Such agents may be selected by those skilled in the art and include, without limitation, NaCl, $Na_2SO_4$, a surfactant, or combinations thereof. In some embodiments, the surfactant is glyceryl monostearate, polyoxoethylated castor oil, polysorbates such as the Tween® surfactants, sodium lauryl sulfate, sodium dodecyl sulfate, sorbitan esters such as the Span® or Arlacel™ surfactants, stearyl alcohols, cetyl alcohols, triethanolamine, or the Triton™ X-100 surfactant, among others

IV. METHODS OF USING THE COMPOUNDS

The methods of dyeing described herein are practical and feasible. Thus, the indigo dyeing methods reduce cost, increase throughput and improve the sustainability of the denim-dyeing process. In fact, the compounds discussed herein may be utilized in existing plants in place of the currently utilized leuco-indigo methods with little to no change required for the mechanical equipment. The dyeing methods and techniques described herein may selected by those skilled in the art including those recited in Denim, Manufacture, Finishing and Applications, 1st Edition, Ed.: Roshan Paul, Woodhead Publishing, Apr. 23, 2015; Handbook of Textile and Industrial Dyeing, Principles, Processes and Types of Dyes, 1st Edition, Ed.: M. Clark, Woodhead Publishing, Oct. 25, 2011; and Handbook of Textile and Industrial Dyeing, Volume 2: Applications of Dyes, 1st Edition, Ed.: M. Clark, Woodhead Publishing, Oct. 25, 2011.

In some embodiments of the present disclosure, the process of indigo dyeing with a modified indigo compound involves two basic steps. In a first step, a substrate such as a textile yarn is contacted with a dye solution that contains a modified indigo compound. As a result of this contact, the substrate takes up an amount of the modified indigo compound. For example, when a cotton yarn is contacted with the dye solution, the dye solution both coats a surface of the yarn and penetrates some distance below the surface of the yarn. The amount of dye solution contained within the resulting yarn may be controlled by controlling the duration of the contact and the concentration of modified indigo in the dye solution. When the substrate has been contacted so as to contain a desired amount of dye solution, the dye-treated substrate is brought out of contact with the dye solution.

The methods are useful in dyeing a substrate by contacting one or more compound described herein with the substrate. The methods are also used in dyeing a substrate by contacting one or more of the compounds described herein or the following compounds with the substrate:

(i) N,N'-dinicotinoyl-[2,2'-biindolinylidene]-3,3'-dione;
(i) the N'',N'''-methylpyridinium bis(methylsulfate) salt of N,N'-dinicotinoyl-[2,2'-biindolinylidene]-3,3'-dione;
(iii) N,N'-diacetyl-[2,2'-biindolinylidene]-3,3'-dione;
(iv) N,N'-dipropionyl-[2,2'-bi-indolinylidene]-3,3'-dione;
(v) N,N'-di-isobutyryl-[2,2'-biindolinylidene]-3,3'-dione;
(vi) N,N'-dipivaloyl-[2,2'-biindolinylidene]-3,3'-dione;
(vii) N,N'-bis(cyclohexylcarbonyl)-2,2'-bi-indolinylidene-3,3'-dione;
(viii) N,N'-bis(3-phenylpropionyl)-2,2'-bi-indolinylidene-3,3'-dione;
(ix) N,N'-bis(ethoxycarbonylacetyl)-2,2'-bi-indolinylidene-3,3'-dione;
(x) N,N'-bis(2-phenylacetyl)-[2,2'-bi-indolinylidene]-3,3'-dione;
(xi) N,N'-bis-(p-methoxyphenylacetyl)2,2'-bi-indolinylidene-3,3'-dione;
(xii) N,N'-bis(1-naphthylacetyl)-2,2'-bi-indolinylidene-3,3'-dione;
(xiii) N,N'-bis(2-phenylbutyryl)-2,2'-indolinylidene-3,3'-dione;
(xiv) (E)-1,1'-di(adamantane-1-carbonyl)-[2,2'-biindolinylidene]-3,3'-dione.
(xv) 1H,1'H-[2,2'-biindole]-3,3'-diyl diacetate;
(xvi) 3,3'-bis(phenylacetoxy)-2,2'-bi-indolyl;
(xvii) 3,3'-bis(p-methoxyphenylacetoxy)-2,2'-bi-indolyl;
(xviii) 3,3'-bis(1-napthylacetoxy)-2,2'-bi-indolyl;
(xix) 3,3'-bis(phenylbutyryloxy)-2,2'-bi-indolyl;
(xx) 3,3'-bis(pivaloyloxy)-2,2'-bi-indolyl;
(xxi) 3,3'-bis(1-adamantylcarbonyloxy)-2,2'-bi-indolyl; or
(xxii) 3,3'-bis(ethoxycarbonylacetoxy)-2,2'-bi-indolyl.

The term "substrate" as used herein refers to a material that may be dyed using the compounds described herein. The substrate contains natural substrates, synthetic substrates, or combinations thereof. In some embodiments, the substrate is natural. In other embodiments, the substrate is synthetic. In further embodiments, the substrate contains natural and synthetic components. The natural substrate may be selected by those skilled in the art from, without limitation, plant or animal substrates. Plant fibers include cotton, kapok, hemp, bamboo, flax, sisal, jute, kenaf, ramie, bamboo, soybean, or coconut, among others. Animal substrates include silk, wool, leather, hair, feather, among others. In some embodiments, the animal substrate is silk, wool, leather, or feather. In other embodiments, the substrate comprises a synthetic fiber such as a synthetic polymer. The synthetic substrate may be prepared using viscose or lyocel processes, preferably or from regenerated/spun cellulose processes. Thus, the synthetic substrate includes, without limitation, rayon such as lyocel (TENCEL®), a polyamide such as nylon, polyester, polyacrylate, polyolefin, or spandex. In some embodiments, the synthetic substrate is a polyamide such as nylon. In other embodiments, the polyester is polyethylene terephthalate. In further embodiments, the polyolefin is polypropylene or polyethylene. In still other embodiments, the polyacrylate is a copolymer of polyacrylonitrile. In contrast to the methods used in the art for dyeing synthetic substrates, the methods described herein do not require heating the substrate, e.g., to the substrate's $T_g$, during the dyeing process.

While the present disclosure is primarily described in relation to the dyeing of cotton yarn, it should be understood that the modified indigo compounds and dyeing processes disclosed herein may also be used to dye any number of different textile materials, including without limitation fibers comprising cellulosic material, such as silk, wool, rayon, lyocel, flax, linen, ramie, and the like, as well as materials comprising combinations thereof.

The substrate may be in any physical form or shape that permits dyeing by the compounds described herein. Thus, the substrate may be a single fiber or a number of fibers gathered together in another form. In some embodiments, the substrate is in the form of a yarn, sheet, or package. In other embodiments, the substrate is a yarn. In further embodiments, the substrate is a package. In other embodiments, the substrate is a fabric. The yarns may be fitted together to form sheets or packages of yarns such as a carpet. Similarly, the fibers may be woven to form a sheet such as a textile. In some embodiments, the dye substrate or textile is denim. In further embodiments, the substrate is a fabric or textile such as clothing or garment.

As used herein, the term "yarn" should be understood as meaning a length of interlocked textile fibers or filaments that is suitable for the production of fabrics. In some embodiments, indigo-dyeing is performed on yarn or ropes of yarn. In other embodiments, the yarn is converted to packages, which can be used in weaving or knitting operations. For example, indigo-dyed yarn is often weaved into denim fabric, and more specifically this dyed yarn is then used as the warp yarn in a denim fabric weave. However, in some processes the yarn may be weaved into a fabric, such as through a denim weave, and then dyed. Accordingly, unless specified, the term yarn should be understood herein as inclusively referring to any of individual yarns, ropes of yarn, packages of yarn, sheets of yarn, and yarn that is present in a fabric.

Moreover, as used herein, the term "cotton yarn" should be understood as any yarn containing cotton fibers. In some embodiments, the cotton yarn may contain 100% cotton fibers. In other embodiments, the cotton yarn may contain a mixture of cotton fibers and other natural or synthetic fibers/filaments. For example, the cotton yarn may contain a blend of cotton and polyester, nylon, elastomeric materials such as elastane (i.e. spandex), or mixtures thereof. Additionally, in some embodiments, a portion of the cotton or all of the cotton may be treated. For example, in some embodiments at least a portion of the cotton may be treated so as to render the cotton hydrophobic. Accordingly, unless specified, the term cotton yarn should be understood herein as inclusively referring to any yarn that contains cotton fibers, including mixtures of cotton and other materials.

The term "contacting" as used herein refers to any route by which the substrate is contacted with the dye compound. In some embodiments, the substrate is contacted directly with the compound in the absence of a diluent. In other embodiments, the substrate is contacted with a composition comprising the dye compound. In further embodiments, the substrate is contacted with an aqueous bath comprising the dye compound. In yet other embodiments, the substrate is dipped into an aqueous bath comprising the dye compound. In still further embodiments, the dye compound is in the form of a foam and the foam is applied to the substrate for example by spraying the substrate with the foam. For example, techniques such as dip dyeing, rope dyeing, slasher dyeing, spray dyeing, continuous dyeing, piece dyeing, space dyeing, package dyeing, skein dyeing, garment dyeing, paint brush dyeing, airbrush dyeing, blotch dyeing, or foam dyeing may be utilized to contact the substrate with the dye compound.

Advantageously, the bath containing the dye compound lacks a reducing agent to convert the compound to a leuco form of the compound. In other embodiments, the bath containing the dye compound lacks an alkali agent. In further embodiments, the bath containing the dye compound lacks a reducing agent which is sodium hydrosulfite formamidine sulfinic acid, glucose, sodium borohydride, sodium metabisulfite, thiourea dioxide cellobiose, glyceraldehyde, or fructose.

When an aqueous bath is utilized to dye the substrate, it is prepared by mixing one or more compound with water. In some embodiments, each bath comprises about 0.5 wt. % to about 70 wt. %, based on the weight of the bath, of the compound. In other embodiments, the bath comprises about 1 wt. % to about 50 wt. %, based on the weight of the bath, of the compound. In further embodiments, the bath comprises about 2 wt. % to about 30 wt. %, based on the weight of the bath, of the compound. In still other embodiments, the bath contains about 5 to about 25 wt. %, based on the weight of the bath, of the compound. In yet further embodiments, the bath contains about 10 to about 20 wt. %, based on the weight of the bath, of the compound. In other embodiments, the bath contains about 12 to about 18 wt. %, based on the weight of the bath, of the compound. In further embodiments, the bath contains about 14 to about 16 wt. %, based on the weight of the bath, of the compound. Preferably, the bath contains about 2, 3, 4, 5, 6, 7, 8, 9, 10, 11, 12, 13, 14, 15, 16, 17, 18, 19, 20, 21, 22, 23, 24, 25, 26, 27, 28, 29, or 30 wt. %, based on the weight of the bath, of the compound. More preferably, each bath contains about 1 to about 3 wt. % to about 70 wt. %, based on the weight of the bath, of the compound. Even more preferably, each bath contains about 2 wt. % to about 70 wt. %, based on the weight of the bath, of the compound.

In addition to the compound and water, the aqueous bath may contain other additional components such as those described above for compositions containing the compound. These compounds include, without limitation, an acid, cationic agent, caustic agent, chelating agent, color retention agent, coloring agent, dispersant, foaming agent, hydrolyzing agent, mercerization reagent, penetration enhancer, pH buffering agent, salt, solubilizing agent, stabilizing agent, surfactant, thickening agent, tracer, viscosity modifier, wetting agent, or combinations thereof. One of skill in the art would be able to determine if a standard dyeing chemical may be used before, during, or after dyeing the substrate. In some embodiments, the aqueous bath lacks a solubilizing agent. In other embodiments, the aqueous bath contains solubilizing agent. In further embodiments, the aqueous bath is acidic, i.e., has a pH of less than about 7. In some embodiments, the aqueous bath as a pH of about 0.5 to about 7, about 1 to about 7, about 1 to about 6, about 1 to about 5, about 1 to about 4, about 1 to about 3, about 1 to about 2, about 1, about 2, about 3, about 4, about 5, about 6, or about 6.

The substrate is kept in contact with the aqueous solution, i.e., dyed, for a time sufficient so as to dye the substrate. In some embodiments, the time is dependent on the extent of dye that penetrates the substrate. In other embodiment, the time is dependent on the desired color of the substrate is achieved. In further embodiments, the time is dependent on the concentration of the dye being applied to the substrate. In yet other embodiments, the substrate is kept in contact with the aqueous solution for about 5 seconds to about 10 hours. In still further embodiments, the substrate is kept in contact with the dye compound for about 5, 10, 20, 30, or 45 seconds, 1, 2, 3, 4, 5, 6, 7, 8, 9, 10, 15, 30, or 45 minutes, or 1, 2, 3, 4, 5, 6, 7, 8, 9, or 10 hours.

The substrate also is kept in contact with the aqueous solution at a suitable temperature. In some embodiments, the dyeing temperature is any temperature that does not degrade any components of the dyeing process. In some embodiments, the temperature is ambient temperature. In other embodiments, the temperature is about 20 to about 40° C., such as about 10 to about 35° C., or about room temperature.

In another step, the modified indigo compound that has been taken up by the dye-treated substrate is converted to indigo through a process of hydrolysis. In some embodiments, the substrate is contacted with a hydrolyzing agent, the hydrolyzing agent being capable of reacting with the modified indigo compound contained within the substrate to convert the modified indigo compound into indigo. For example, when a cotton yarn that has been contacted with a dye solution is then contacted with an appropriate hydrolyzing agent, the modified indigo contained within the cotton yarn is converted to indigo, thereby producing an indigo-dyed yarn.

In some embodiments, the substrate may be contacted with an alkali agent in order to hydrolyze the modified indigo compound so as to convert it into indigo. The contacting of the substrate with the alkali hydrolyzing agent may be performed in a number of different manners. For instance, the substrate may be dipped in a solution containing the alkali agent, e.g. an aqueous hydrolyzing bath, or a solution containing the alkali agent may be sprayed onto the substrate. By converting the modified indigo compound into indigo, an indigo-dyed substrate is produced.

In many dyeing processes, multiple iterations of this two-step process will be necessary in order to obtain a desirable shade of indigo. Accordingly, in many dyeing processes, once the modified indigo compound on the substrate is converted into indigo, the substrate will again be contacted with dye solution containing a modified indigo compound. In some embodiments, substrate is contacted with the same bath that was used to as the initial dye bath. In other embodiments, the substrate is contacted with another dye bath containing the same or a different amount of the dye compound. One of skill in the art would be able to determine how many instances it is necessary to contact the substrate with the dye compound. For example, one skilled in the art would be able to determine how many times to dip the substrate into the dye bath. See, for example, Denim, Manufacture, Finishing and Applications, 1st Edition, Ed.: Roshan Paul, Woodhead Publishing, Apr. 23, 2015; Handbook of Textile and Industrial Dyeing, Principles, Processes and Types of Dyes, 1st Edition, Ed.: M. Clark, Woodhead Publishing, Oct. 25, 2011; and Handbook of Textile and Industrial Dyeing, Volume 2: Applications of Dyes, 1st Edition, Ed.: M. Clark, Woodhead Publishing, Oct. 25, 2011. Although the substrate may only require contacting it once with the dye compound, the substrate typically is contacted with the dye compound at least two times. In some embodiments, the dye compound is contacted about 4 to about 25 times, about 5 to about 20 times, about 6 to about 18 times, about 7 to about 16 times, about 8 to about 14 times, about 8 to about 12 times, about 8 to 10 times, about 9 to 16 times, about 9 to about 14 times, about 9 to about 12 times, about 12 to about 18 times, about 12 to about 16 times, 1 to about 25 times, 2 to about 20 times, about 3 to about 18 times, about 4 to about 16 times, about 5 to about 15 times, about 5 to about 12 times, about 5 to about 10 times, about 5 to about 8 times, or any other ranges there between.

A further step includes hydrolyzing the dye compound in the dyed substrate to indigo. In some embodiments, hydrolysis of the dye compound is performed with a solution which contains water. In other embodiments, hydrolysis is performed with water. The water can be from a fresh source or may be reused. Thus, the water can contain other components including, without limitation, an acid, cationic agent, chelating agent color retention agent, coloring agent, dispersant, foaming agent, mercerization reagent, organic solvent, pH buffering agent, penetration enhancer, salt, stabilizing agent, solubilizing agent, surfactant, thickening agent, tracer, viscosity modifier, or wetting agent. In some embodiments, the rinse water contains an acid, cationic agent, chelating agent, dispersant, foaming agent, organic solvent, pH buffering agent, penetration enhancer, salt, solubilizing agent, surfactant, thickening agent, tracer, viscosity modifier, or wetting agent.

The hydrolysis is performed using any chemical compound or condition that is capable of converting the dye compound to indigo. In some embodiments, the hydrolysis is performed in aqueous compositions which contain a hydrolyzing agent. In other embodiments, the hydrolyzing agent may be selected by one skilled in the art and may include, without limitation, a base, heat, steam, or a combination thereof.

In some embodiments, the hydrolyzing agent is an alkali agent. Preferably, the alkali agent ensures that the pH of the hydrolysis is raised to greater than about 11. For example, the base is an oxide, hydroxide of alkali metals or alkaline earth metal, or carbonate of an alkali or alkaline earth metal. In some embodiments, the hydrolysis is performed with an oxide. In other embodiments, the hydrolysis is performed with a hydroxide of an alkali metal such as sodium hydroxide, potassium hydroxide, or lithium hydroxide. In further embodiments, the hydrolysis is performed with a carbonate such as sodium carbonate or potassium carbonate. In still other embodiments, the hydrolysis is performed with a hydroxide of an alkaline earth metal.

The hydrolysis may also be performed using an elevated temperature. Thus, in some embodiments, the hydrolysis may be performed using heat such as by contacting the dyed substrate with a heat plate or blowing hot air on the dyed substrate. One skilled in the art would be able to select a suitable temperature for use in the hydrolysis of the dye compound. For example, the heat comprises a temperature of at least about 80° C. In some embodiments, the heat comprises a temperature of about 80 to about 200° C., such as about 100 to about 200° C., about 120 to about 200° C., about 150 to about 200° C., about 180 to about 200° C., about 80 to about 100° C., about 80 to about 120° C., about 80 to about 140° C., about 80 to about 160° C., about 80 to about 180° C., or about 80, 90, 100, 110, 120, 130, 140, 150, 160, 170, 180, 190, or about 200° C.

Similarly, steam may be used to effect the hydrolysis. In some embodiments, steam is sprayed onto the dyed substrate or the dyed substrate is passed through a unit comprising an atmosphere of steam. The temperature of the steam is desirably at a temperature recited above.

After the hydrolysis is complete, additional dyeing steps and hydrolysis steps may be utilized until the desired dye penetration or color is attained by the substrate. It may also be desirable to dry the dyed substrate prior to hydrolyzing. Thus, in some embodiments, the substrate is dyed as described herein, dried, and hydrolyzed as described herein. In some embodiments, the dyeing step is repeated 1 to about 50, 2 to about 30, 5 to about 25, 10 to about 20, or 1 to about 2, 3, 4, 5, 6, 7, 8, 9, 10, 11, 12, 13, 14, 15, 16, 17, 18, 19, 20, 21, 22, 23, 24, or 25 times. Similarly, the hydrolysis step may be repeated the same number of times that the dyeing step is repeated. In some embodiments, the hydrolysis is repeated 1 to about 50, 2 to about 30, 5 to about 25, 10 to about 20, or 1 to about 2, 3, 4, 5, 6, 7, 8, 9, 10, 11, 12, 13, 14, 15, 16, 17, 18, 19, 20, 21, 22, 23, 24, or 25 times.

Following dyeing and hydrolyzing, the substrate may be rinsed using techniques known to those skilled in the art. Similarly, the rinsing step may be performed between one or more of the dyeing and hydrolyzing steps. Preferably, one or more rinsing steps are performed after all dyeing and hydrolyzing steps are complete. However, in embodiments where the hydrolysis is performed using heat, such as an iron, hot air, or steam, a rinsing step may not be required. In situations where a rinsing step is performed, it may be is repeated 1 to about 50, 2 to about 30, 5 to about 25, 10 to about 20, or 1 to about 2,3,4, 5, 6, 7, 8, 9, 10, 11, 12, 13, 14, 15, 16, 17, 18, 19, 20, 21, 22, 23, 24, or 25 times.

Desirably, the rinsing is performed using an aqueous solution. In some embodiments, the aqueous rinsing solution contains water. In other embodiments, the aqueous rinsing solution contains water and additional components such as organic solvents including those described herein. In further embodiments, the aqueous rinsing solution comprises a neutralization agent. The term "neutralization agent" as used herein refers to a chemical compound that neutralizes the hydrolyzing agent, if used. For example, the neutralization agent adjusts the pH of the dyed substrate to a pH of about 5 to about 9, e.g., about 6 to about 8, about 6 to about 7, about 6, 6.5, 7, 6.5 7, 7.5, 8, 8.5, or 9. In some examples, the neutralization agent is an acid or a base, as determined by the pH of the rinsate solution. In other examples, the neutralization agent is an acid such as acetic acid. In further examples, the neutralization agent is a base such as ammonia. In still other examples, the neutralization agent is pH adjusted water. In further embodiments, the aqueous rinsing solution contains buffering agent.

The dyeing is performed until the desired color of the substrate is reached. The desired color may be determined by one skilled in the art using techniques and instruments such as color spectrophotometers.

Before the substrate is again contacted with the dye solution, however, it may be desirable to rinse the indigo-dyed substrate to remove any residual hydrolyzing agent. Removal of residual hydrolyzing agent serves to prevent contamination of the dye solution with the hydrolyzing agent, which would decrease the effectiveness of the dye bath. Accordingly, in some embodiments, the process may include a third step, the third step being rinsing the indigo dyed yarn to remove any residual hydrolyzing agent. The rinsing step may comprise simply contacting the indigo-dyed yarn with water. Alternatively, where an alkali hydrolyzing agent is employed, the rinsing step may comprise contacting the indigo-dyed yarn with an agent that is capable of neutralizing the hydrolyzing agent, such as a mildly acidic agent.

In some embodiments, hydrolyzing the modified indigo compound may comprise subjecting the dye-treated substrate to a heat treatment at an elevated temperature. For example, the dye-treated substrate may be subjected to elevated temperatures of greater than 60° C., alternatively greater than 80° C., alternatively greater than 100° C. It is noted that the substrate itself need to obtain the stated temperature, but rather that the substrate be subjected to the elevated temperature for a period of time sufficient to bring about conversion of the modified indigo compound into indigo. To increase the speed at which hydrolysis occurs, the heat treatment may also comprise contacting the dye-treated yarn with a moisture-rich atmosphere. For example, in some embodiments the dye-treated yarn may be contacted with steam. The application of heat (and optionally moisture, e.g. steam) to the dye-treated yarn triggers the hydrolysis of the modified indigo compound, decreasing the time necessary for conversion to indigo to occur. In some embodiments, for example, the application of heat (e.g. air heat, contact heat, etc.) and optionally moisture may be controlled to convert the modified indigo compound into indigo in less than fifteen minutes, alternatively less than ten minutes, alternatively less than eight minutes, alternatively less than six minutes, alternatively less than five minutes, alternatively less than three minutes.

The dyeing of a cotton yarn by the improved process disclosed herein may be performed by a variety of dyeing methods. In some embodiments, for example, the dyeing may be performed using a modified dipping process. The modified dipping process may be performed in largely the same manner as the conventional dipping process that is employed for the indigo dyeing of cotton yarns. In this process, one or more yarns continuously travel such that each yarn enters a dye bath at a first end and exits the dye bath at the second end. This process is known as dipping. The length of time that a particular portion of the yarn spends in the dye bath may be carefully controlled to provide for a desirable uptake of the indigo precursor. In the conventional process, once the dye-treated yarn exits the dye bath, the leuco-indigo quickly converts to indigo during a short period in which the yarn is exposed to air. The one or more yarns may continuously travel through a series of dye baths and subsequent air exposures in order to obtain a desired shade of indigo.

In embodiments of the present process, the leuco-indigo dye bath may be replaced with a dye bath containing a modified indigo compound according to the various embodiments described herein. For instance the dye bath may generally comprise an aqueous solution of the modified indigo compound. In addition to water and the modified indigo compound, the dye bath may also contain one or more of the following: wetting agents, thickening agents, chelating agents, pH buffering agents, and stabilizers. Notably, as described above, in many embodiments the dye bath containing the modified indigo compound may not contain a reducing agent. In some embodiments, therefore, the dye bath may consist essentially of water and the modified indigo compound. Additionally, because the modified indigo compound does not require strong reducing agents and a high pH environment to maintain stability, embodiments of the dye bath may have a pH of less than 9, alternatively less than 8, alternatively less than 7. In some embodiments, it may be desirable that the dye bath be about neutral, i.e. have a pH of about 7.

Additionally, rather than simply exposing the dye-treated yarns to air, the dye-treated yarn may be subjected to a treatment that is effective to more efficiently convert the modified indigo compound into indigo, such as those described herein. Importantly, the one or more yarns may continuously through a series of dye baths in order to obtain a desired shade of indigo in much the same way as in the conventional process. Accordingly, it is believed that large-scale commercial dyeing equipment might easily be converted to utilize the improved dyeing process disclosed herein without the need for major expenditures of capital.

In some embodiments, the dyeing may be performed by a foam-dyeing process, in which a foam containing the modified indigo compound may be contacted with a yarn as the yarn travels through a dyeing chamber. Because of the oxygen stability of embodiments of the modified indigo compounds, the atmosphere in the dyeing chamber may contain oxygen. For instance, in some embodiments, the dyeing chamber may contain air. It is also possible to carefully control the depth of the dye penetration into the yarn using the foam dyeing process.

In other embodiments, the dyeing may be performed by alternative methods, such as by spraying, painting, brushing, rolling, and/or printing the dye (e.g. an aqueous solution containing the modified indigo compound) onto the yarn. In some embodiments, dyeing is performed using spraying. In further embodiments, dyeing is performed using painting. In other embodiments, dyeing is performed using brushing. In still further embodiments, dyeing is performed using rolling. In yet other embodiments, dyeing is performed using printing such as digital printing or screen printing.

In some embodiments, the substrate such as cotton yarn may be pre-treated with a caustic or cationic agent prior to being contacted with the dye containing the modified indigo compound. The particular caustic or cationic agent may be readily selected by one skilled in the art from such reagents that may be utilized to prepare the substrate for dyeing. Examples of caustic agents that might be used in such a pre-treatment include inorganic alkalis, such as hydroxides such as sodium hydroxide, or potassium hydroxide, carbonates such as sodium carbonate, and the like, and organic alkalis, including members of the amine family such as diethanolamine, trimethylamine, hexamethylenediamine, liquid ammonia, and the like, or combinations thereof.

Examples of cationic agents that might be used in such a pretreatment include diallyldimethylammonium chloride (DADMAC), polymerized diallyldimethylammonium chloride (Poly-DADMAC), [2-(acryloyloxy)ethyl] trimethylammonium chloride (AOETMAC), 3-chloro-2-hydroxylpropyl trimethyl-ammonium chloride (CIPTAC, Quat 188), and the like, or combinations thereof.

It has been found that such a pre-treatment allows for a consistent and desirable ring dyeing effect. Cotton yarns that are used to prepare denim fabrics are generally "ring dyed", such that the core of each of the yarns remains undyed, i.e. generally white. In this way, abrasion and/or wear of a denim fabric exposes the core of yarns that make up the fabric in the region of abrasion and/or wear, providing a characteristic fading effect that is desirable in denim garments. In order to avoid dyeing of the core, the concentration of the dye and length of contact time used in the dyeing of cotton yarns must typically be minimized. By pre-treating the cotton yarns as described herein, however, the yarns may be (a) contacted with a dye having a relatively high concentration of modified indigo compound, (b) contacted with the dye for a relatively long period of time, or (c) a combination thereof, without the core of the yarn being dyed.

V. KITS CONTAINING THE COMPOUND

Also provided are kits comprising one or more dye compound described herein and a reagent or device that converts the compound to indigo. Advantageously, because the above-described compounds are stable in a dried state, they can more easily be transported and/or stored for future use.

In some embodiments, the reagent that converts the compound to indigo is a base. In other embodiments, the reagent that converts the compound to indigo is a device that generates heat. In other embodiments, the reagent that converts the compound to indigo is a device that generates steam.

It can be seen that the described embodiments provide unique and novel modified indigo compounds and a unique and novel process for dyeing a substrate, such as cotton yarn, using modified indigo compounds, each of which having a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

The following Examples are provided to illustrate some of the concepts described within this disclosure. While each Example is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

VI. ASPECTS

Aspect 1. A method of dyeing yarn comprising (a) contacting a yarn with a dye solution comprising a modified indigo compound, thereby producing a dye-treated yarn; and (b) hydrolyzing the modified indigo compound present on the dye-treated yarn to convert it to indigo, thereby producing an indigo-dyed yarn; wherein the modified indigo compound is stable in the presence of oxygen.

Aspect 2. The method of Aspect 1, further comprising (c) repeating steps (a) and (b) one or more times.

Aspect 3. The method of Aspect 1, in which hydrolyzing the modified indigo compound comprises contacting the treated yarn with an alkali agent.

Aspect 4. The method of Aspect 3, further comprising (c) rinsing the indigo-dyed yarn to remove any remaining alkali agent.

Aspect 5. The method of Aspect 4, further comprising (d) repeating steps (a) through (c) one or more times.

Aspect 6. The method of any one of Aspects 4 and 5, in which the rinsing comprises contacting the indigo-dyed yarn with water.

Aspect 7. The method of any one of Aspects 4 and 5, in which the rinsing comprises contacting the indigo-dyed yarn with an agent that is capable of neutralizing the hydrolyzing agent.

Aspect 8. The method of Aspect 1, in which hydrolyzing the modified indigo compound comprises subjecting the dye-treated yarn to a heat-treatment at an elevated temperature.

Aspect 9. The method of Aspect 8, in which the elevated temperature is at least 80° C.

Aspect 10. The method of Aspect 9, in which the elevated temperature is at least 100° C.

Aspect 11. The method of any one of Aspects 8 through 10, in which the heat-treatment further comprises contacting the dye-treated yarn with steam.

Aspect 12. The method of any one of Aspects 8 through 11, in which the heat-treatment takes less than ten minutes to convert the modified indigo compound to indigo.

Aspect 13. The method of any Aspect 12, in which the heat-treatment takes less than six minutes to convert the modified indigo compound to indigo.

Aspect 14. The method of any of the preceding Aspects, in which contacting the yarn with the modified indigo compound comprises contacting the yarn with an aqueous solution that contains the modified indigo compound.

Aspect 15. The method of Aspect 14, in which contacting the yarn with the modified indigo compound comprises dipping the yarn into the aqueous solution.

Aspect 17. The method of any one of Aspects 14 and 15, in which the aqueous solution consists essentially of water, the modified indigo compound, and one or more of the following: a wetting agent, a thickening agent, a chelating agent, a pH buffering agent, and a stabilizer.

Aspect 18. The method of any one of Aspects 14 and 15, in which the aqueous solution consists essentially of water and the modified indigo compound.

Aspect 19. The method of any one of Aspects 14 and 15, in which the aqueous solution does not contain a reducing agent.

Aspect 20. The method of any one of Aspects 14-19, in which the pH of the aqueous solution is less than 9.

Aspect 21. The method of Aspect 20, in which the pH of the aqueous solution is less than 8.

Aspect 22. The method of Aspect 21, in which the pH of the aqueous solution is less than 7.

Aspect 23. The method of any one of Aspects 14 through 22, in which the indigo compound is present in the aqueous solution at a concentration of at least 0.5 wt. %.

Aspect 24. The method of Aspect 23, in which the indigo compound is present in the aqueous solution at a concentration of at least 1 wt. %.

Aspect 25. The method of Aspect 24, in which the indigo compound is present in the aqueous solution at a concentration of at least 2 wt. %.

Aspect 26. The method of any one of Aspects 1 through 13, in which contacting the yarn with the modified indigo compound comprises applying a foam containing the modified indigo compound to the yarn.

Aspect 27. The method of any of the preceding Aspects, in which the modified indigo compound is stable in aqueous solution for at least one hour.

Aspect 28. The method of Aspect 27, in which the modified indigo compound is stable in aqueous solution for at least twelve hours.

Aspect 29. The method of Aspect 28, in which the modified indigo compound is stable in aqueous solution for at least one day.

Aspect 30. The method of Aspect 29, in which the modified indigo compound is stable in aqueous solution for at least one week.

Aspect 31. The method of any one of the preceding Aspects, in which the modified indigo compound has greater water solubility than leuco-indigo.

Aspect 32. The method of any one of the preceding Aspects, in which the modified indigo compound has greater affinity to cotton than leuco-indigo.

Aspect 33. The method of any one of the preceding Aspects, further comprising pre-treating the yarn with a caustic agent or a cationic agent.

Aspect 33.1. The method of Aspect 33, comprising pre-treating the yarn with a caustic agent selected from the group consisting of sodium hydroxide, potassium hydroxide, sodium carbonate, diethanolamine, trimethylamine, hexamethylenediamine, and combinations thereof.

Aspect 33.2. The method of Aspect 33, comprising pre-treating the yarn with a cationic agent selected from the group consisting of diallyldimethylammonium chloride (DADMAC), polymerized diallyldimethylammonium chloride (Poly-DADMAC), [2-(acryloyloxy)ethyl]trimethylammonium chloride (AOETMAC), 3-chloro-2-hydroxylpropyl trimethyl-ammonium chloride (CHPTAC), and combinations thereof.

Aspect 34. The method of any one of the preceding Aspects, wherein the modified indigo compound comprises an indigo compound in which at least one of the amine groups is functionalized with an amido-pyridine or a salt thereof.

Aspect 35. The method of Aspect 34, wherein the modified indigo compound is selected from a compound having the following base structure, or a salt thereof:

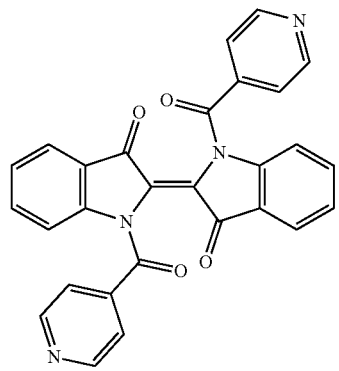 [SMILES: O=C1/C(=C2/C(=O)c3ccccc3N2C(=O)c2ccncc2)N(C(=O)c2ccncc2)c2ccccc21]

Aspect 36. The method of Aspect 35, wherein the salt is a methyl sulfate salt, an iodide salt, or a chloride salt.

Aspect 37. The method of Aspect 35, wherein the modified indigo compound is selected from the following compounds:

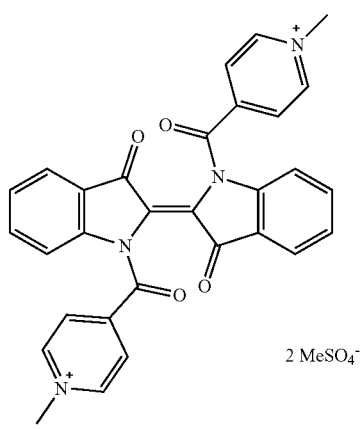
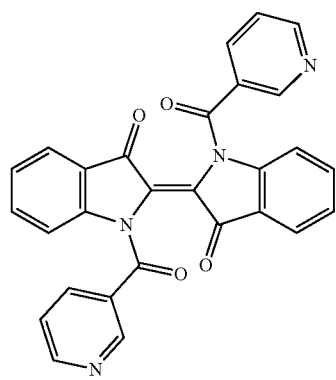 [SMILES: O=C1/C(=C2/C(=O)c3ccccc3N2C(=O)c2cccnc2)N(C(=O)c2cccnc2)c2ccccc21]
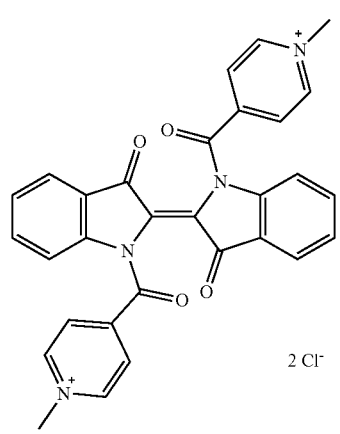
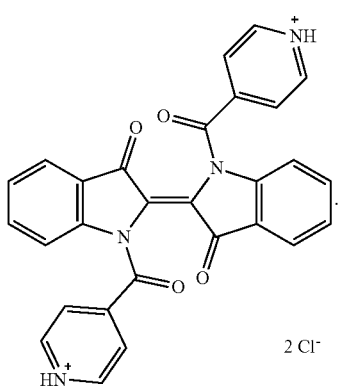
Aspect 38. The method of Aspect 34, wherein the modified indigo compound is selected from a compound having the following base structure, or a salt thereof:
Aspect 39. The method of Aspect 38, wherein the salt is a methyl sulfate salt, an iodide salt, or a chloride salt.
Aspect 40. The method of Aspect 38, wherein modified indigo compound is selected from the following compounds:
3
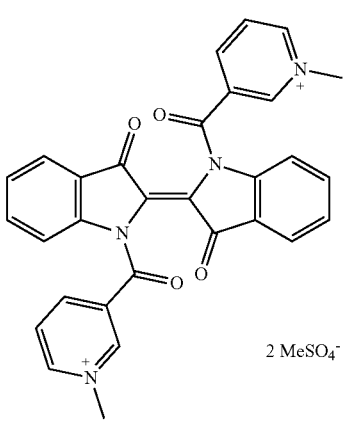
4

-continued

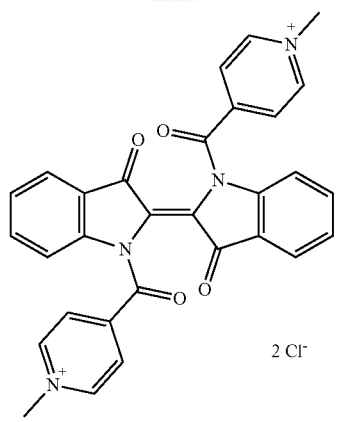

2 Cl⁻

Aspect 41. A compound having the following base structure, or a salt thereof:

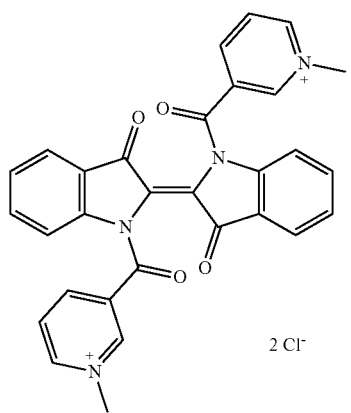

Aspect 42. The compound of Aspect 41, wherein the salt is a methyl sulfate salt, an iodide salt, or a chloride salt.

Aspect 43. The compound of Aspect 41, wherein the modified indigo compound is selected from the following compounds:

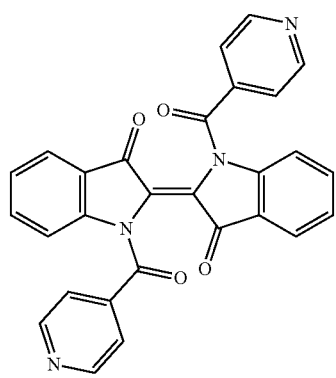

2 MeSO₄⁻

-continued

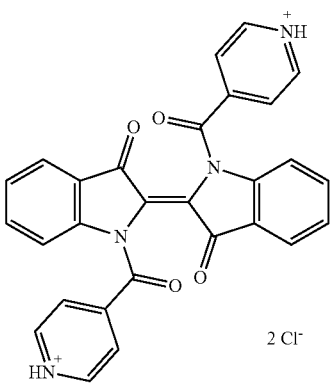

2 Cl⁻

Aspect 44. The compound of Aspect 43, wherein the modified indigo compound is:

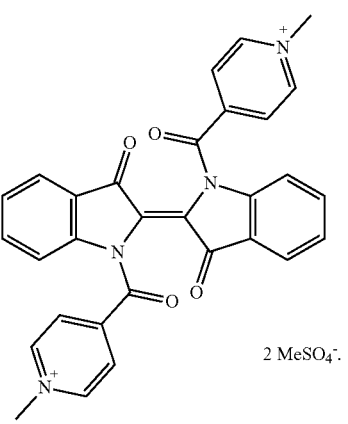

2 MeSO₄⁻.

Aspect 45. The compound of Aspect 43, wherein the modified indigo compound is:

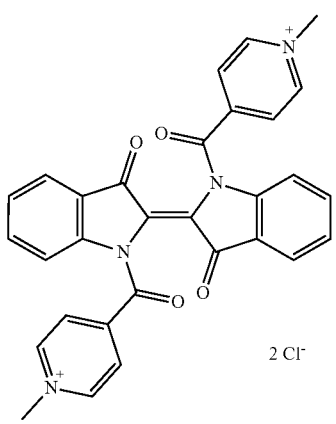

Aspect 46. The compound of Aspect 43, wherein the modified indigo compound is:

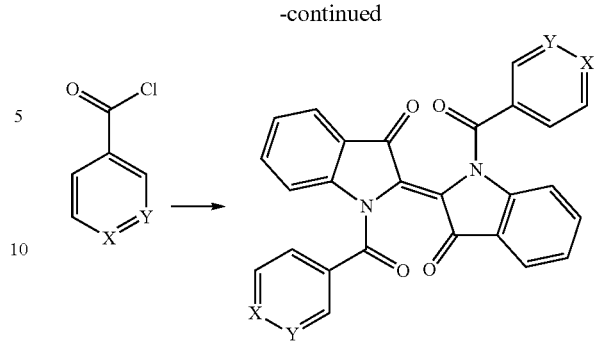

Compound 2: X = C, Y = N
Compound 6: X = N, Y = C

To a suspension of indigo (54 g, 0.206 mol) in anhydrous pyridine (200 mL) in a 1.0 L flask fitted with a condenser and mechanical stirrer, under an inert atmosphere (Ar or $N_2$) was added isonicotinoyl chloride (92 g, 0.515 mol, 2.5 equivalents) portion wise with efficient stirring. The reaction mixture was heated to 50° C. for 6 hours (the progress of the reaction was followed by TLC (5% MeOH in DCM, Rf 0.5). After this time, the deep red/pink reaction mixture was allowed to cool and most of the pyridine was removed under vacuum. The resulting reaction mixture was quenched by pouring into cold water (500 mL) with stirring for 30 minutes. The solid precipitate thus formed was isolated by filtration and washed thoroughly with cold water. The deep red solid was dried under vacuum and then dissolved in dichloromethane (1 L); this solution was further dried using anhydrous sodium sulfate. The deep red solution was filtered and concentrated under vacuum until dry to afford a deep purple/red solid (60 g, 61.8% yield). Characterization by $^1$HNMR and MS confirmed the desired compounds.

Figure 4:
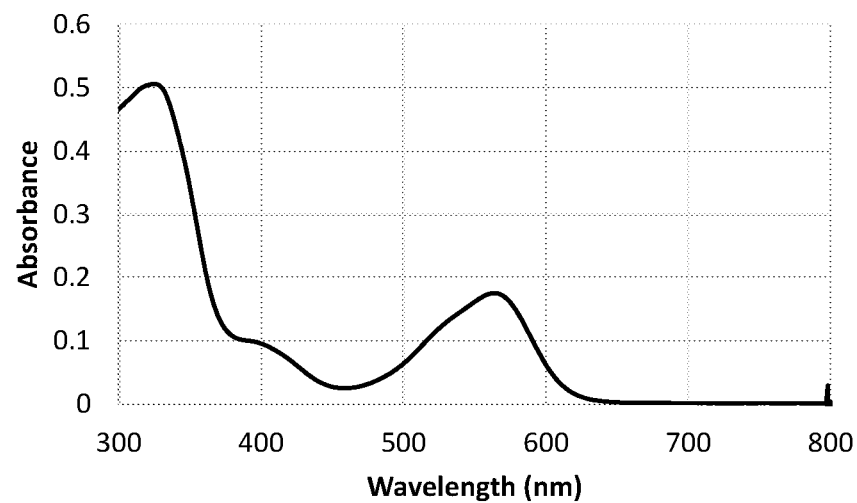
FIG. 4 is the UV-Vis spectrum of Compound 2 in methanol.

Compound 2: Mw=$C_{28}H_{16}N_4O_4$, 472.45; $^1$H NMR (400 MHz, DMSO) δ 9.02 (s, 2H), 8.81-8.75 (m, 2H), 8.62-8.61 (m, 2H), 7.71 (d, J=7.4 Hz, 1H), 7.69-7.63 (m, 1H), 7.61 (dd, J=7.8, 4.9 Hz, 4H), 7.48 (dd, J=9.3, 5.8 Hz, 2H), 7.28 (t, J=7.8 Hz, 2H), 7.28 (t, J=7.8 Hz, 2H). See, FIG. 4 which is the UV-Vis spectrum of Compound 2 in methanol.

Figure 5:
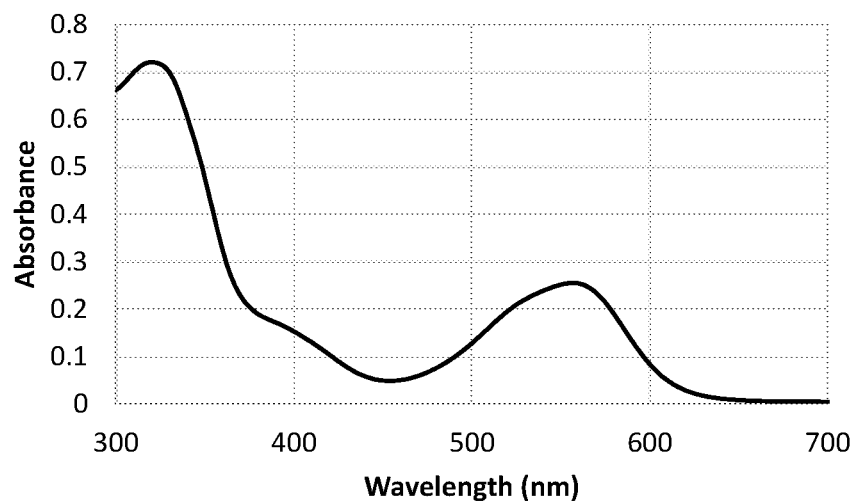
FIG. 5 is the UV-Vis spectrum of Compound 6 in methanol.
Figure 6:
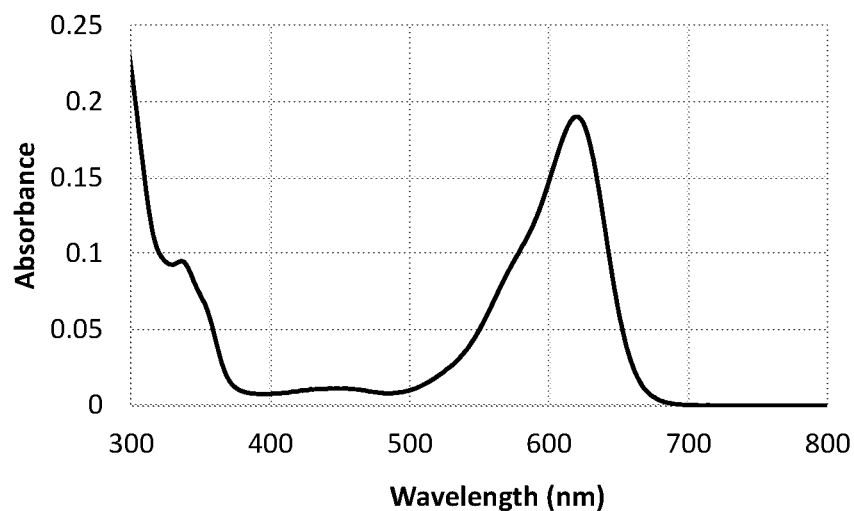
FIG. 6 is the UV-Vis spectrum of indigo in dimethylsulfoxide.

Compound 6: Mw=$C_{28}H_{16}N_4O_4$, 472.45; $^1$H NMR (400 MHz, DMSO) δ 8.82 (d, J=5.7 Hz, 4H), 7.80 (d, J=18.1 Hz, 4H), 7.70 (d, 0.1=7.5 Hz, 2H), 7.65 (t, J=7.6 Hz, 2H), 7.60-7.35 (m, 2H), 7.28 (t, J=7.6 Hz, 2H). See, FIG. 5 which is the UV-Vis spectrum of Compound 6 in methanol.

VII. EXAMPLES

All UV-Vis spectra were obtained using a Varian Cary 6000i UV-Vis spectrophotometer.

Reactions of indigo with nicotinoyl chloride/isonicotinoyl chloride

Example 1: Synthesis of Compounds 2 and 6

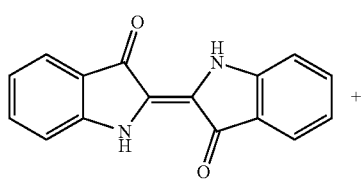

Example 2: Synthesis of Compound 28

-continued

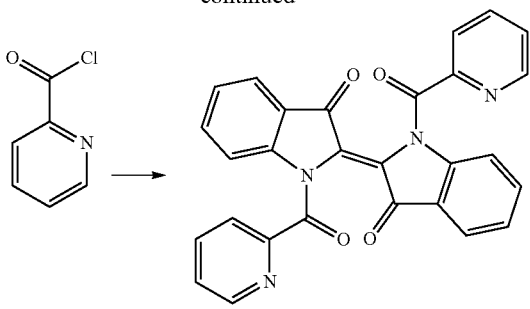

To a suspension of indigo (5.2 g, 20 mmol) in anhydrous pyridine (50 mL) in a flask fitted with a condenser and mechanical stirrer, under an inert atmosphere (Ar or $N_2$) was added 2-nicotinoyl chloride (14.2 g, 80 mmol, 4 equiv) portion wise with efficient stirring. The brown reaction mixture became quite thick and warm and was allowed to stir at room temperature for 30 mins and then gradually heated to 50° C. hours (the progress of the reaction was followed by TLC (5% MeOH in DCM, Rf 0.3). The resulting reaction mixture was quenched by pouring into cold water (200 mL) with stirring for 30 minutes. The solid precipitate isolated by filtration proved to be un-reacted indigo. The aqueous was extracted into dichloromethane (3×50 mL), dried and concentrated to a give a brown solid which was purified using flash column chromatography. The main product isolated (stained yellow on TLC, Rf=0.3 as above) as a yellow solid and was characterised by NMR. The analysis was not consistent with the above structure indicating that the 2-derivative behaves quite differently from the 3 and 4-derivatives when reacted with indigo.

$^1$H NMR (400 MHz, DMSO) δ 8.82 (d, J=4.7 Hz, 1H), 8.71 (d, J=4.1 Hz, 1H), 8.31 (t, J=7.7 Hz, 1H), 8.09-7.95 (m, 1H), 7.88-7.79 (m, 1H), 7.68-7.59 (m, 1H), 7.47-7.39 (m, 1H), 7.36 (dd, J=6.5, 1.7 Hz, 1H), 6.32 (d, J=9.2 Hz, 1H), 6.19-6.14 (m, 1H).

Example 3: Synthesis of Compound 15

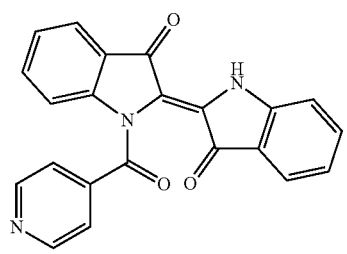 [SMILES: O=C1/C(=C2/C(=O)c3ccccc3N2C(=O)c2ccncc2)Nc2ccccc21]

To a suspension of indigo (20 g, 0.076 mol) in anhydrous pyridine (100 mL) in a flask fitted with a condenser and mechanical stirrer, under an inert atmosphere (Ar or $N_2$) was added isonicotinoyl chloride (13 g, 0.076 mol, 1 equiv) portion wise with efficient stirring. The reaction mixture was heated to 50° C. for 6 hours (the progress of the reaction was followed by TLC (5% MeOH in DCM, Rf 0.6; TLC also showed the presence of some di-substituted product). After this time, the deep red/pink reaction mixture was allowed to cool and most of the pyridine was removed under vacuum. The resulting reaction mixture was quenched by pouring into cold water (500 ml) with stirring for 30 minutes. The solid precipitate thus formed was isolated by filtration and washed thoroughly with cold water. The deep red solid was dried under vacuum and then dissolved in dichloromethane (1 L); this solution was further dried using anhydrous sodium sulphate. The deep red solution was filtered and concentrated under vacuum until dry to afford a deep purple/red solid. The crude material was separated by flash column chromatography (1% MeOH/dichloromethane). The pure product was separated as a bright pink solid in 25% yield (7 g).

Mw, $C_{22}H_{13}N_3O_3$, 367.36; $^1$H NMR (400 MHz, DMSO) δ 11.05 (s, 1H), 8.67 (d, J=5.9 Hz, 2H), 7.88 (d, J=7.5 Hz, 1H), 7.80-7.68 (m, 4H), 7.52 (t, J=7.7 Hz, 1H), 7.39 (dd, J=12.4, 7.2 Hz, 2H), 7.29 (d, J=8.1 Hz, 1H), 6.92 (t, J=7.4 Hz, 1H).

Quaternization of nicotinoyl/isonicotinoyl derivatives

Example 4: Synthesis of Compounds 3 and 7

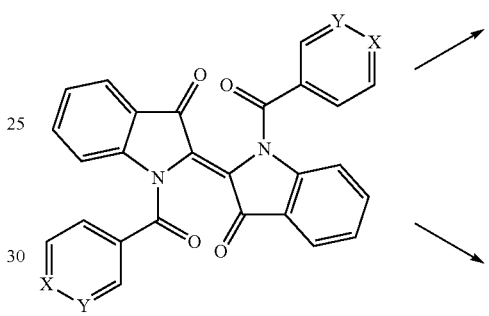

Compound 2: X = C, Y = N
Compound 6: X = N, Y = C

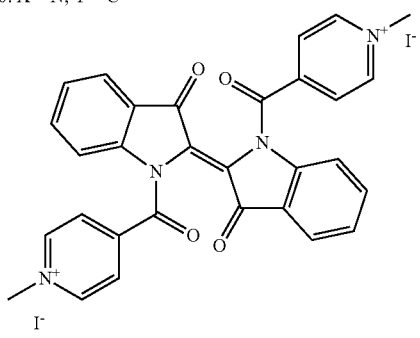

Compound 7

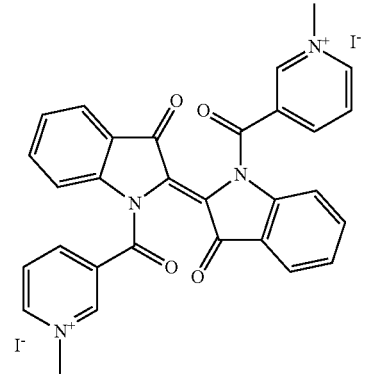

Compound 3

To a refluxing solution of the precursor (Compound 2 or 6) in acetone, methyl iodide (3.2 equiv) was added drop-wise over 20 mins. The mixture was allowed to reflux for a further 5 hours and then allowed to cool to 0° C.; the precipitated product was isolated by filtration and washed with ethyl acetate:pet ether (1:1) and dried. The brown solid was isolated in quantitative yield.

Compound 3: Mw, 756.33, $C_{30}H_{22}I_2N_4O_4$

Compound 7: Mw, 756.33, $C_{30}H_{22}I_2N_4O_4$; $^1$H NMR (400 MHz, DMSO) δ 9.28 (d, J=6.5 Hz, 4H), 8.50-8.38 (m, 4H), 8.14 (d, J=8.2 Hz, 2H), 7.85-7.76 (m, 4H), 7.41 (t, J=7.5 Hz, 2H). 4.64 (s, 6H).

Example 5: Synthesis of Compound 16

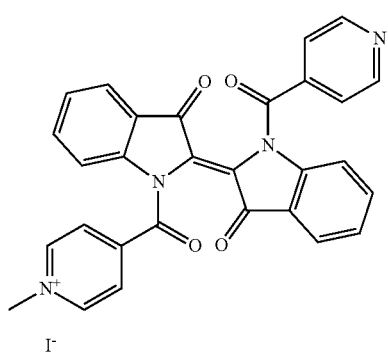 [SMILES: C[n+]1ccc(C(=O)N2/C(=C3\C(=O)c4ccccc4N3C(=O)c3ccncc3)C(=O)c3ccccc32)cc1 ; [I-]]

To a refluxing solution of the precursor in acetone, methyl iodide (1.25 equiv) was added drop-wise over 20 mins. The mixture was allowed to reflux for a further 18 hours and then allowed to cool to 0° C.; the precipitated product was isolated by filtration and washed with ethyl acetate:pet ether (1:1) and dried.

Mw, 614.14, $C_{29}H_{19}IN_4O_4$

Example 6: Synthesis of Compound 18

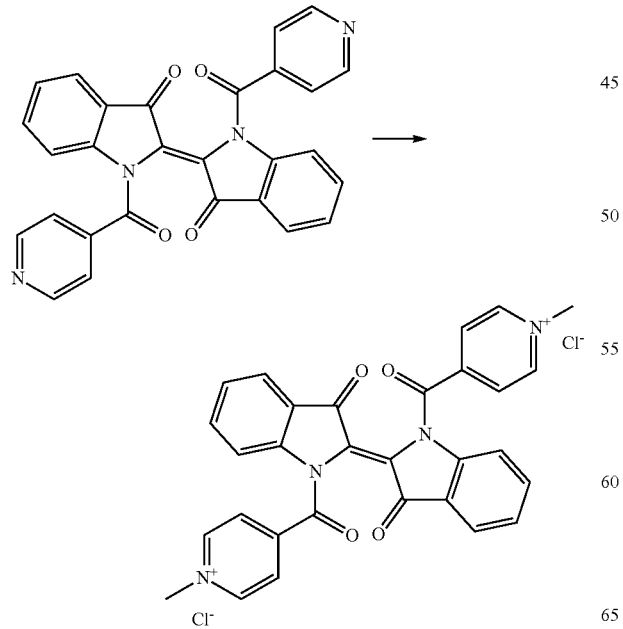

Compound 6 (0.05 mol) was introduced into a pressure flask to which was added acetone (250 mL). The solution was saturated with chloromethane gas and sealed. The flask was heated to 100° C. for 48 hours with stirring. After this time, the flask was allowed to cool to room temperature (TLC indicated complete consumption of the starting material). The product, which precipitated out, was isolated by filtration and washed with acetone and dried to constant weight. After drying, a purple solid was isolated which was characterized by $^1$H NMR (59% yield).

Mw 573.0, $C_{30}H_{22}N_4O_4Cl_2$; $^1$H NMR (DMSO): δ 9.2 (d, 4H, J=6.5 Hz), 8.5 (d, 4H, J=6.5 Hz), 8.1 (d, 2H, J=8.2 Hz), 67.8 (m, 4H) 7.4 (d, 2H, J=11 Hz), 4.4 (6H s).

Example 7: Synthesis of Compound 3B

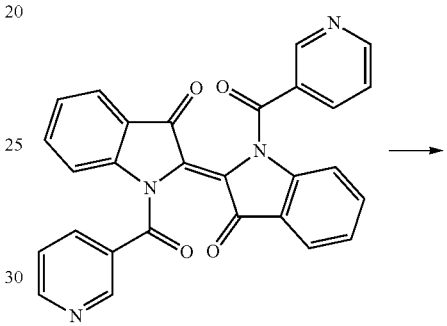

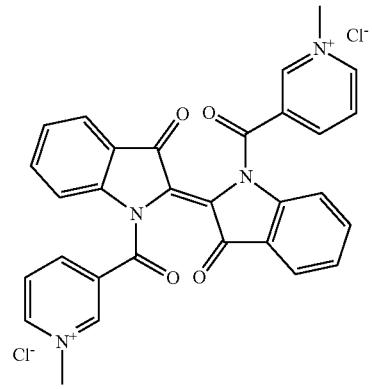

Compound 2 (0.05 mol) is introduced into a pressure flask to which is added acetone (250 mL). The solution is saturated with chloromethane gas and sealed. The flask is heated to 100° C. for 48 hours with stirring. After this time, the flask is allowed to cool to room temperature. The product, which precipitates out, is isolated by filtration and washed with acetone and dried to constant weight. After drying, a purple solid is isolated.

Example 8: Synthesis of Compounds 4, 8 and 41

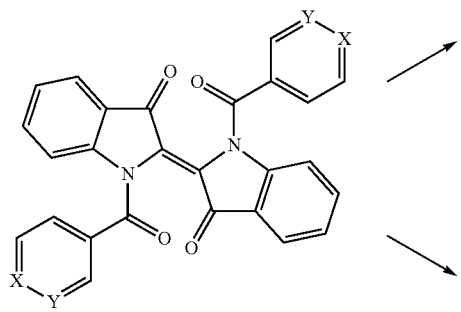

Compound 4: X = C, Y = N, R = Me
Compound 8: X = N, Y = C, R = Me
Compound 41: X = N, Y = C, R = Et

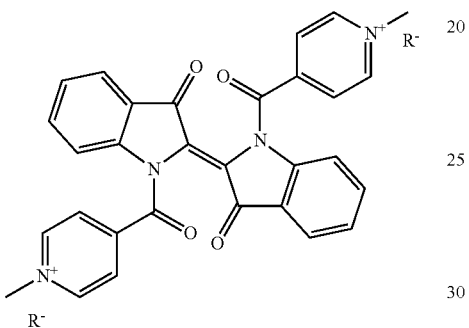

R = Me = Compound 8
R = Et = Compound 41

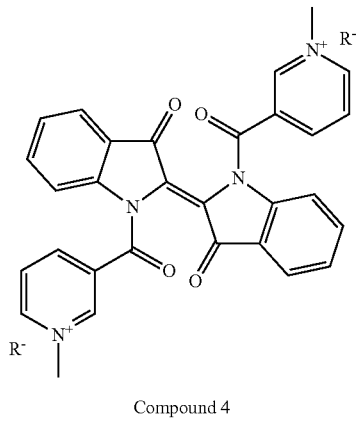

Compound 4

Figure 2:
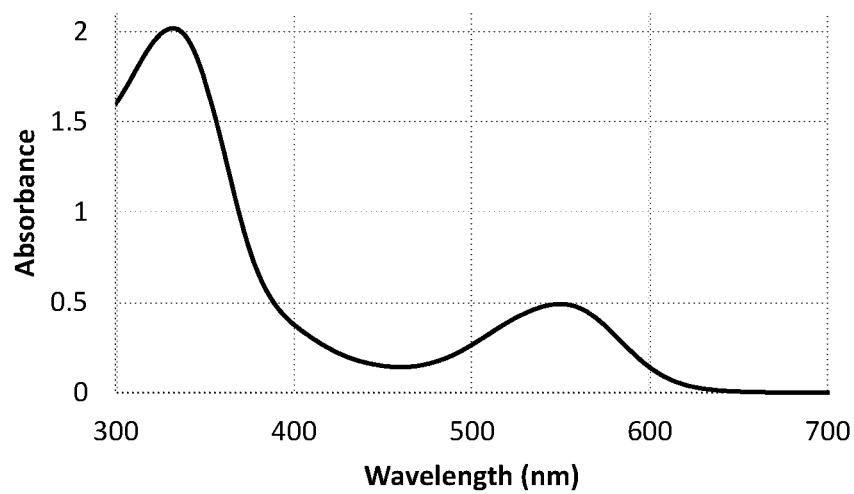
FIG. 2 is the UV-Vis spectrum of Compound 4 in water.

Compound 2 or 6 was heated with anhydrous dialkylsulfate (R$_2$SO$_4$, R=Me, Et; 5 equiv) with stirring at 50° C. for 18 hours under an inert atmosphere. TLC after this time showed the complete consumption of starting material. Once the reaction mixture was allowed to cool to room temperature, anhydrous diethyl ether (20 equiv) was added and the mixture stirred for 30 minutes. After this time, stirring was stopped and the precipitated compound was allowed to settle. The supernatant was removed via a filtered cannula under argon pressure. This process was repeated twice more to ensure removal of residual dimethyl sulfate. The solid residue was dried under a stream of Ar and stored under Ar, giving the product in almost quantitative yield Compound 4 (J. Chem. Perk. Trans. 1984 2305-2309); Mw, 724.11, C$_{32}$H$_{28}$N$_4$O$_{12}$S$_2$; $^1$H NMR (400 MHz, CDCl$_3$) δ 9.56 (s, 2H), 9.11 (d, 4H), 8.43 (dd, 2H), 8.0-7.4 (m, 8H). 4.51 (s, 6H). See, FIG. 2 which is the UV-Vis spectrum of Compound 4 in water.

Compound 8: Mw, 724.11, C$_{32}$H$_{28}$N$_4$O$_{12}$S$_2$; $^1$H NMR (DMSO): δ 9.2 (d, 4H, J=6.6 Hz), 8.4 (d, 4H, J=6.6 Hz), 8.1 (d, 2H, J=7.4 Hz), 7.8 (t, 4H, J=8.1 Hz), 7.4 (d, 2H, J=7.4 Hz), 4.5 (s, 6H).

Figure 9:
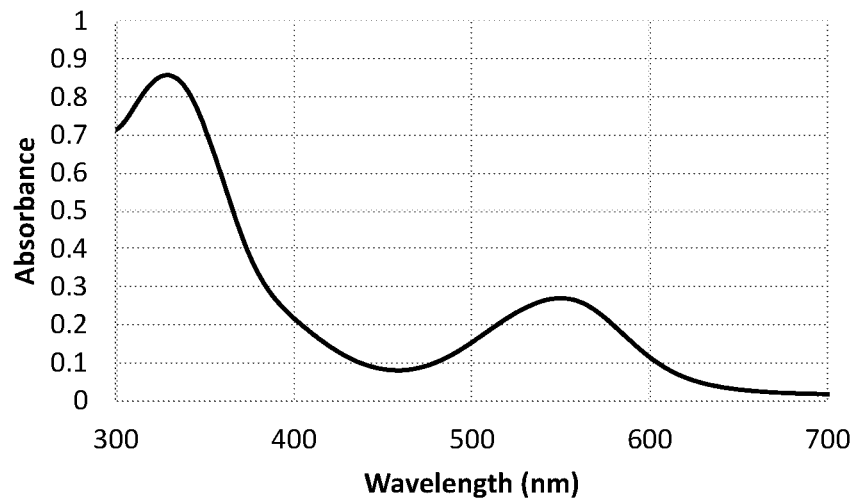
FIG. 9 is the UV-Vis spectrum of Compound 41 in water.

Compound 41: Mw, 724.11, C$_{32}$H$_{28}$N$_4$O$_{12}$S$_2$; $^1$H NMR (400 MHz, DMSO) δ 9.35 (d, J=10.0 Hz, 4H), 8.54-8.38 (m, 4H), 8.14 (d, J=8.3 Hz, 2H), 7.78 (m, 6H), 7.48-7.34 (t, J=12.1 Hz, 2H), 4.34 (q, J=7.1 Hz, 4H), 3.74 (q, J=7.1 Hz, 4H), 1.34 (t, J=7.1 Hz, 6H), 1.1 (t, J=7.1 Hz, 6H). See, FIG. 9 which is the UV-Vis spectrum of Compound 41 in water.

Example 9: Synthesis of Compound 17

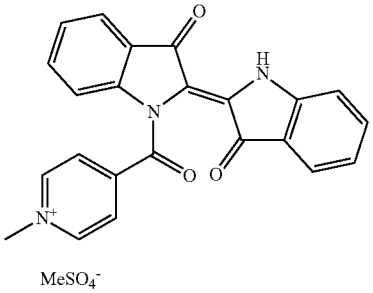 [SMILES: "MeSO4-" ; C[n+]1ccc(C(=O)N2/C(=C3/Nc4ccccc4C3=O)C(=O)c3ccccc32)cc1]

MeSO$_4^-$

Compound 15 was heated with anhydrous dimethyl sulfate (5 equiv) with stirring at 50° C. for 18 hours under an inert atmosphere. TLC after this time showed the complete consumption of starting material. Once the reaction mixture was allowed to cool to room temperature, anhydrous diethyl ether (20 equiv) was added and the mixture stirred for 30 minutes.

After this time, stirring was stopped and the precipitated compound was allowed to settle. The supernatant was removed via a filtered cannula under argon pressure. This process was repeated twice more to ensure removal of residual dimethyl sulfate. The solid residue was dried under a stream of Ar and stored under Ar, giving the product in almost quantitative yield Mw C$_{24}$H$_{19}$N$_3$O$_7$S, 493.43; $^1$H NMR (400 MHz, DMSO) δ 11.08 (s, 1H), 9.01 (d, J=6.5 Hz, 2H), 8.51 (d, J=6.5 Hz, 2H), 8.03 (d, J=8.3 Hz, 1H), 7.93 (d, J=7.5 Hz, 1H), 7.78 (t, J=7.8 Hz, 1H), 7.53 (t, J=7.5 Hz, 1H), 7.46 (d, J=7.4 Hz, 1H), 7.41 (d, J=7.5 Hz, 1H), 7.30 (d, J=8.1 Hz, 1H), 6.94 (t, J=7.4 Hz, 1H), 4.29 (s, 3H), 3.95 (s, 3H). See, FIG. 1 which is the UV-Vis spectrum of Compound 17 in dimethylsulfoxide.

Protonation of nicotinoyl/isonicotinoyl derivatives

Example 10: Synthesis of Compound 35

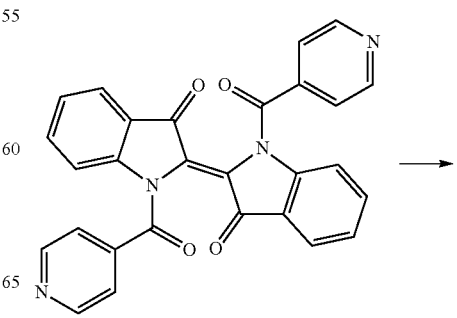

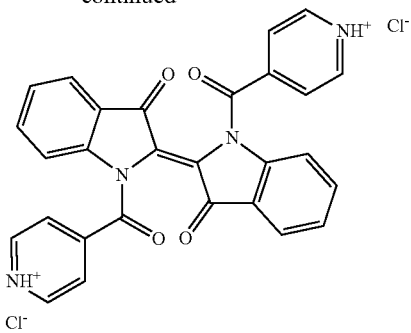

Compound 6 (0.060 mol; as prepared above) was introduced into a flask to which was added dichloromethane (1 L). A stream of hydrogen chloride gas was passed through the solution so formed at room temperature with occasional stirring. After a few minutes, the reaction mixture thickened and a precipitate formed. The mixture was allowed to stand under an atmosphere of HCl gas for 1 hour. The solvent was removed under vacuum and the product was co-evaporated with anhydrous DCM (2×50 mL) and dried to constant weight to afford a purple solid, compound 35 (quantitative yield).

Figure 7:
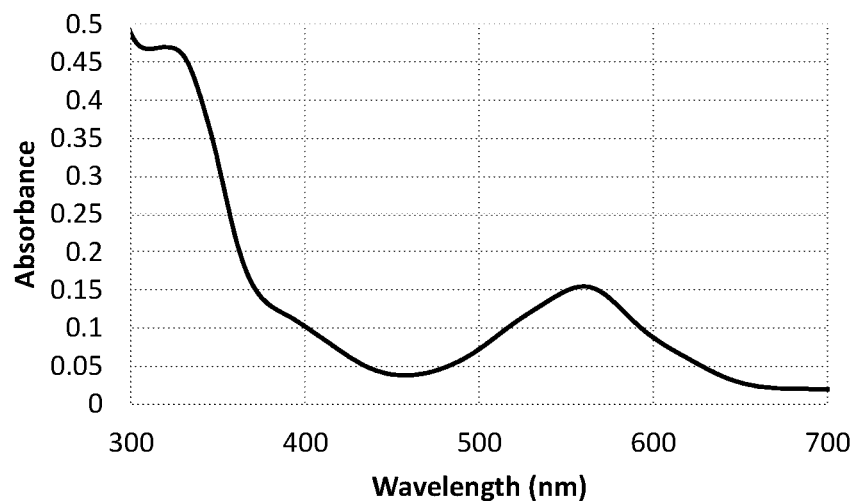
FIG. 7 is the UV-Vis spectrum of Compound 35 in methanol.

Mw, $C_{28}H_{18}N_4O_{12}Cl_2$, 545; $^1$H NMR (400 MHz, DMSO) δ 9.22 (bs, 4H), 8.28 (d, J=5.3 Hz, 4H), 8.08 (bs, 2H), 7.82-7.68 (m, 4H), 7.35 (t, J=12.7 Hz, 2H). See, FIG. 7 which is the UV-Vis spectrum of Compound 35 in methanol.

Example 11: Synthesis of Compound 44

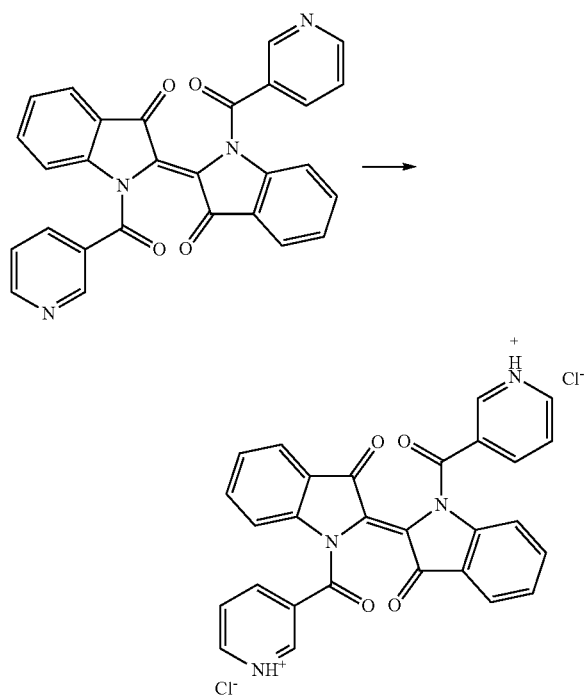

Compound 2 (0.060 mol; as prepared above) is introduced into a flask to which is added dichloromethane (1 L). A stream of hydrogen chloride gas is passed through the solution at room temperature with occasional stirring. After a few minutes, the reaction mixture thickens and a precipitate forms. The mixture is allowed to stand under an atmosphere of HCl gas for 1 hour. The solvent is removed under vacuum and the product is co-evaporated with anhydrous DCM (2×50 mL) and dries to constant weight.

Example 12: Synthesis of Compound 37

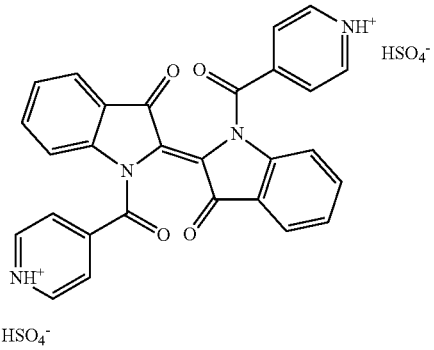

To a solution of compound 6 (5.0 g, 10.6 mmol) in dichloromethane (30 mL) at 0° C. under an atmosphere of argon was added a solution of anhydrous sulphuric acid (0.021 mol, 2.1 g) in methanol (25 mL) drop-wise with stirring over 30 mins. The mixture was allowed to stir at 0° C. for a further 30 mins and then allowed to warm to room temperature. After 1 hour, anhydrous diethyl ether (100 mL) was added and the mixture stirred for 10 mins and then stirring was stopped and the precipitated solid was allowed to settle. The supernatant was removed by a filtered cannula under argon pressure; this process was repeated twice using 50 mL of diethyl ether each time. The product was isolated in quantitative yield as a bright red solid (7.0 g).

Figure 8:
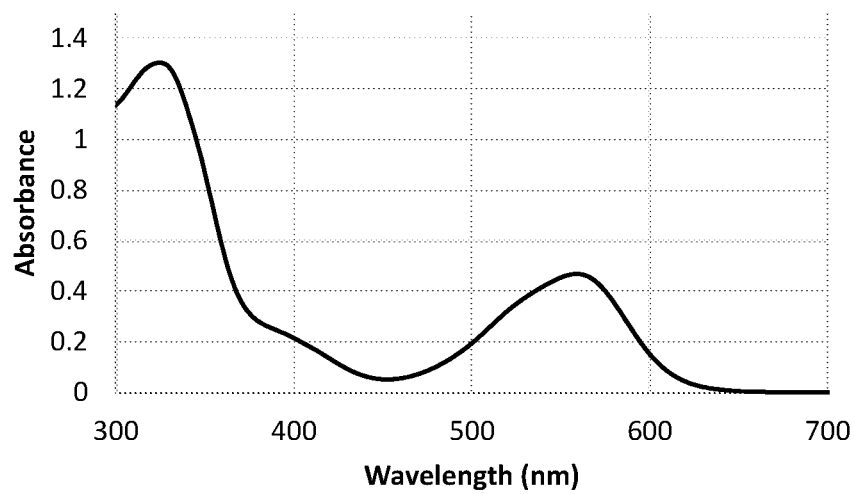
FIG. 8 is the UV-Vis spectrum of Compound 37 in methanol/water.

Mw $C_{28}H_{20}N_4O_{12}S_2$, 668.47; FIG. 8 is the UV-Vis spectrum of Compound 37 in methanol/water; mass analysis was consistent with the formation of the corresponding ion.

Compound 37 hydrolyzes to indigo under hydrolyzing conditions.

Reactions of Indigo with Alkoxy Ethers

Example 13: Synthesis of Compound 13

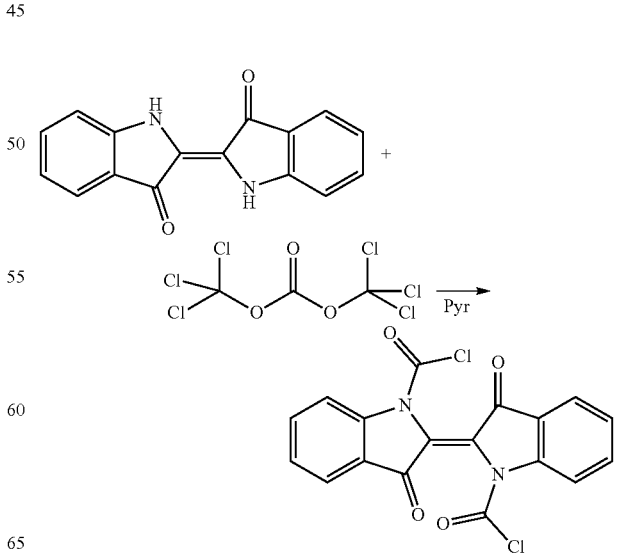

Triphosgene (23.8 g, 80 mmol) was added to pyridine at 0° C. and the mixture then allowed to warm to room temperature. After stirring for 30 mins at room temperature, indigo (10.5 g, 40 mmol) was added in one portion and the reaction allowed to stir overnight at room temperature. The mixture was then cooled in an ice bath and poured into ice cooled 4M $HCl_{aq}$ with vigorous stirring and the precipitated solid was isolated by filtration. The solid was further washed with cold 4M $HCl_{aq}$ followed by $H_2O$. The solid was then dried under vacuum at 40° C. to give a grey solid. This crude material was used for the following reactions.

Example 14: Synthesis of Compounds 14, 25, 29, 30, and 33

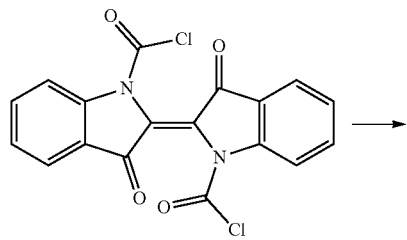

Compound 13 (3.0 g, 7.7 mmol) as prepared above) was suspended in the appropriate solvent (30 mL) and cooled in an ice-bath under an inert atmosphere. To this was added a THF solution of the alkoxy compound drop-wise (noted as "R" in Table 1) with stirring over 15 mins. The reaction mixture was allowed to stir at 0° C. for 1 hour and then allowed to warm to room temperature over 18 hours (the progress of the reaction was followed by TLC 5% MeOH/DCM). The solvents were removed under vacuum followed by addition of diethyl ether (200 ml) and stirred for 30 mins before decanting. The brown residue was taken up in DCM and purified using flash column chromatography. Fractions were characterized by $^1$H NMR.

TABLE 1

| Compound | R | Solvent |
|---|---|---|
| 14 | HO–⟨⟩–⟨⟩ | Pyridine:THF (1:1) |
| 25 | HO–⟨⟩–OH, OH | Pyridine:THF (1:1) |
| 29 | HO–⟨⟩–OH | Pyridine, 2 equiv $Et_3N$ |
| 30 | (sugar structure with multiple OH groups) | Pyridine, 2 equiv $Et_3N$ |
| 31 | $H_2N$–⟨⟩–OH (with C=O) | THF |
| 33 | HO–⟨⟩–NH–⟨⟩–OH | THF |

Reactions of Leuco-Indigo

These reactions were carried out by generating leuco-indigo in-situ by oxidation of indigo by zinc and sodium acetate in the presence of acid chloride.

Example 15: Synthesis of Compound 24B

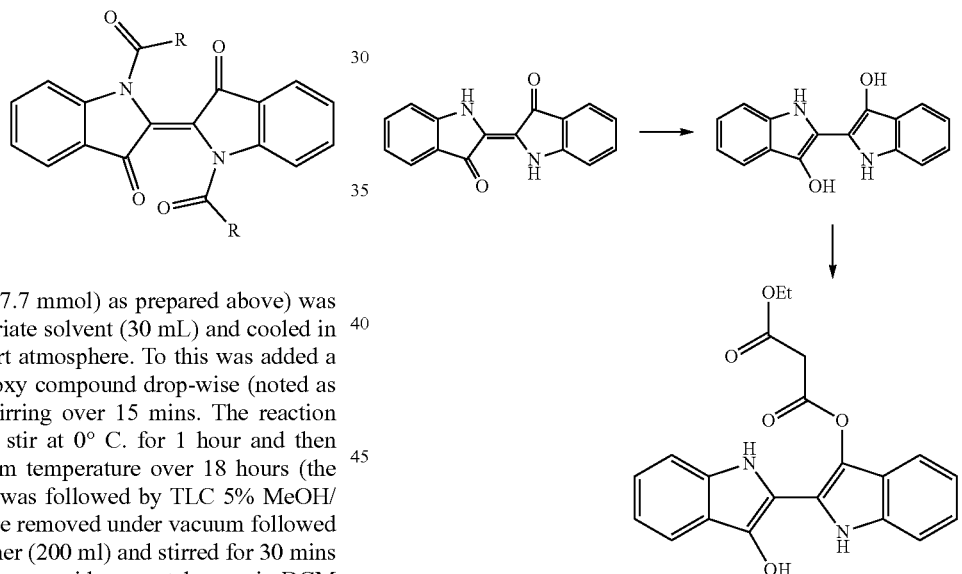

To a suspension of indigo (1.31 g, 5 mmol) in anhydrous ethyl acetate (50 mL) containing sodium acetate (1.03 g, 12.5 mmol) and zinc (3.25 g, 50 mmol) was added ethyl malonyl chloride (8.3 g, 50 mmol). The reaction mixture was allowed to stir for 30 mins at 40° C. The suspension was allowed to cool to room temperature and then concentrated to dryness. The residue was extracted with hot acetone. The crude material was purified using flash column chromatography eluting with 20% ethyl acetate:pet ether. The product was isolated as a pale yellow solid (0.5 g, 26%).

Mw=$C_{21}H_{18}N_2O_5$, 378.38; $^1$H NMR (400 MHz, DMSO) δ 12.17 (s, 1H), 11.90 (s, 1H), 8.27 (d, 7.5 Hz, 1H), 7.57-7.45 (m, 3H), 7.32-7.20 (m, 3H), 7.15 (ddd, J=8.0, 7.0, 1.0 Hz, 1H), 4.05 (q, J=7.1 Hz, 2H), 3.82 (s, 2H), 1.12-1.05 (t, 7.1 Hz, 3H).

Example 16: Synthesis of Compound 22

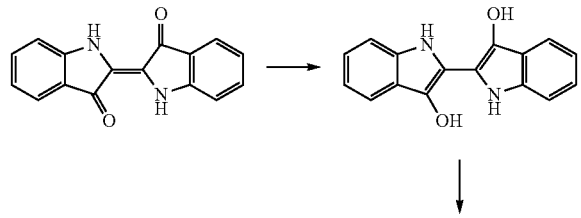

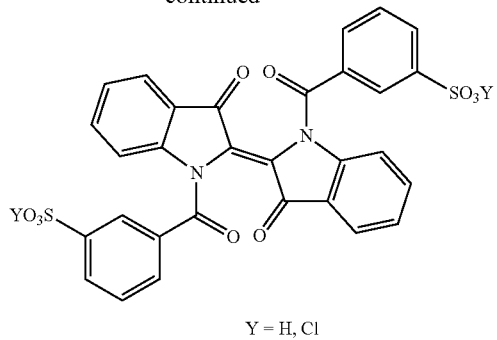

Y = H, Cl

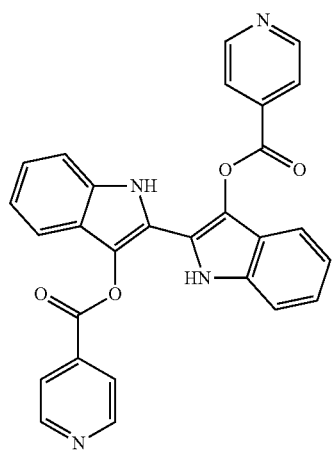

To a suspension of indigo (1.0 g, 3.8 mmol) in anhydrous ethyl acetate (50 ml) containing sodium acetate (0.8 g, 9.5 mmol) and zinc (2.49 g, 38 mmol) was added isonicotinoyl chloride (2.0 g, 11.4 mmol). The reaction mixture was allowed to stir for 30 mins at 40° C. The suspension was allowed to cool to room temperature and then concentrated to dryness. The residue was extracted with hot acetone. The crude material was purified using flash column chromatography eluting with 20% ethyl acetate:pet ether. The product was isolated as a pale yellow solid and was confirmed by $^1$H NMR to be the di-substituted product, Compound 22 (0.4 g, 22%).

Mw, $C_{28}H_{18}N_4O_4$, 474.47; $^1$H NMR (400 MHz, DMSO) δ 11.36 (s, 1H), 11.12 (s, 1H), 7.59 (d, J=8.0 Hz, 1H), 7.50 (dd, J=8.1, 0.9 Hz, 1H), 7.46-7.41 (d, 8.1 Hz, 1H), 7.36 (d, J=8.1 Hz, 1H), 7.16 (dddd, J=12.9, 8.2, 7.0, 1.2 Hz, 2H), 7.05 (ddt, J=8.1, 7.0, 1.1 Hz, 2H), 6.84 (dd, J=2.1, 0.8 Hz, 1H).

Example 17: Synthesis of Compound 20

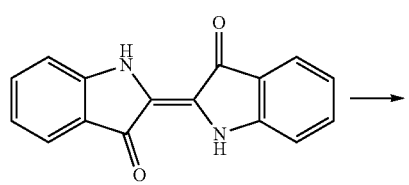

Indigo (0.824 g, 3.1 mmol) was dissolved in pyridine and to this was added 3-benzoyl chloride sulfonyl chloride (3 g, 12.4 mmol). The mixture was heated to 50° C. for 18 hours. After this time, the deep red mixture was poured onto cold water (100 ml) and stirred for 30 mins. The solid was isolated by filtration, dried under vacuum (1.98 g, 69% yield) and characterised.

Example 18: Synthesis of Compound 27

Indigo (5.2 g, 20 mmol) was dissolved in pyridine and to this was added 3-sulphoyll chloride benzoic acid (17.4 g, 80 mmol). The mixture was heated to 50° C. for 18 hours. After this time, the deep red mixture was poured onto cold water (100 ml) and stirred for 30 mins. The mixture was concentrated under vacuum to remove pyridine and the crude material was purified by column chromatography. The main fraction isolated by characterised by $^1$H NMR.

Example 19: Synthesis of Compound 11

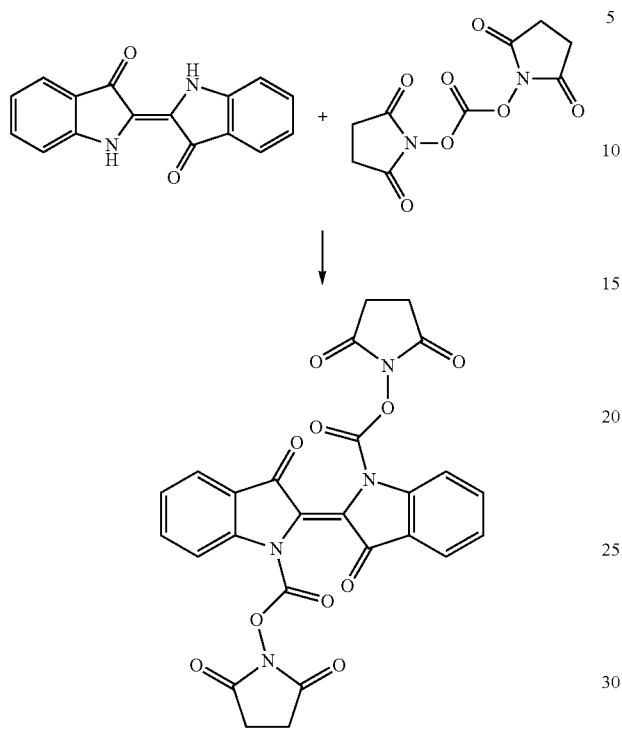

Indigo (2.62 g, 10 mmol) was added portion-wise to a suspension of N,N'-Disuccinimidyl carbonate (7.68 g, 30 mmol) in THF containing pyridine (0.125 mL) at 45° C. with rapid stirring. The reaction mixture was allowed to stir at this temperature for 48 hours (the progress of the reaction was monitored by TLC, 5% MeOH/DCM). After this time, TLC showed a considerable amount of un-reacted indigo was still present; this was removed by filtration and the solid washed with DCM. The organic filtrate was concentrated to dryness and re-dissolved in DCM, washed with NaHCO$_3$ followed by H$_2$O and then dried. Concentration under vacuum afforded a dark brown oil which was purified by column chromatography.

Example 20: Synthesis of Compound 23

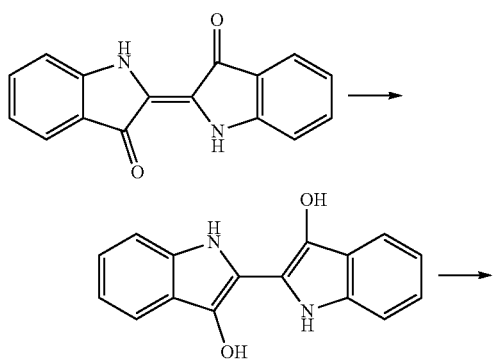

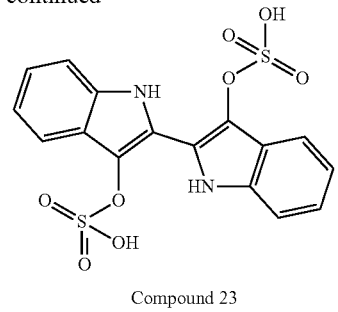

Compound 23

To a suspension of indigo (1.0 g, 3.8 mmol) in anhydrous ethyl acetate (50 mL) containing sodium acetate (0.8 g, 9.5 mmol) and zinc (2.49 g, 38 mmol) was added chlorosulfonic acid (2.2 g, 19 mmol). The reaction mixture was allowed to stir for 30 mins at 40° C. The suspension was allowed to cool to room temperature and then filtered to remove zinc. The yellow brown filtrate was concentrated to dryness to give dark yellow oil.

Example 21: Synthesis of Compound 24A

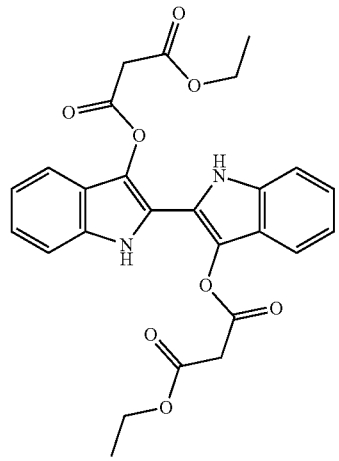 [SMILES: CCOC(=O)CC(=O)Oc1c(-c2[nH]c3ccccc3c2OC(=O)CC(=O)OCC)[nH]c2ccccc12]

To a suspension of indigo (1.31 g, 5 mmol) in anhydrous ethyl acetate (50 mL) containing sodium acetate (1.03 g, 12.5 mmol) and zinc (3.25 g, 50 mmol) is added ethyl malonyl chloride (8.3 g, 50 mmol). The reaction mixture is allowed to stir at 40° C. for at least 1 hour. The suspension is allowed to cool to room temperature and then concentrates to dryness. The residue is extracted with hot acetone. The crude material is purified using flash column chromatography eluting with 20% ethyl acetate:pet ether.

Example 22: Synthesis of Compound 38

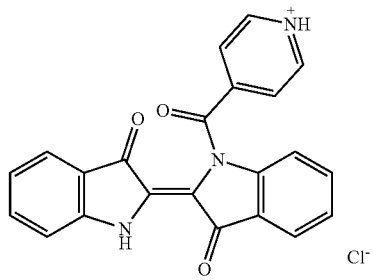 [SMILES: O=C1/C(=C2/C(=O)c3ccccc3N2C(=O)c2ccncc2)Nc2ccccc21 ; [Cl-]]

This compound is prepared using the procedure for Compound 18 in Example 6 using the corresponding free base.

Example 23: Synthesis of Compound 39

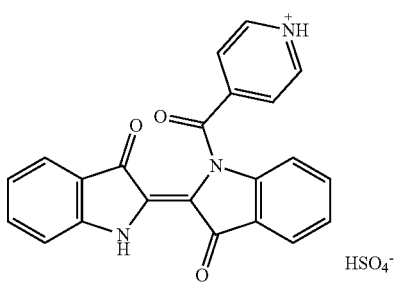

This compound is prepared using the procedure for Compound 37 in Example 12 using the corresponding free base.

Example 24: Synthesis of Compound 43

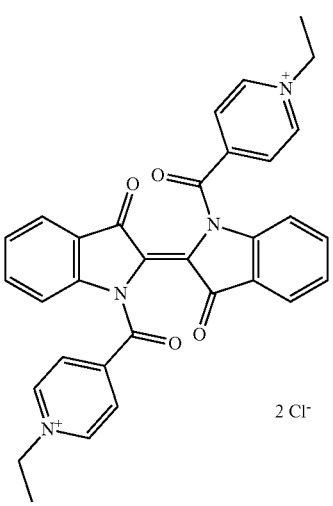

This compound is prepared by dissolving Compound 6 in DCM, followed by addition of chloroethane gas in dichloromethane/ethanol, dichloromethane/Bu$_4$N$^+$Br$^-$, ethanol, ethanol/pyridine, or isopropanol in a sealed pressure tube at 100° C. The compound was then purified and isolated.

Example 25: Storage Stability of Compound 8

(a) Test 1

Figure 3:
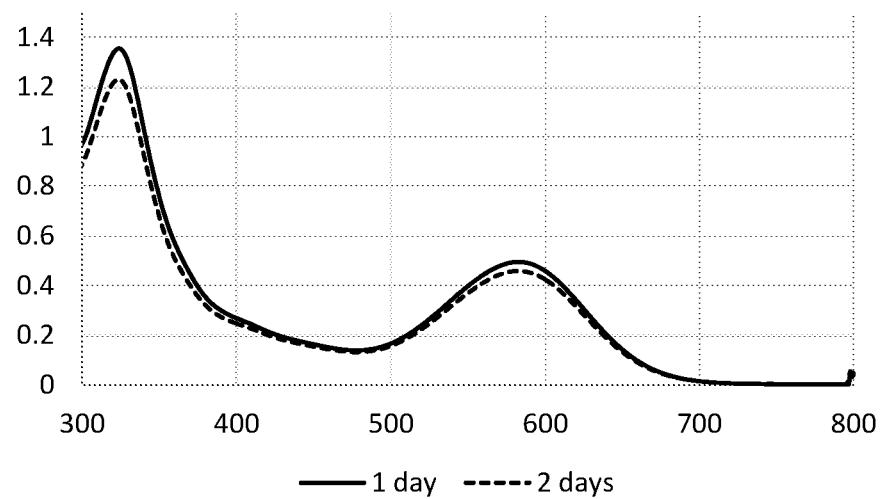
FIG. 3 is the UV-Vis spectra of diluted 3% Compound 8 in water after 1 and 2 days of storage at room temperature.
Figure 11A:
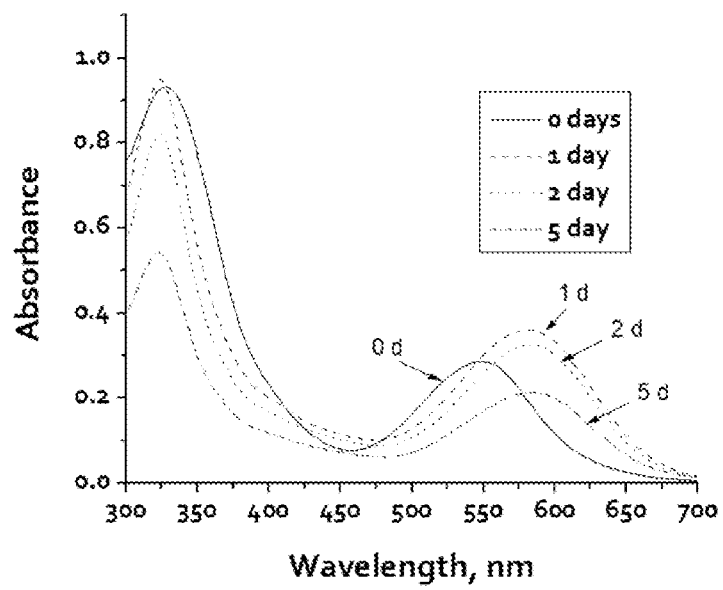
FIG. 11A is the UV-Vis spectra taken over 2 days for a 0.01 wt. % Compound 8 aqueous solution stored at room temperature.

The stability of Compound 8 was measured by diluting samples of the compound in water to provide 0.01 and 3% wt. % solutions. The solutions were then stored at room temperature for 5 days. The UV-Vis spectra of the solution after 1, 2, and 5 days were obtained. FIGS. 3 and 11A are the UV-Vis spectra which show the robustness of the dye compound after at least 2 days of storage at room temperature at both concentrations. See, FIG. 11A which showed that 41% of the compound converted to indigo over the 5 day period.

(b) Test 2

Figure 12:
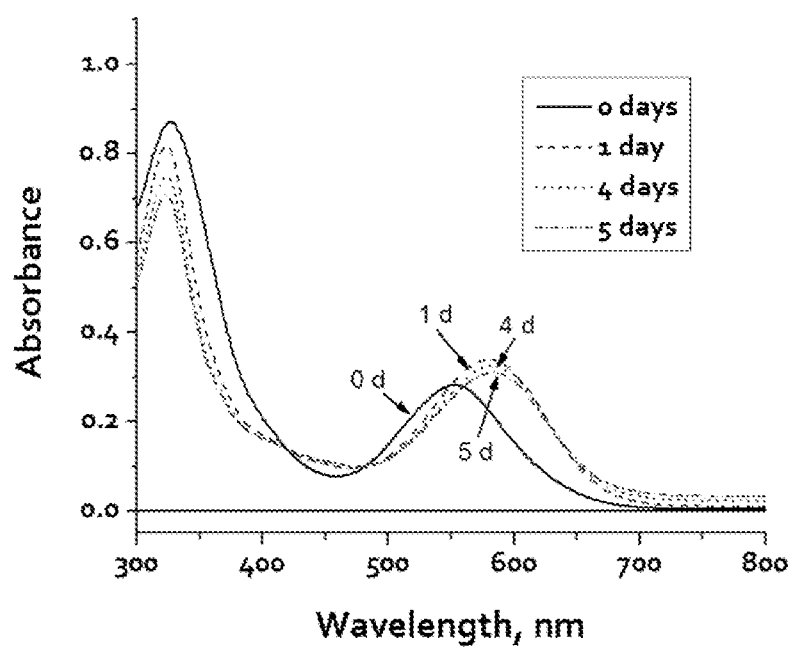
FIG. 12 is the UV-Vis spectra taken over 5 days for a 0.01 wt. % Compound 8 aqueous solution containing 0.1 M NaCl (aq) and stored at room temperature. Over a 5 day period, 9% of the initial compound converts to indigo.

The longer term stability of Compound 8 was measured by diluting a sample of the compound in water to provide a 0.01 wt. % solution containing 0.1M NaCl (aq). The solution was then stored at room temperature for 5 days. The UV-Vis spectra of the solution were obtained daily over the 5 days. See, FIG. 12 which showed that only 9% of the compound converted to indigo over the 5 day period.

(c) Test 3

The stability and concurrent dyeing ability of Compound 8 was evaluated. Specifically, the UV-Vis spectra were was taken over 3 days for an aqueous solution containing 0.6 wt. % Compound 8 stored at room temperature. For each time point, a small aliquot of the dye solution was removed and diluted by a factor of 60 with water to collect the UV-Vis spectrum. See, FIG. 14. Prior to collecting the UV-Vis data, the solution was used to dye a cotton skein. The depth of shade of the dyed and hydrolyzed cotton skein was retained over the three day period.

(d) Test 4

Aqueous solutions of 2 wt. % of Compound 8 were prepared with varying concentrations of sodium sulfate and then filtered through a 0.45 micron PVDF syringe filter after one day of room temperature storage. The filters were then dried at 120° C., cooled to room temperature, and weighed to quantify the amount of insoluble solids that had precipitated out of solution during storage.

TABLE 2

| Additive | Fraction of dye compound removed during filtration (%) |
| --- | --- |
| 0.1M Na$_2$SO$_4$ | 2.85 |
| 0.5M Na$_2$SO$_4$ | −0.4 |
| 1M Na$_2$SO$_4$ | 0.1 |

In a control experiment, the weight change (−0.35%) was determined for a syringe filter that was flushed with 10 mL distilled water and then dried at 120° C. The data shows that the amount of insoluble solids removed from solution after 1 day decreases as the sodium sulfate concentration is increased, which is consistent with enhanced dye bath stability in the presence of sodium sulfate

Example 26: Air Stability of Compound 8

Figure 10:
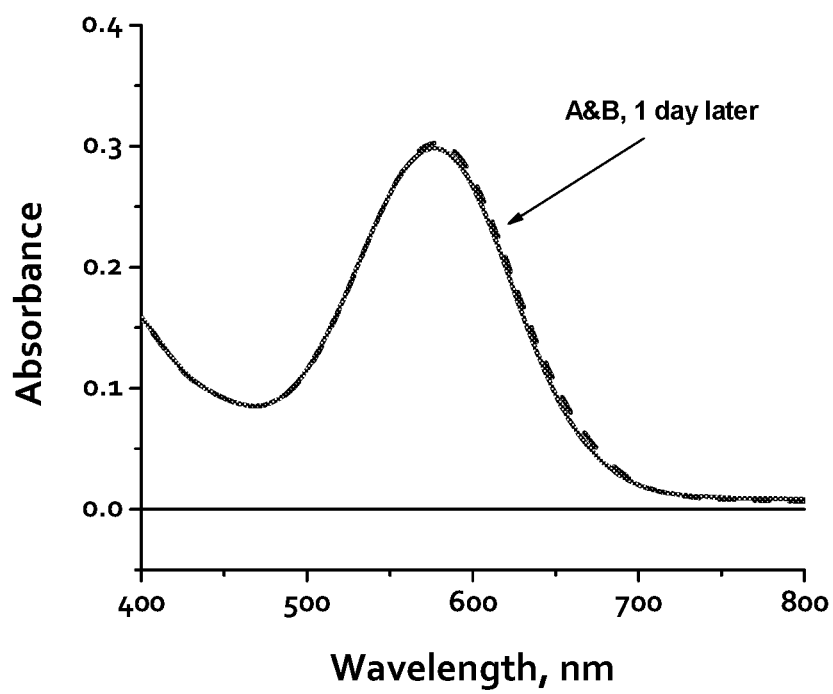
FIG. 10 is the UV-Vis spectra of Compound 8 dissolved in water and then stored for one day at 8° C. under different conditions to examine air stability.

The air stability of Compound 8 was measured by diluting of the compound in water to provide a 0.01 wt. % solution. The solution was then stored for 1 day at 8° C. under different conditions to examine air stability. The solid line represents the stability of the Compound 8 aqueous solution under atmospheric conditions. The dashed line represents the stability of the Compound 8 aqueous solution after treatment with 15 minutes of nitrogen purging of the solution, followed by storage for 1 day in a vial equipped with a rubber septum. See, FIG. 10. The UV-Vis spectra of the solutions were obtained.

The data demonstrates that the spectra taken after one day are identical for solutions stored under nitrogen and stored under atmospheric conditions. The data also shows that compound 8 is air stable in solution, even after storage at room temperature for 2 days.

Example 27: Storage Stability of Compound 35

Figure 11B:
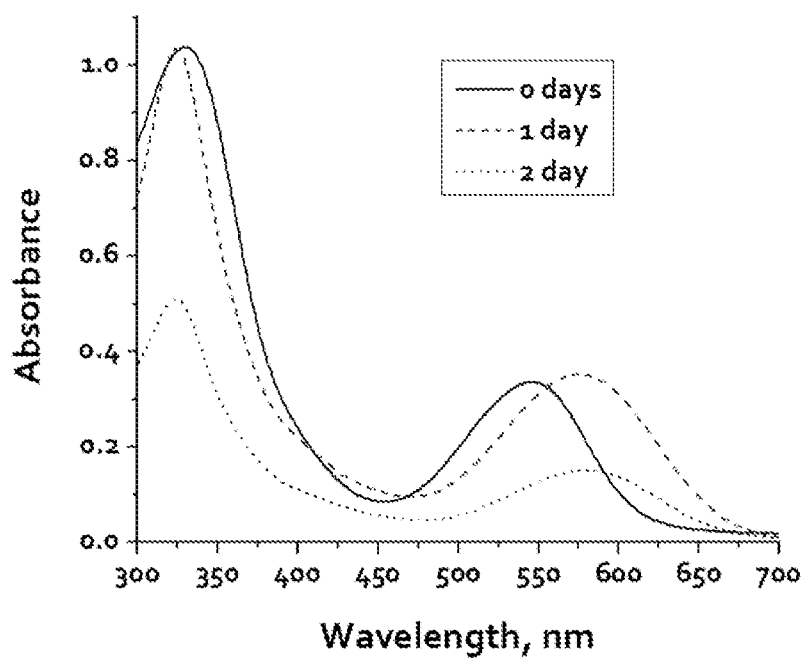
FIG. 11B is the UV-Vis spectra taken over 5 days for a 0.01 wt. % Compound 8 aqueous solution stored at room temperature.

The stability of Compound 8 was measured by preparing a 0.01 wt. % aqueous solution of compound 8 in water. The solution was then stored at room temperature for 2 days. The UV-Vis spectra of the solution after 1 and 2 days were obtained. FIG. 11B are the UV-Vis spectra which show the robustness of the dye compound after at least 2 days of storage at room temperature at both concentrations.

Example 28: Relative Kinetics of Compound 8

Figure 13:
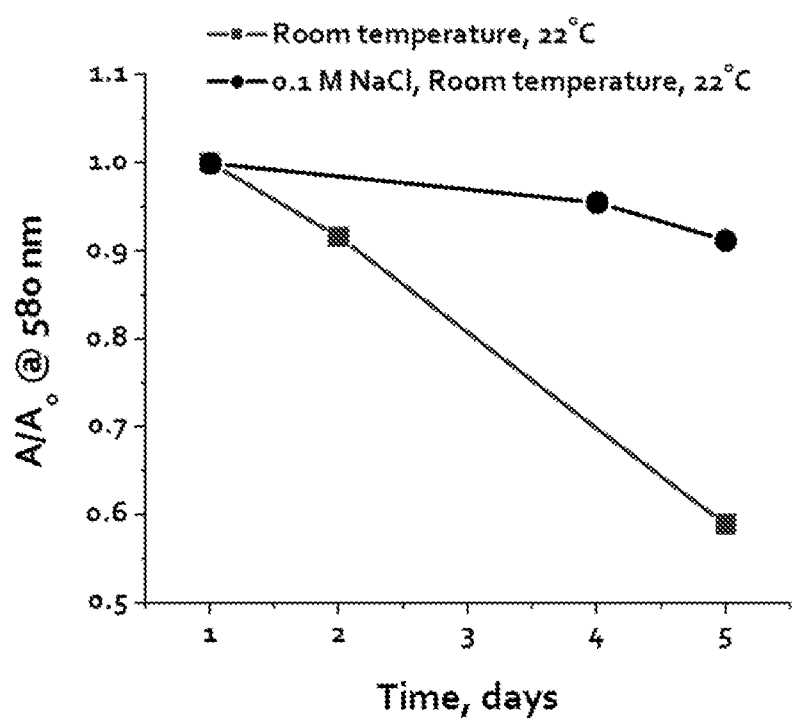
FIG. 13 is a graph showing the relative kinetics of degradation for two conditions for Compound 8.

In this example, the relative kinetics of degradation for two conditions for Compound 8 were measured. One solution contained 0.01 wt. % of Compound 8 and 0.1M NaCl aqueous and the other solution contained 0.01 wt. % of Compound 8. Both solutions were stored at room temperature and the hydrolysis monitored using UV-Vis spectrophotometry. See, FIG. 13. The data showed that the hydrolysis rate for the solution containing salt was a factor of six slower than the room temperature case without salt.

Example 29: Stability of Compound 4

The stability of compound 4 was determined. An aqueous solution of 3 wt. % of Compound 4 was prepared at stored at room temperature for 2 days. The UV-Vis spectra for each solution were obtained prior to storage, 3 hours, 1 day, and 2 days. The solution was then diluted by a factor of 300 and the UV-Vis spectrum of FIG. 15 obtained.

Figure 14:
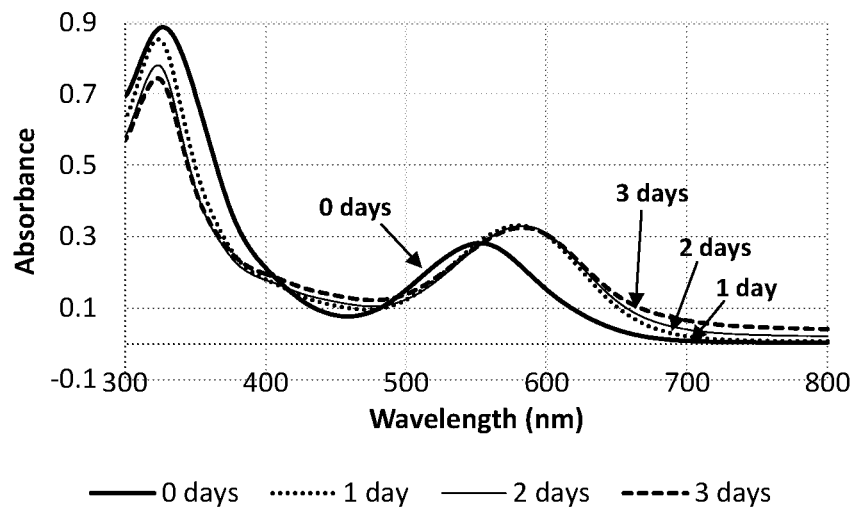
FIG. 14 is the UV-Vis spectra taken over 3 days for a 0.6 wt. % Compound 8 aqueous solution stored at room temperature and used for skein dyeing on each day.
Figure 15:
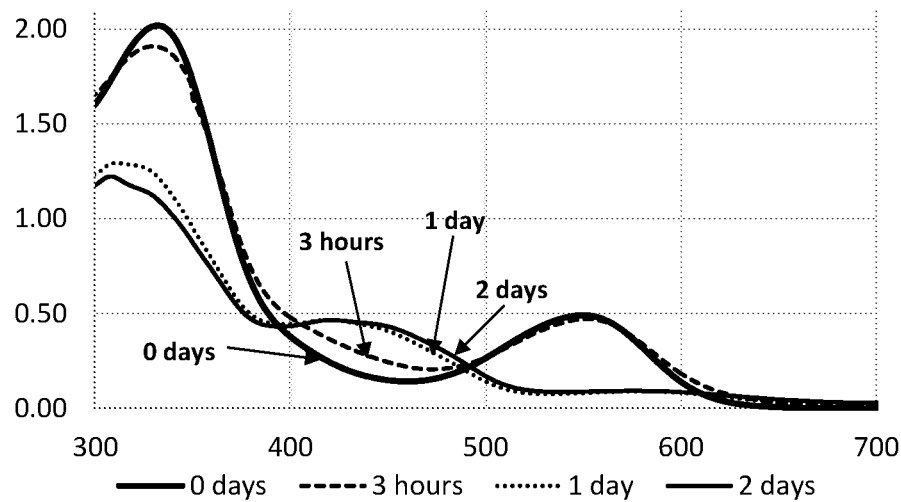
FIG. 15 is the UV-Vis spectra of Compound 4 in water as a function of storage time at room temperature, showing relative instability compared to Compound 8

In comparing FIG. 15 with FIG. 14, the relative instability of Compound 4 compared to Compound 8 can be seen.

Example 30: Comparison of Modified Indigo Dye with Leuco-Indigo

The stability and visual observations comparing what occurs when an aqueous stock solution of leuco-indigo and an aqueous solution Compound 8 were obtained. The leuco-indigo stock solution was prepared using 0.2 wt. % indigo powder, 0.5 wt. % NaOH, and 0.5 wt. % sodium hydrosulfite, the solution was heated to 50-60° C. for 30 minutes, and the solution was then allowed to cool to room temperature. An aqueous solution containing 3 wt. % of Compound 8 was prepared. 1 mL of each solution was then added to 20 mL of distilled water and physical observations were made. See, Table 3.

TABLE 3

| Experiment | Observation |
| --- | --- |
| Leuco-indigo stock solution (yellow) | blue-green solution immediately formed solution turned blue under 10 seconds |

TABLE 3-continued

| Experiment | Observation |
| --- | --- |
| 3 wt. % Compound 8 stock solution | Dark purple solutions became lighter purple upon dilution UV-Vis spectra of diluted solutions superimposable - consistent with no color change |

Figure 16:
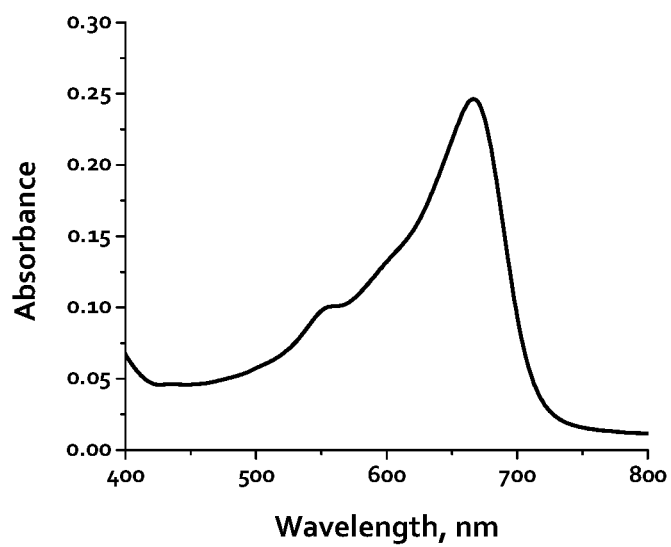
FIG. 16 is the UV-Vis spectrum of the solution obtained after diluting an aqueous stock solution of leuco-indigo with distilled water (see Table 1 for details).

FIG. 16 are the UV-Vis spectra of the solutions obtained after diluting an aqueous stock solution of leuco-indigo with distilled water. It is apparent that in the absence of excess reducing agent such as sodium hydrosulfite, leuco-indigo converts back to indigo in less than 10 seconds.

Example 30: Dyeing of Woven Cotton Fabric

Figure 17:
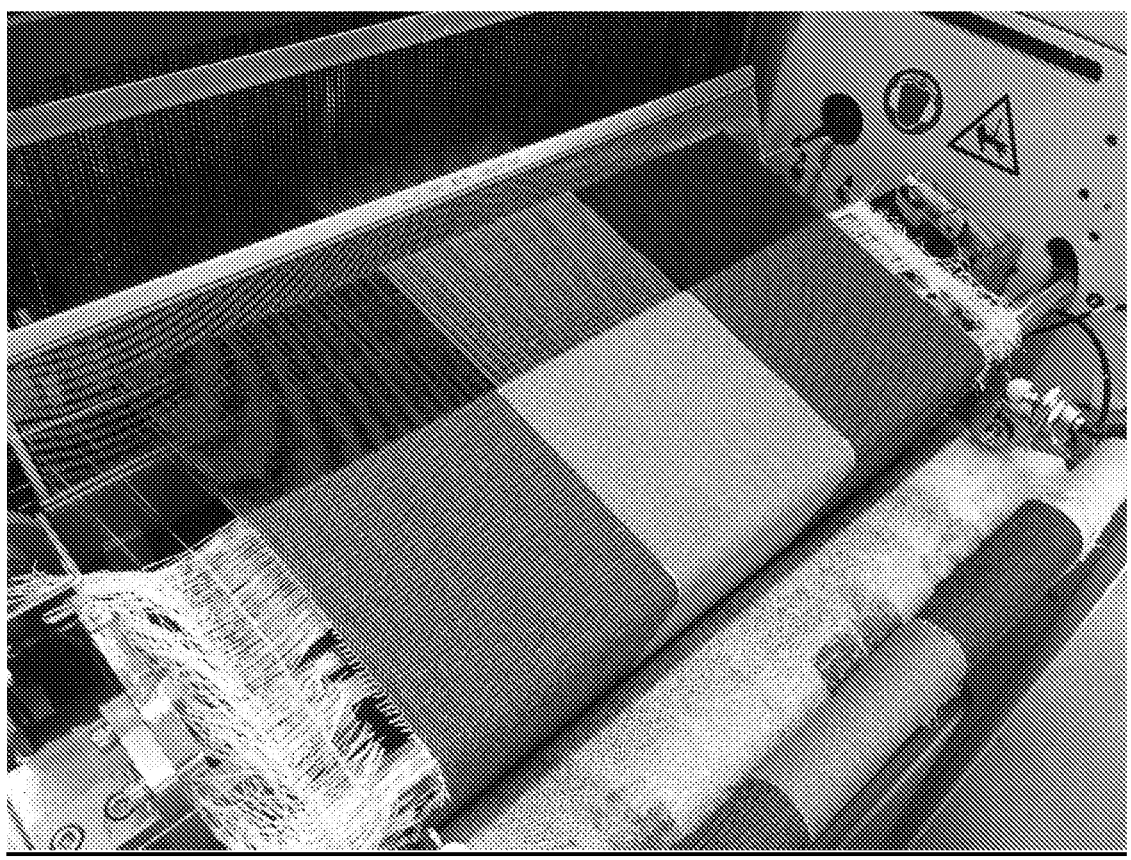
FIG. 17 is an image of 3×1 twill cotton fabric woven using package-dyed yarns that were dyed using Compound 8.

A 3×1 twill cotton fabric was woven using package-dyed yarns that were dyed using an aqueous solution containing 3 wt. % Compound 8. Specifically, the package was rinsed with water, treated with an aqueous solution containing 3 wt. % of Compound, hydrolyzed with 1 M NaOH(aq), and then rinsed with water. See, FIG. 17.

Example 31: Dyeing of Polyester

Figure 18A:
FIG. 18A are images of polyester yarns dyed with either Compound 8 (left) or with indigo (right) followed by 1 cycle 2A American Association of Textile Chemists and Colorists (AATCC) washfastness tests.

Polyester yarns were dyed with either an aqueous solution containing 3 wt. % of Compound 8 or with an indigo solution containing 0.2 wt. % indigo powder, 0.5 wt. % NaOH, and 0.5 wt. % sodium hydrosulfite that was previously heated to 50-60° C. for 30 minutes, and allowed to cool to room temperature, hydrolyzed using 1 M NaOH (aq), and rinsed. The dyed polyester yarns were then subjected to 1 cycle 2A AATCC washfastness tests as described in the AATCC Technical Manual, American Association of Textile Chemists and Colorists, Vol. 91, pages 1-510, 2016, which are equivalent to five home laundries. The yarns dyed using indigo were then skied and rinsed. FIG. 18A shows that yarns dyed with compound 8 (left) exhibited superior washfastness as compared to yarns dyed with indigo (right).

Example 32: Polyester Vs. Cotton Dyeing

Figure 18B:
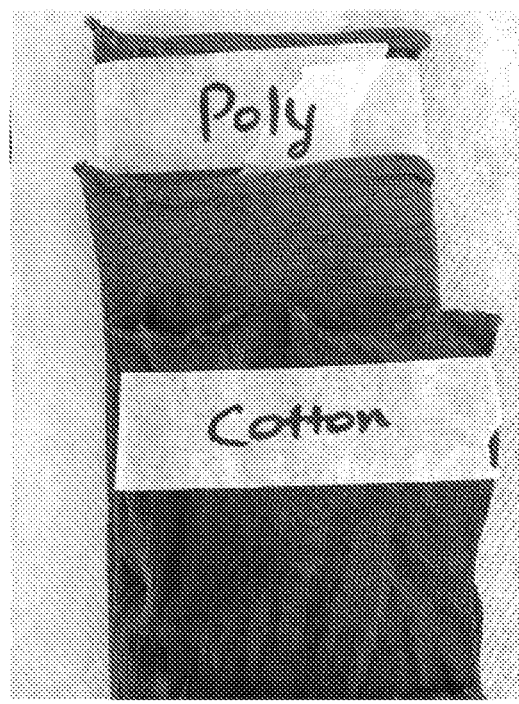
FIG. 18B are images of polyester and cotton knitted socks dyed with Compound 8 followed by one home laundry.

Polyester and cotton knitted socks were dyed with Compound 8 and then washed in one home laundry. The socks were dyed as follows: (1) pre-wetting with water, (2) submersion in a 3 wt. % aqueous dye bath of Compound 8, (3) hydrolysis in 1 M NaOH (aq), and (4) rinsing with water. FIG. 18B shows the color of the socks after dyeing. Of significance, the polyester socks were as robustly colored as the cotton socks.

Example 33: Color Measurements

International Commission on Illumination (CIE) L*a*b* color measurements were obtained for cotton skeins dyed with solutions of leuco-indigo, Compound 8 (C8), or Compound 35 (C35) using a Hunterlabs Benchtop Spectrophotometer. See, e.g., Color Technology in the Textile Industry, Second Edition, American Association of Textile Colorists and Chemists, 1997. Specifically, the leuco-indigo solution was prepared as described in Example 31. Individual aqueous solutions containing 3 wt. % of Compound 8 or Compound 35 were prepared. Scoured and unscoured cotton skeins were then dyed using the procedure of Example 32 and the colors of each skein measured.

Figure 19:
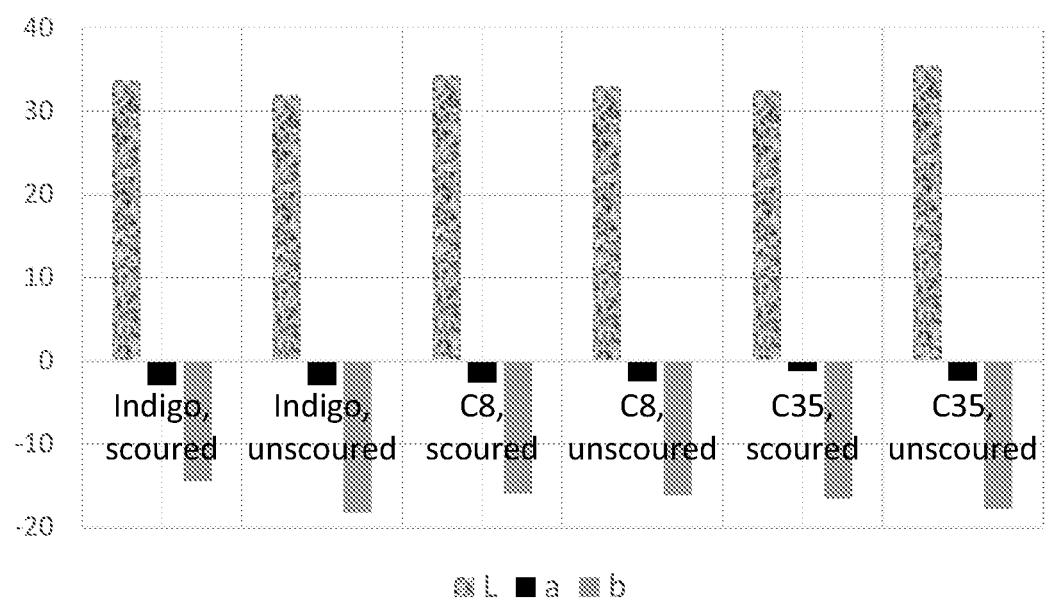
FIG. 19 is a graph showing color measurement data for scoured and unscoured cotton skeins dyed with either leuco-indigo, Compound 8 (C8), or Compound 35 (C35).

FIG. 19 and the data demonstrate that the skeins dyed with Compound 8 or 35 gave similar L, a, and b values that are consistent with the traditional indigo dyeing process.

Example 34: Cotton Fabric Dyeing with Heat Treatment

Figure 20:
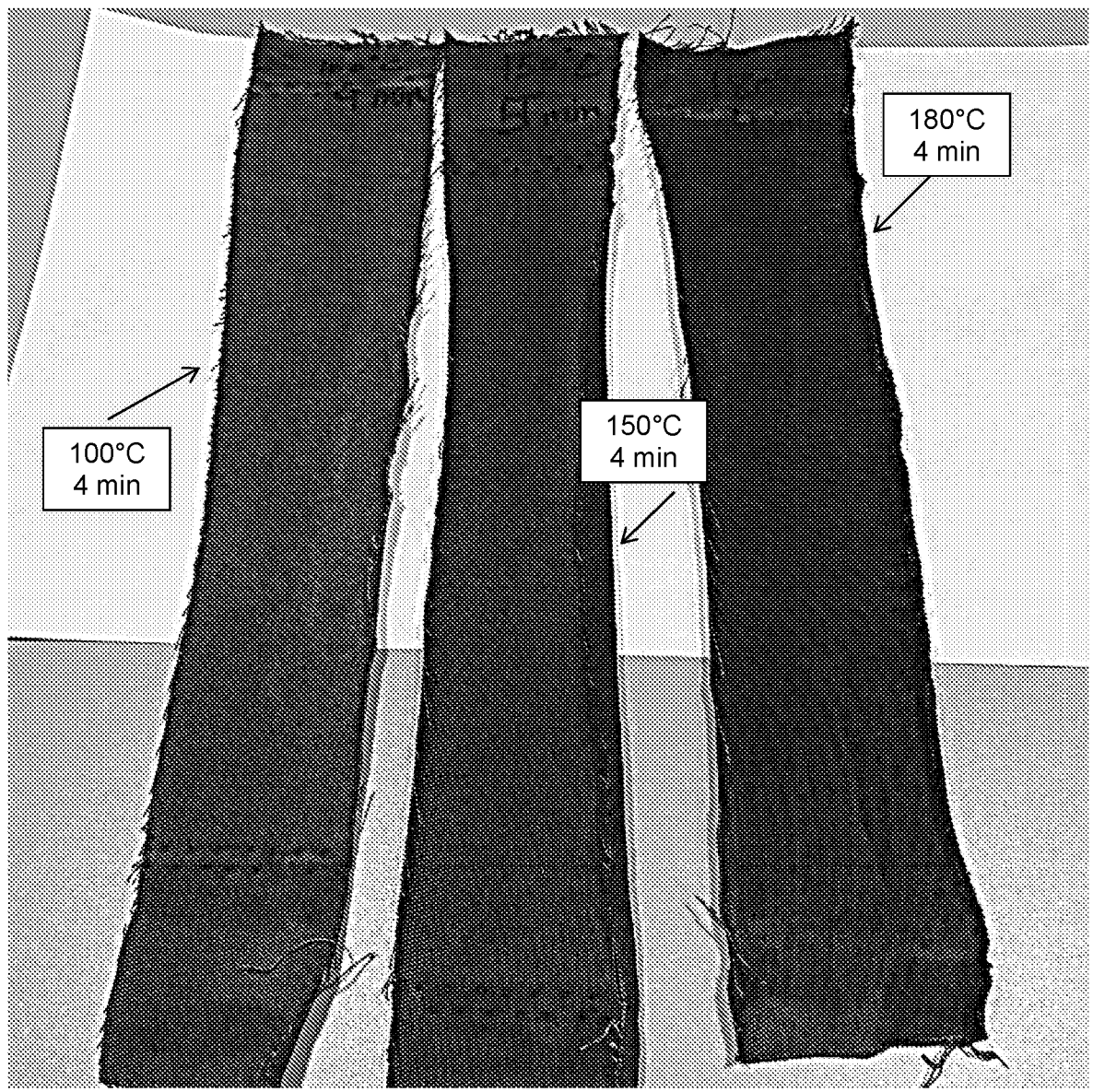
FIG. 20 depicts three images of 3×1 twill cotton fabric dyed with Compound 8 under varying conditions, for example, the image on the left of FIG. 20 is an image of the dyed fabric exposed to 100° C. for 4 minutes; the image in the center of FIG. 20 is an image of the dyed fabric exposed to 150° C. for 4 minutes; the image on the right of FIG. 20 is an image of the dyed fabric exposed to 180° C. for 4 minutes.

Prepared for dye (PFD) 3×1 twill cotton fabric dyed with Compound 8 prepared by dipping in an aqueous solution containing 3 wt. % of Compound 8, padding, and drying at 50° C. The samples were then placed separately into a lab-scale tenter frame for heat treatment. See, FIG. 20 showing the dyed fabric exposed to 100° C. (left), 150° C. (middle), and 180° C. (right).

The images of FIG. 20 illustrate that the application of heat resulted in relatively rapid conversion of Compound 8 to indigo at 180° C., a slower conversion at 150° C., and no conversion at 100° C.

Example 35: Cotton Fabric Dyeing with Heat Treatment and Pretreatment

Cotton skeins were pretreated with 1 M NaOH (aq), dyed with a 3 wt. % aqueous solution of Compound 8, hydrolyzed using 1 M NaOH (aq), and then rinsed with water. One skein was dried at 50° C. and remains purple in color. See, the top skein in FIG. 21. The other skein was dried at 50° C. and then exposed to steam under atmospheric conditions for 30 minutes, resulting in the attainment of a blue hue. See, the botton skein in FIG. 21.

Figure 21:
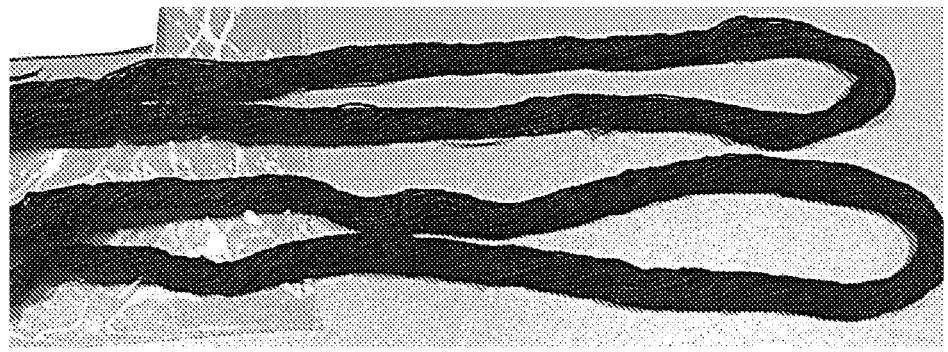
FIG. 21 are images of Cotton skeins pretreated with 1 M NaOH (aq), dyed with Compound 8 using a 3 wt. % solution, hydrolyzed using 1 M NaOH (aq), rinsed with water, and dried. In the case of the skein at the bottom, atmospheric steam was used to carry out the conversion to indigo.

These images of FIG. 21 illustrate that skeins can be dyed with Compound 8 followed by conversion to indigo using atmospheric steam.

Example 35: Air Brushing

PFD 3×1 twill cotton fabric was air-brushed with the aid of a mask using a 3 wt. % aqueous solution of Compound 8. Following drying at 50° C., the fabric was hydrolyzed by submersion in a 1 M NaOH (aq) bath followed by rinsing with water and drying at 50° C.

Figure 22:
FIG. 22 are images of 3×1 twill cotton fabric air-brushed with the aid of a mask using a 3 wt. % aqueous solution of Compound 8.

The images of FIG. 22 illustrate that air-brushing using aqueous-based dye solutions of compound 8 is successful in dyeing fabric and is a straightforward and simple process.

Example 36: Shade Variation with Dip Dyeing

The depth of shade for dyed cotton skein was controlled by varying the concentration of the dye bath. The dyeing process entailed (1) pretreating the cotton skein with 1 M NaOH (aq), (2) submersing in a dye bath of 10, 6, 3, or 0.5 wt. % aqueous solutions of Compound 8, (3) hydrolyzing in 1 M NaOH (aq), and (4) rinsing with water. See, FIG. 23 which shows the variations in color (from top to bottom) for the 10, 6, 3 and 0.5 wt. % solutions.

Figure 23:
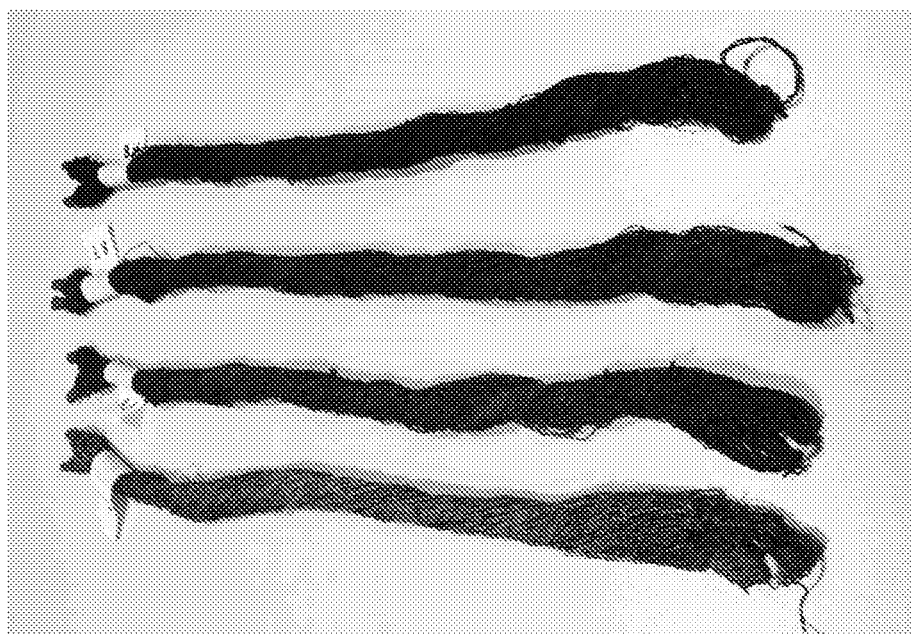
FIG. 23 are images showing the depth of shade for a dyed cotton skein controlled by varying the concentration of the dye bath containing Compound 8.

The images of FIG. 23 illustrate that the depth of shade can easily be controlled in one dip by varying the dye bath concentration.

Example 37: Shade Variation Using Ring-Dyeing

The depth of shade for cotton skeins was controlled by varying the concentration of the dye bath with retention of ring-dyeing. The dyeing process entailed (1) pretreating the cotton skein with 1 M NaOH (aq), (2) submersing in a 0.6, 3, 6, or 10 wt. % aqueous dye bath of Compound 8, (3) hydrolyzing in 1 M NaOH (aq), and (4) rinsing with water. See, FIG. 24 which shows the dyed skeins at the varying concentrations.

Figure 24A:
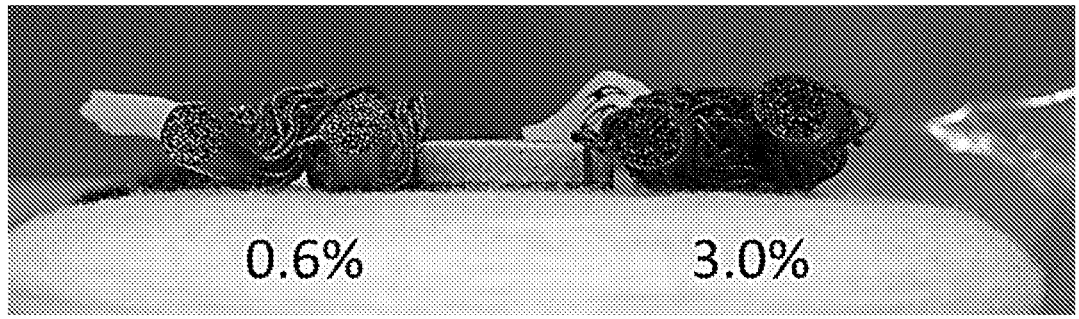
FIG. 24 are images showing that the depth of shade of Compound 8 is controlled by varying the concentration of the dye bath with retention of ring-dyeing.
Figure 24B:
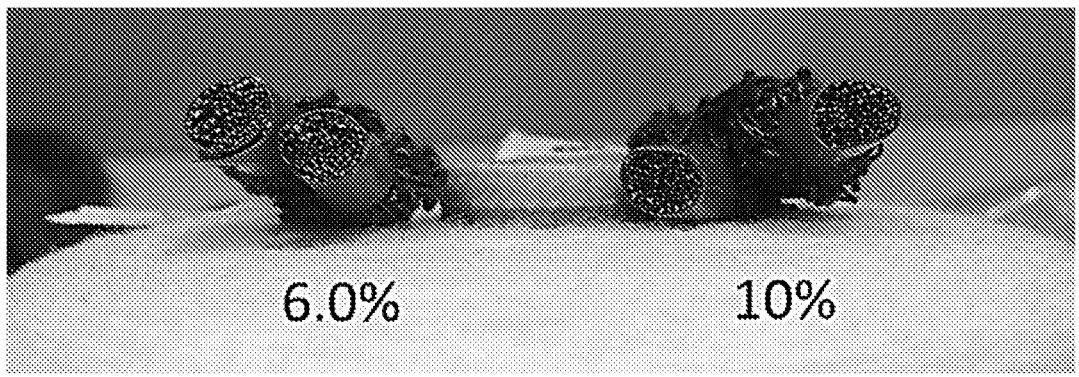

The images of FIG. 24 illustrate that the depth of shade can be controlled by varying the dye bath concentration with retention of ring-dyeing.

Example 38: Core-Dyeing of Yarns

Cotton skeins were dyed using Compound 8. The dyeing process entailed (1) pre-wetting the cotton skein with water, (2) submersing the wet cotton skein in a 3 wt. % aqueous dye bath of Compound 8, (3) hydrolyzing in 1 M NaOH (aq), and (4) rinsing with water.

Figure 25:
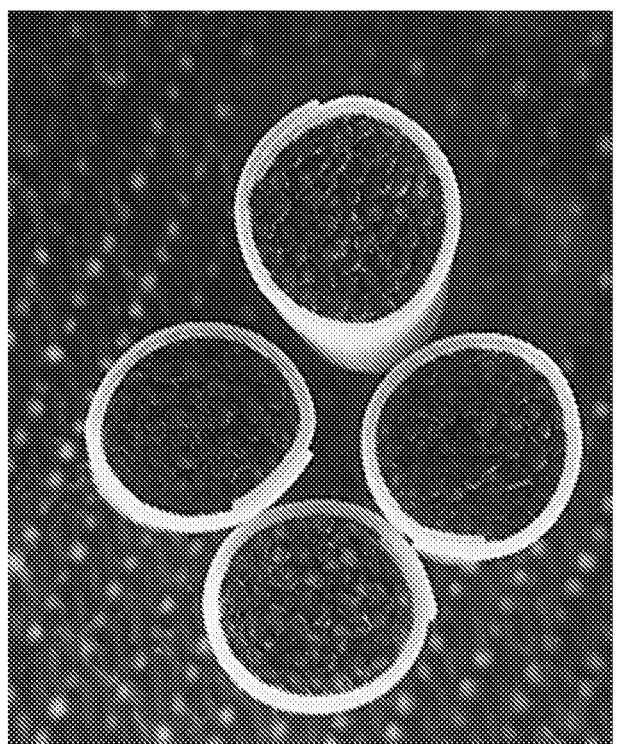
FIG. 25 are images of cross-sections of cotton skeins dyed using Compound 8.

The cross-sectional images of FIG. 25 demonstrate the ability to easily prepare core-dyed yarns using Compound 8.

Example 39: Consecutive Dyeing Cycles

Figure 26:
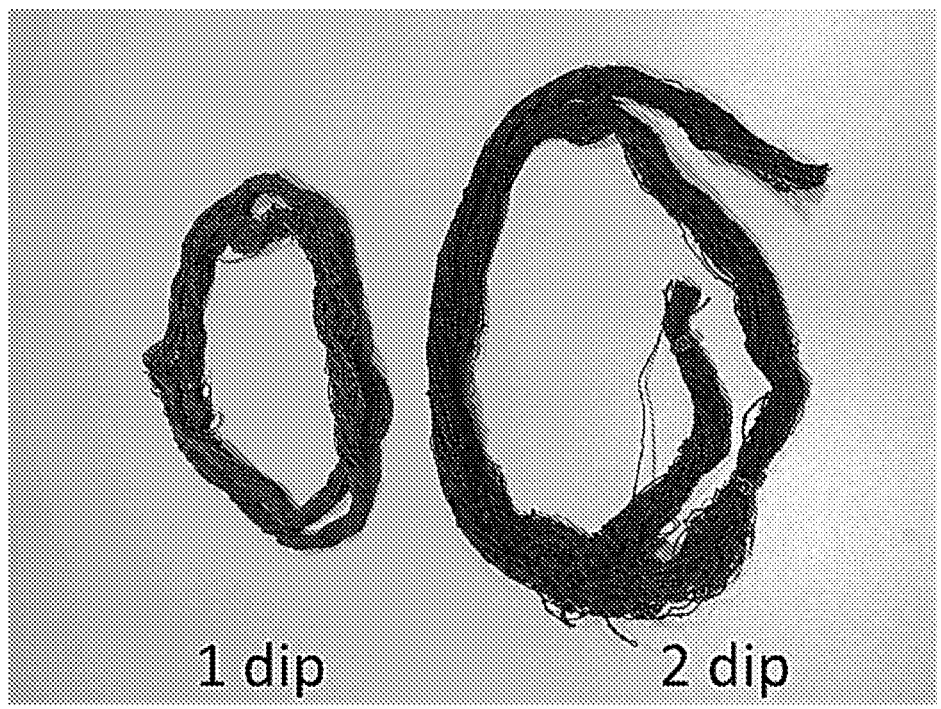
FIG. 26 are images of cotton skeins dyed with Compound 8 over two consecutive dyeing cycles.

Cotton skeins were dyed with Compound 8 over one or two consecutive dyeing cycles. For each cycle, the process entailed (1) pretreating with 1 M NaOH (aq), (2) submersing in a 3 wt. % dye bath of aqueous Compound 8, (3) hydrolyzing in 1 M NaOH (aq), and (4) rinsing with water. The left sample in FIG. 26 is cotton skein after a 1 cycle or dip. The right sample is cotton skein after 2 cycles or dips.

The images of FIG. 26 illustrate that the depth of shade can be built up over consecutive dipping cycles.

Example 40: Ring-Dyeing from Rope Dyeing Experiments

Ring-dyed cotton ropes dyed with Compound 8 were prepared using a lab-scale Roaches SkyPad rope-dyeing instrument. The cotton ropes were passed through a series of baths at a rate of 0.8-3.2 meters/minute and padded in between (about 50% wet pickup). The process entailed (1) pretreating with 1 M NaOH (aq), (2) submersing in an aqueous 3 wt. % Compound 8, (3) hydrolyzing in 1 M NaOH (aq), and (4) rinsing with water. The dyed ropes were then rinsed extensively with water followed by drying in an oven at 60° C.

Figure 27:
FIG. 27 are images of ring-dyed cotton ropes dyed with Compound 8 using a lab-scale rope-dyeing apparatus.

The images of FIG. 27 illustrate that consistent shade and ring-dyeing were attained during a continuous rope-dyeing demonstration using Compound 8.

Example 41: Solubility Studies

The solubility of Compound 8, 35, 37, and 41 was measured in this example. The solutions were prepared by adding a known amount of dye to a known amount of water and agitating the solution. Separately, each solution of known concentration was centrifuged for 30 minutes to separate out any undissolved solids. The supernatant was decanted and the remaining undissolved solids were dried at 50° C. and later weighed to determine wt. % of soluble portion.

Figure 28A:
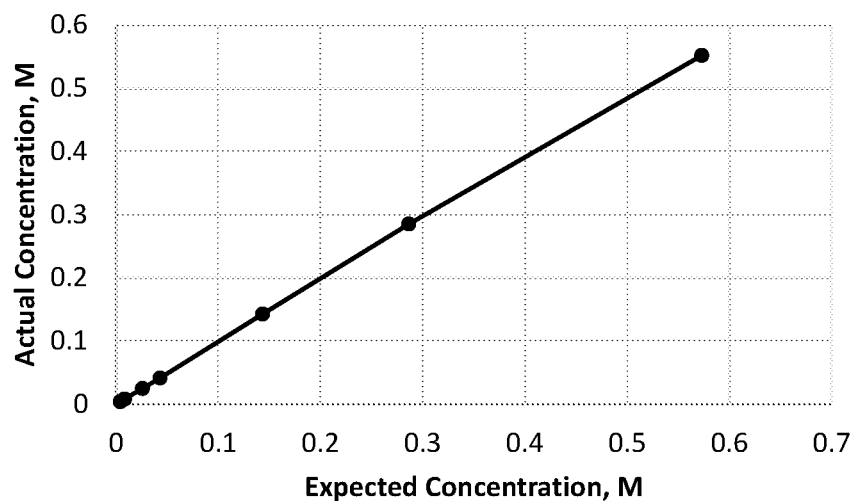
FIG. 28A is a line graph of actual concentration versus expected concentration for Compound 8 from solubility studies in water.
Figure 28B:
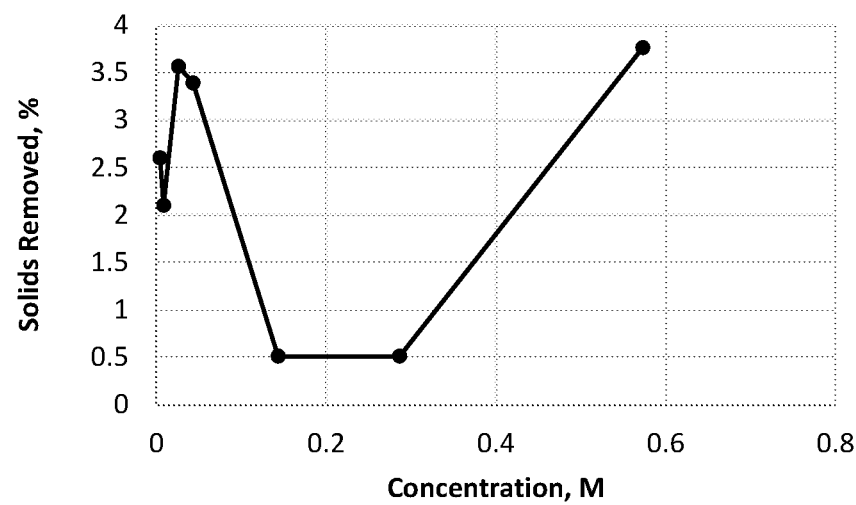
FIG. 28B is a line graph of percent undissolved solids removed during centrifugation as a function of expected concentration.
Figure 29A:
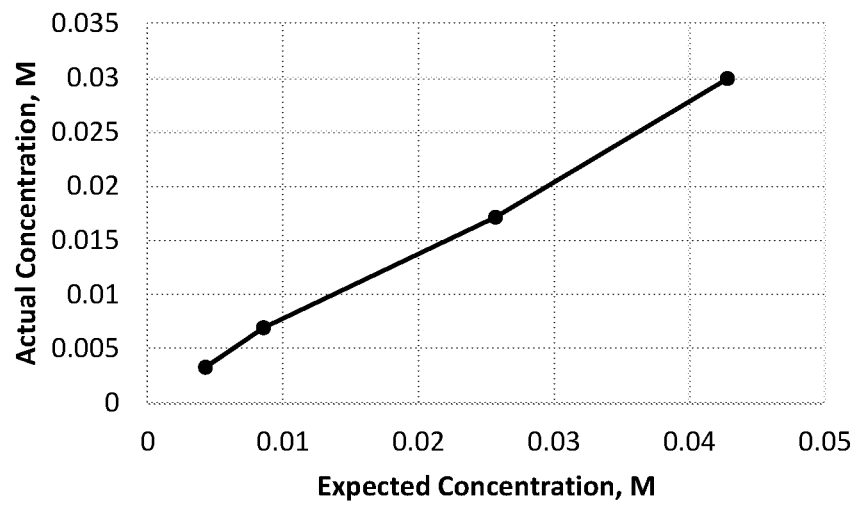
FIG. 29A is a line graph of actual concentration versus expected concentration for Compound 35 from solubility studies in water.
Figure 29B:
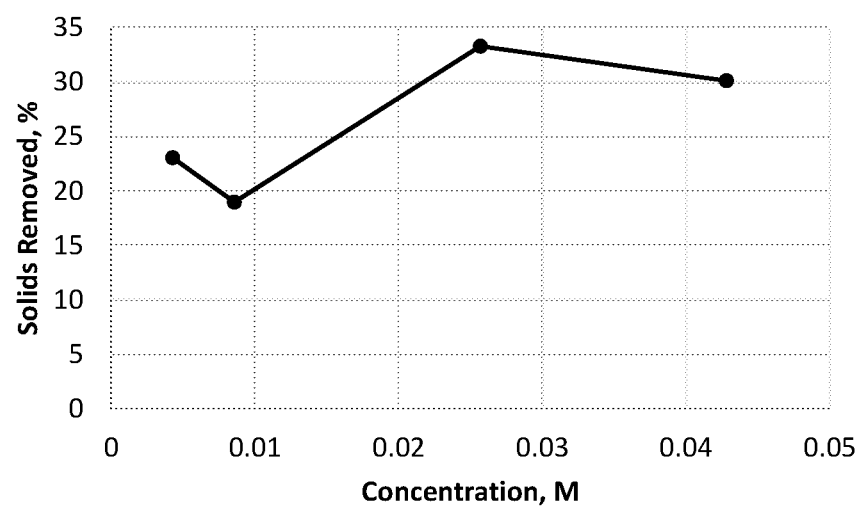
FIG. 29B is a line graph of percent undissolved solids removed during centrifugation as a function of expected concentration.
Figure 30A:
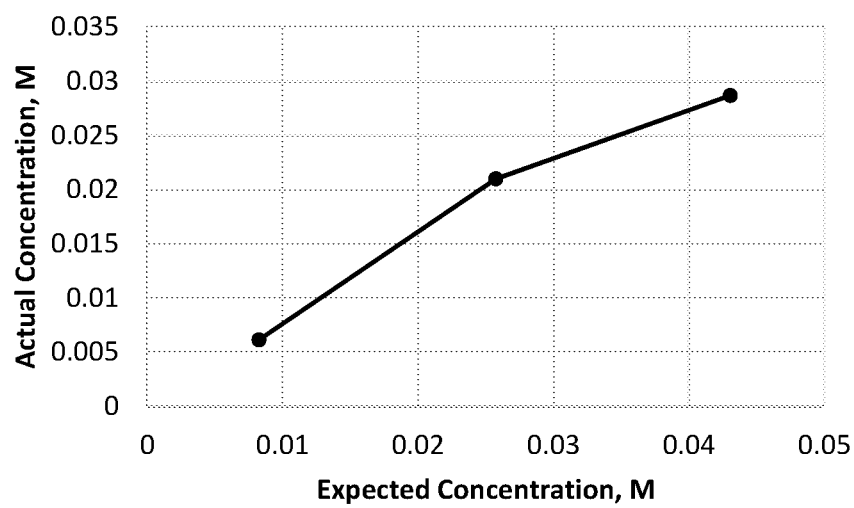
FIG. 30A is a line graph of actual concentration versus expected concentration for Compound 37 from solubility studies in water.
Figure 30B:
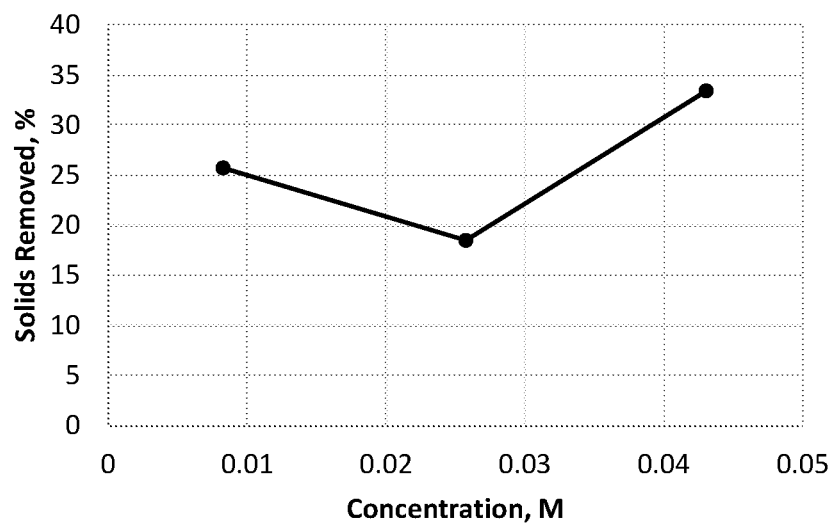
FIG. 30B is a line graph of percent undissolved solids removed during centrifugation as a function of expected concentration.
Figure 31A:
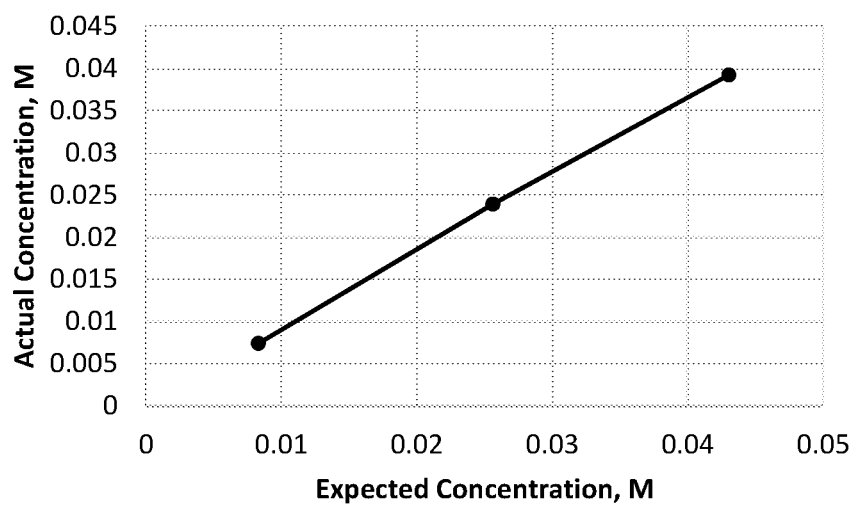
FIG. 31A is a line graph of actual concentration versus expected concentration for Compound 41 from solubility studies in water.
Figure 31B:
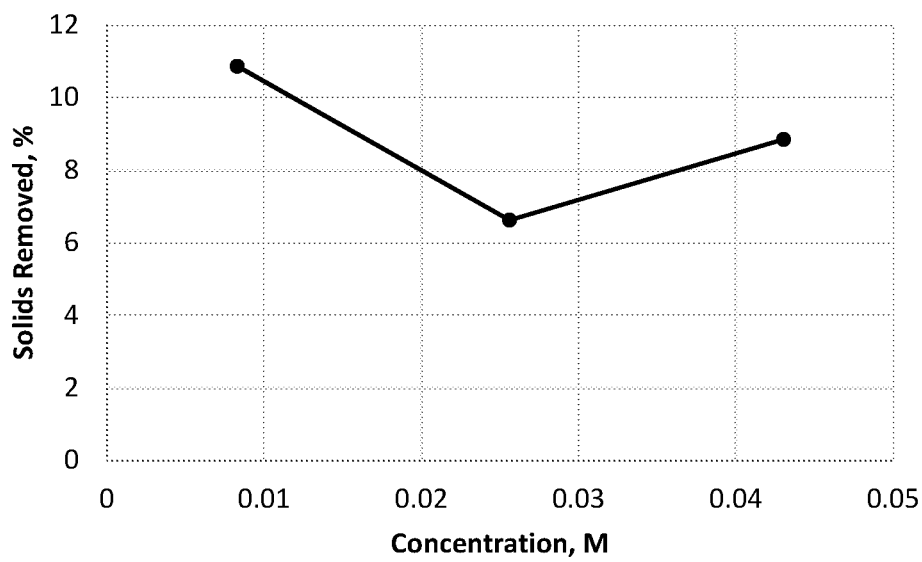
FIG. 31B is a line graph of percent undissolved solids removed during centrifugation as a function of expected concentration.

The actual concentrations versus expected concentrations for aqueous solutions containing Compounds 8 (FIG. 28A—expected; FIG. 28B—actual), 35 (FIG. 29A—expected; FIG. 29B—actual), 37 (FIG. 30A—expected; FIG. 30B—actual), and 41 (FIG. 31A—expected; FIG. 311B—actual) were measured using solubility studies in water. The actual concentration was determined by centrifuging the dye solutions extensively to remove any undissolved solids. The undissolved solids were then isolated, dried, and weighed.

Table 4 shows the highest solubility measured for a series of modified indigo compounds. Note that in all instances, a true maximum solubility in water has not been determined due to the very high solubility of the compounds in water. For all compounds, the maximum solubility was corrected for the amount of insoluble solids that were isolated during centrifugation.

TABLE 4

| Compound | Highest Solubility Measured (wt. %) |
|---|---|
| 8 | 40 |
| 35 | 1.7 |
| 37 | 1.6 |
| 41 | 2.5 |

For compound 8, the average percent solids removed was about 2%. For compound 35, the average percent solids removed was about 26%. For compound 37, the average percent solids removed was about 26%. For compound 41, the average percent solids removed was about 9%.

Example 42: Screen Printing

PFD 3×1 twill cotton fabric was screen printed using a screen printing ink containing Compound 8. The ink was prepared by adding an aqueous solution of 3 wt. % Compound 8 to a 0.5 wt. % methylcellulose aqueous solution. Hydrolysis was carried out by spraying 1 M NaOH (aq) onto the printed area followed by rinsing with water.

Figure 32:
FIG. 32 is a prepared for dye 3×1 twill cotton fabric screen printed using a screen printing ink containing Compound 8.

FIG. 32 shows that the compounds described herein may also be utilized in screen printing methods.

It is to be understood that while the invention has been described in conjunction with the preferred specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. In addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

What is claimed is:

1. A dye compound for use in dyeing a substrate, the dye compound comprising an indigo derivative, or a salt thereof, having one or more modification over the chemical structure of indigo, wherein the indigo derivative has a water solubility of greater than 0.2% w/v in the absence of a reducing agent and in the presence of oxygen, and converts to indigo upon removing the modification, and wherein the indigo derivative is of Formula (Ia) or (Ib)

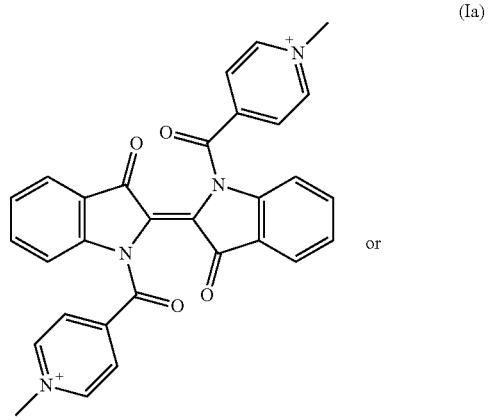

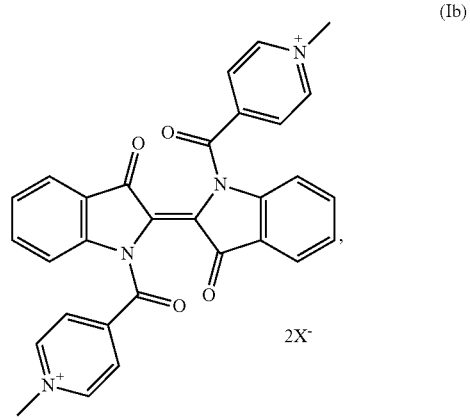

wherein X is selected from the group consisting of acetate, propionate, lactate, citrate, tartrate, succinate, fumarate, maleate, malonate, mandelate, phthalate, phosphate, nitrate, sulfate, ethanesulfonate, phosphonate, napthalenesulfonate, benzenesulfonate, toluenesulfonate, camphorsulfonate, methanesulfate, ethanesulfonate, napthalenesulfate, benzenesulfate, toluenesulfate, camphorsulfate, bisulfate, sulfite or bisulfite.

2. The compound of claim 1, wherein the compound is

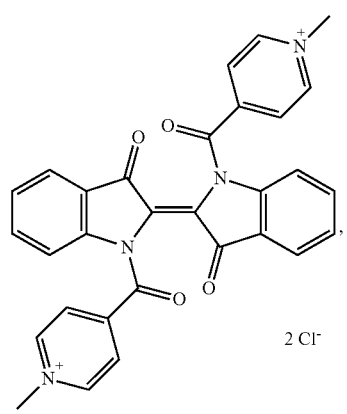

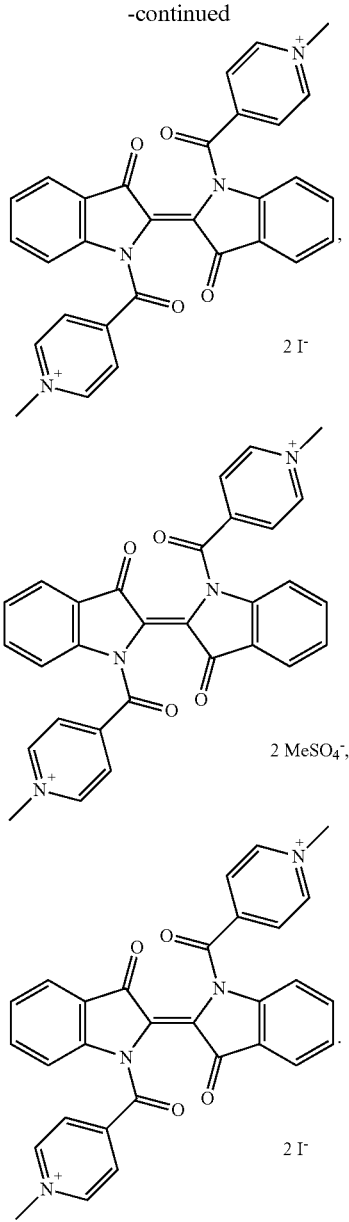

3. A kit comprising: (i) one or more compounds of claim 1; and (ii) a reagent and/or device that converts the compound to indigo.

4. The kit of claim 3, wherein reagent (ii) comprises a base, a device that generates heat, or a device that generates steam.

5. A method of dyeing a substrate, comprising: (i) contacting the substrate with an aqueous bath comprising a compound of claim 1; and (ii) hydrolyzing the compound of step (i).

6. The method of claim 5, further comprising repeating steps (i) and (ii).

7. The method of claim 5, wherein the aqueous bath further comprises a stabilizing agent that is NaCl, $Na_2SO_4$, or combinations thereof.

8. The method of claim 5, wherein the hydrolyzing is performed using a base, heat, steam, or a combination thereof.

9. The method of claim 8, wherein the base is a hydroxide base, an alkaline earth base, or a carbonate.

10. The method of claim 8, wherein the base is a hydroxide base that is sodium hydroxide, potassium hydroxide, or lithium hydroxide.

11. The method of claim 8, wherein the base is a carbonate selected from sodium carbonate or potassium carbonate.

12. The method of claim 8, wherein heat comprises a temperature of at least about 80° C.

13. The method of claim 5, further comprising: (iii) rinsing the substrate from step (ii).

14. The method of claim 13, wherein the rinsing is performed with an aqueous solution comprising a neutralization agent or buffering agent.

15. The method of claim 13, further comprising: (iv) pretreating the substrate prior to step (i) with a cationic agent or caustic agent.

16. The method of claim 15, wherein the cationic agent is selected from diallyldimethylammonium chloride, polymerized diallyldimethylammonium chloride, [2-(acryloyloxy) ethyl] trimethylammonium chloride, 3-chloro-2-hydroxylpropyl trimethyl-ammonium chloride, or a combination thereof.

17. The method of claim 15, wherein the caustic agent is selected from sodium hydroxide, potassium hydroxide, sodium carbonate, diethanolamine, trimethylamine, hexamethylenediamine, liquid ammonia, or a combination thereof.

* * * * *